US006549723B2

(12) United States Patent
Mori et al.

(10) Patent No.: US 6,549,723 B2
(45) **Date of Patent: *Apr. 15, 2003**

(54) OPTICAL DISK, REPRODUCTION APPARATUS, AND REPRODUCTION METHOD

(75) Inventors: Yoshihiro Mori, Hirakata (JP); Masayuki Kozuka, Neyagawa (JP); Kazuhiko Yamauchi, Neyagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/135,332

(22) Filed: Apr. 29, 2002

(65) Prior Publication Data

US 2002/0127003 A1 Sep. 12, 2002

Related U.S. Application Data

(63) Continuation of application No. 09/795,340, filed on Feb. 27, 2001.

(30) Foreign Application Priority Data

Aug. 7, 1997 (JP) ............................................ 9-212828
Aug. 7, 1997 (JP) ............................................ 9-212829
Aug. 7, 1997 (JP) ............................................ 9-212830

(51) Int. Cl.[7] ............................ H04N 7/04; H04N 7/52
(52) U.S. Cl. .......................... 386/98; 386/105; 386/104
(58) Field of Search ........................... 386/98, 99, 104, 386/105, 106, 125, 126, 96, 39, 45, 75, 70, 95, 46, 82, 109, 111, 112, 27, 33; H04N 7/04, 7/52

(56) References Cited

U.S. PATENT DOCUMENTS

| | | | |
|---|---|---|---|
| 4,777,537 A | * 10/1988 | Ueno et al. | |
| 5,915,067 A | 6/1999 | Nonomura et al. | |
| 6,208,802 B1 | 3/2001 | Mori et al. | |
| 6,219,488 B1 | 4/2001 | Mori et al. | |
| 6,222,805 B1 | 4/2001 | Mori et al. | |

FOREIGN PATENT DOCUMENTS

| | | |
|---|---|---|
| EP | 3-25558 | 7/1989 |
| EP | 0 635 835 | 7/1994 |
| EP | 0 737 975 | 4/1996 |
| EP | 0 777 227 | 5/1996 |
| EP | 0 788 101 | 8/1996 |
| EP | 0 817 195 | 7/1997 |
| EP | 0 869 496 | 10/1997 |
| EP | 0 855 715 | 1/1998 |
| EP | 0 856 849 | 2/1998 |
| EP | 0 867 877 | 3/1998 |
| JP | 5-250811 | 9/1993 |
| JP | 9-251723 | 9/1997 |
| JP | 10-21673 | 1/1998 |
| JP | 10-208403 | 7/1998 |
| WO | 96/38842 | 6/1997 |
| WO | 97/07506 | 8/1997 |

OTHER PUBLICATIONS

International Search Report for Application No. PCT/JP98/03516; Mailed Jan. 11, 1999.

Taiwanese Office Action for Application No. 87112984 and English Translation.

* cited by examiner

*Primary Examiner*—Robert Chevalier
(74) *Attorney, Agent, or Firm*—Renner, Otto, Boisselle & Sklar

(57) ABSTRACT

An optical disk includes: a data region; and a management region. The data region stores: at least one video object containing video information and audio information; and at least one audio object containing audio information. The management region stores first path information and second path information, the first path information indicating a first reproduction path including only the at least one video object, and the second path information indicating a second reproduction path including a combination of the at least one video object and the at least one audio object.

3 Claims, 41 Drawing Sheets

FIG. 20A

ATT_SRPTI

| Title number | AOTT/TT | ATT_GR number | ATS/VTS number | Intra-ATS title number | Intra-ATT program number |
|---|---|---|---|---|---|
| ATT#1 | AOTT | ATT_GR#1 | ATS#1 | ATT#1 | PG#1 |
| ATT#2 | ATT | ATT_GR#2 | VTS#1 | VTT#2 | PG#1 |
| ATT#3 | AOTT | ATT_GR#3 | ATS#2 | ATT#1 | PG#1 |
| ATT#4 | AOTT | ATT_GR#3 | ATS#2 | ATT#2 | PG#1 |
| ATT#5 | AOTT | ATT_GR#3 | ATS#1 | ATT#2 | PG#1 |

AOTT_SRPTI

| Title number | AOTT/TT | ATT_GR number | ATS/VTS number | Intra-ATS title number | Intra-ATT program number |
|---|---|---|---|---|---|
| ATT#1 | AOTT | ATT_GR#1 | ATS#1 | ATT#1 | PG#1 |
| ATT#2 | - | - | - | - | - |
| ATT#3 | AOTT | ATT_GR#2 | ATS#2 | ATT#1 | PG#1 |
| ATT#4 | AOTT | ATT_GR#2 | ATS#2 | ATT#2 | PG#1 |
| ATT#5 | AOTT | ATT_GR#2 | ATS#1 | ATT#2 | PG#1 |

TT_SRPTI

| Title number | VTS number | Intra-ATS title number | Intra-ATT program number |
|---|---|---|---|
| TT#1 | VTS#1 | TT#1 | PG#1 |
| TT#2 | VTS#2 | TT#2 | PG#1 |
| TT#3 | VTS#3 | TT#3 | PG#1 |

FIG. 20B

ATS_PGCI_SRP

| ATS_PGCI_SRP number | Intra-ATS title number | Audio coding mode | Audio channel | ATS_PGC start address |
|---|---|---|---|---|
| ATS_PGCI_SRP#1 | ATT#1 | LPCM | 2ch | Address of ATS_PGCI#1 |
| ATS_PGCI_SRP#1 | ATT#2 | LPCM | 2ch | Address of ATS_PGCI#2 |

ATS_PGCI

| ATS_PGCI number | Number of programs | Number of cells |
|---|---|---|
| ATS_PGCI#1 | 1 | 1 |
| ATS_PGCI#2 | 1 | 1 |

ATS_PGI of ATS_PGCI#1

| ATS_PGI number | Stream number | Entry cell number | Downmix factor number | PG playback time |
|---|---|---|---|---|
| ATS_PGI#1 | 1 | 1 | 0 | 900000 |

ATS_PGI of ATS_PGCI#2

| ATS_PGI number | Stream number | Entry cell number | Downmix factor number | PG playback time |
|---|---|---|---|---|
| ATS_PGI#1 | 2 | 1 | 0 | 1800000 |

ATS_C_PBI of ATS_PGCI#1

| ATS_C_PBI number | ATS cell index number | Cell type | ATS cell start address | ATS cell end address |
|---|---|---|---|---|
| ATS_C_PBI#1 | 1 | 0 | Start address of cell#1 of AOB#1 | End address of cell#1 of AOB#1 |

ATS_C_PBI of ATS_PGCI#2

| ATS_C_PBI number | ATS cell index number | Cell type | ATS cell start address | ATS cell end address |
|---|---|---|---|---|
| ATS_C_PBI#1 | 1 | 0 | Start address of cell#1 of AOB#2 | End address of cell#1 of AOB#2 |

*FIG.20C*

ATS_PGCI_SRP

| ATS_PGCI_SRP number | Intra-ATS title number | Audio coding mode | Audio channel | ATS_PGC start address |
|---|---|---|---|---|
| ATS_PGCI_SRP#1 | ATT#1 | LPCM | 2ch | Address of ATS_PGCI#1 |
| ATS_PGCI_SRP#1 | ATT#2 | LPCM | 2ch | Address of ATS_PGCI#2 |

ATS_PGCI

| ATS_PGCI number | Number of programs | Number of cells |
|---|---|---|
| ATS_PGCI#1 | 1 | 1 |
| ATS_PGCI#2 | 1 | 1 |

ATS_PGI of ATS_PGCI#1

| ATS_PGI number | Stream number | Entry cell number | Downmix factor number | PG playback time |
|---|---|---|---|---|
| ATS_PGI#1 | 1 | 1 | 0 | 450000 |

ATS_PGI of ATS_PGCI#2

| ATS_PGI number | Stream number | Entry cell number | Downmix factor number | PG playback time |
|---|---|---|---|---|
| ATS_PGI#1 | 2 | 1 | 0 | 1800000 |

ATS_C_PBI of ATS_PGCI#1

| ATS_C_PBI number | ATS cell index number | Cell type | ATS cell start address | ATS cell end address |
|---|---|---|---|---|
| ATS_C_PBI#1 | 1 | 0 | Start address of cell#2 of VOB#2 | End address of cell#2 of VOB#2 |

ATS_C_PBI of ATS_PGCI#2

| ATS_C_PBI number | ATS cell index number | Cell type | ATS cell start address | ATS cell end address |
|---|---|---|---|---|
| ATS_C_PBI#1 | 1 | 0 | Start address of cell#1 of VOB#6 | End address of cell#1 of VOB#6 |

Data on disk

Reproduction order of player having reproduction capabilities of LPCM, 96kHz, 96kHz, and 6ch Reproduction order of player having reproduction capabilities of LPCM, 48kHz, 6ch, and DTS

*FIG. 23A*

ATT_SRPT structure

| Title number | ATS number | Intra-ATS title number | Intra-ATT program number |
|---|---|---|---|
| ATT#1 | ATS#2 | ATT#1 | PG#1 |
| ATT#2 | ATS#2 | ATT#2 | PG#1 |
| ATT#3 | ATS#2 | ATT#3 | PG#1 |
| ATT#4 | ATS#2 | ATT#4 | PG#1 |
| ATT#5 | ATS#1 | ATT#1 | PG#1 |
| ATT#6 | ATS#2 | ATT#5 | PG#1 |

*FIG. 23B*

PGC structure of AOB point type ATS(ATS#2)

| Intra-ATS title number | PGC number | Block mode | Block type | Audio coding mode | Number of channels | Stream number |
|---|---|---|---|---|---|---|
| ATT#1 | PGC#1 | 0 (None Block) | 0 (None Block) | LPCM | 2ch | #1 |
| ATT#2 | PGC#2 | 1 (First Block) | 1 (Different Coding Mode) | LPCM | 2ch | #2 |
| ATT#2 | PGC#3 | 3 (Last Block) | 1 (Different Coding Mode) | LPCM | 2ch | #1 |
| ATT#3 | PGC#4 | 1 (First Block) | 2 (Different Channel) | LPCM | 6ch | #2 |
| ATT#3 | PGC#5 | 3 (Last Block) | 2 (Different Channel) | LPCM | 2ch | #1 |
| ATT#4 | PGC#6 | 1 (First Block) | 3 (Different Coding Mode and Channel) | LPCM | 2ch | #2 |
| ATT#4 | PGC#7 | 3 (Last Block) | 3 (Different Coding Mode and Channel) | LPCM | 6ch | #1 |
| ATT#5 | PGC#8 | 0 (None Block) | 0 (None Block) | LPCM | 2ch | #1 |

FIG. 23C

PGC structure of VOB point type ATS (ATS#1)

| Intra-ATS title number | PGC number | Block mode | Block type | Audio coding mode | Number of channels | Stream number |
|---|---|---|---|---|---|---|
| ATT#1 | PGC#1 | 1 (First Block) | 3 (Different Coding Mode and Channel) | DTS | 6ch | #2 |
| ATT#1 | PGC#2 | 3 (Last Block) | 3 (Different Coding Mode and Channel) | LPCM | 2ch | #1 |

FIG. 23D

Audio attributes of
ATS management table of ATS#2

| Stream number | Audio coding mode | Quantization bit number | Sampling frequency |
|---|---|---|---|
| #1 | LPCM | 16 | 48kHz |
| #2 | LPCM | 24 | 96kHz |
| #3 | — | — | — |
| #4 | — | — | — |
| #5 | — | — | — |
| #6 | — | — | — |
| #7 | — | — | — |
| #8 | — | — | — |

FIG. 23E

Audio attributes of
ATS management table of ATS#1

| Stream number | Audio coding mode | Quantization bit number | Sampling frequency | Stream ID |
|---|---|---|---|---|
| #1 | LPCM | 16 | 48kHz | 0 |
| #2 | DTS | 24 | 48kHz | 1 |
| #3 | — | — | — | — |
| #4 | — | — | — | — |
| #5 | — | — | — | — |
| #6 | — | — | — | — |
| #7 | — | — | — | — |
| #8 | — | — | — | — |

OPTICAL DISK, REPRODUCTION APPARATUS, AND REPRODUCTION METHOD

This is a continuation of copending application Ser. No. 09/795,340, filed Feb. 27, 2001.

BACKGROUND OF THE INVENTION

1. Field of the Invention

The present invention relates to an optical disk for storing digital data of multimedia data including audio information and moving image information that are associated with each other, as well as an apparatus and a method for reproducing the same.

2. Description of the Related Art

Conventionally, CDs (compact disks) and LDs (laser disks) are known as optical disks for storing and reproducing audio information and/or moving image information.

A CD is an optical disk having a diameter of 12 cm. A CD carries audio information stored thereon which has been quantized by using a linear PCM method. CDs are widely prevalent as a storage medium for music-oriented applications.

An LD is an optical disk having a diameter of 30 cm. An LD carries moving image information stored thereon in the form of analog signals. LDs are widely prevalent as a storage medium for image-oriented applications such as movies.

In addition to such uses, applications which cannot be distinguished to be either simply music-oriented or image-oriented have emerged, e.g., operas and the recently-evolved music clips (i.e., music accompanied by images).

Herein, those uses which cannot be distinguished as either music-oriented or image-oriented will be referred to as being directed to "image-accompanied music".

In the case of applications of image-accompanied music, it is difficult to know which mode of viewing/listening a user may desire because one user may wish to only listen to the music without viewing the images, while another may wish to enjoy both the music and the images. It is also possible for the same user to desire variable modes of viewing/listening depending on each situation. For example, a user may wish to only listen to music in the case where the user runs an image-accompanied music application on a portable reproduction apparatus while moving around or on a reproduction apparatus mounted in an automobile, but the same user may wish to enjoy both the music and the images when running the image-accompanied music application on a non-portable reproduction apparatus at home.

However, in the case of playback of only the audio information of an image-accompanied music application, merely omitting the image information reproduced from the image-accompanied music application from display may result in an awkward reproduction of those voices or sounds which would only be meaningful when reproduced along with images, e.g., the voices and sounds of an interview in an music clip.

Furthermore, merely omitting from display the image information reproduced from the image-accompanied music application may result in a malfunctioning of the reproduction apparatus due to the omission of the images. For example, in the case where an image menu is omitted from display, it is possible for the application to remain waiting for an input responsive to the undisplayed image menu.

Furthermore, there may be a desire to enjoy higher-quality voices and sounds during audio reproduction than during video reproduction.

SUMMARY OF THE INVENTION

According to the present invention, there is provided an optical disk including: a data region; and a management region, wherein the data region stores: at least one video object containing video information and audio information; and at least one audio object containing audio information, and wherein the management region stores first path information and second path information, the first path information indicating a first reproduction path including only the at least one video object, and the second path information indicating a second reproduction path including a combination of the at least one video object and the at least one audio object.

In one embodiment of the invention, the second path information includes offset information for designating a range to be reproduced of the audio information contained in the at least one video object.

In another embodiment of the invention, the quality of the audio information contained in the at least one audio object is higher than the quality of the audio information contained in the at least one video object.

According to the present invention, there is provided a reproduction apparatus for reproducing an optical disk in a reproduction mode, the optical disk including a data region and a management region, the data region storing: at least one video object containing video information and audio information; and at least one audio object containing audio information, wherein the management region stores first path information and second path information, the first path information indicating a first reproduction path including only the at least one video object, and the second path information indicating a second reproduction path including a combination of the at least one video object and the at least one audio object, the reproduction apparatus including: a reproduction mode determination section for determining whether the reproduction mode is a first reproduction mode for reproducing video information and audio information or a second reproduction mode for reproducing only audio information; and a reproduction section for reproducing the video information and the audio information contained in the at least one video object along the first reproduction path in the case where the reproduction mode is the first reproduction mode, and reproducing the audio information contained in the at least one video object and the audio information contained in the at least one audio object along the second reproduction path in the case where the reproduction mode is the second reproduction mode.

In one embodiment of the invention, the second path information includes offset information for designating a range to be reproduced of the audio information contained in the at least one video object, the reproduction apparatus reproducing a portion of the audio information contained in the at least one video object in accordance with the offset information.

In another embodiment of the invention, the quality of the audio information contained in the at least one audio object is higher than the quality of the audio information contained in the at least one video object.

In still another embodiment of the invention, the reproduction mode can be switched in accordance with an input by a user.

In still another embodiment of the invention, the reproduction apparatus includes a video output terminal for outputting the video information, the reproduction mode being switched in accordance with the state of connection of the video output terminal.

In still another embodiment of the invention, the reproduction apparatus is a reproduction apparatus to be mounted in an automobile, the reproduction mode being switched in accordance with a state of motion of the automobile.

In another aspect of the present invention, there is provided a method for reproducing an optical disk in a reproduction mode, the optical disk including a data region and a management region, the data region storing: at least one video object containing video information and audio information; and at least one audio object containing audio information, wherein the management region stores first path information and second path information, the first path information indicating a first reproduction path including only the at least one video object, and the second path information indicating a second reproduction path including a combination of the at least one video object and the at least one audio object, the reproduction method including the steps of: determining whether the reproduction mode is a first reproduction mode for reproducing video information and audio information or a second reproduction mode for reproducing only audio information; and reproducing the video information and the audio information contained in the at least one video object along the first reproduction path in the case where the reproduction mode is the first reproduction mode, and reproducing the audio information contained in the at least one video object and the audio information contained in the at least one audio object along the second reproduction path in the case where the reproduction mode is the second reproduction mode.

Thus, the invention described herein makes possible the advantages of (1) providing an optical disk capable of switching, in accordance with various modes of viewing/listening as desired by a user, between exclusive reproduction of audio information and reproduction of both video information and audio information without the creation of malfunctions, as well as an apparatus and a method for reproducing such an optical disk; and (2) providing an optical disk which allows the reproduction or playback of higher-quality audio information during audio reproduction than during video reproduction, as well as an apparatus and a method for reproducing such an optical disk.

These and other advantages of the present invention will become apparent to those skilled in the art upon reading and understanding the following detailed description with reference to the accompanying figures.

BRIEF DESCRIPTION OF THE DRAWINGS

FIG. 20A is a diagram showing a specific example of title search pointers of audio manager information and video manager information of an optical disk according to an example of the present invention.

FIG. 20B is a diagram showing a specific example of a PGC structure of an ATS of the AOB point type of an optical disk according to an example of the present invention.

FIG. 20C is a diagram showing a specific example of a PGC structure of an ATS of the VOB point type of an optical disk according to an example of the present invention.

FIG. 23A is a diagram showing a specific example of a title search pointer table according to an example of the present invention.

FIG. 23B is a diagram showing a specific example of a PGC structure of an ATS of the AOB point type according to an example of the present invention.

FIG. 23C is a diagram showing a specific example of a PGC structure of an ATS of the VOB point type according to an example of the present invention.

FIG. 23D is a diagram showing a specific example of audio attributes of an ATS management table according to an example of the present invention.

FIG. 23E is a diagram showing a specific example of audio attributes of an ATS management table according to an example of the present invention.

DESCRIPTION OF THE PREFERRED EMBODIMENTS

Hereinafter, the present invention will be described by way of examples, with respect to the accompanying figures.

EXAMPLE 1

Hereinafter, the structure of an optical disk according to one example of the present invention will be described.

(1) Physical Structure of the Optical Disk

Figure 1A:
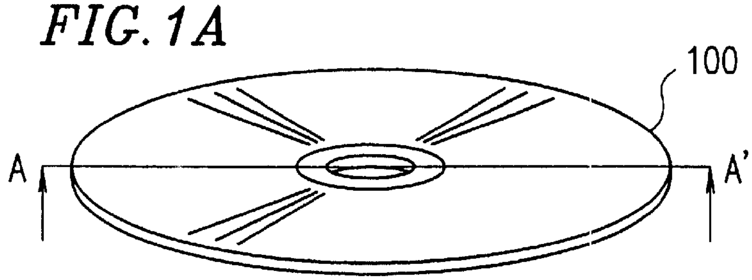
FIG. 1A is a perspective view showing an optical disk according to an example of the present invention.
Figure 1B:
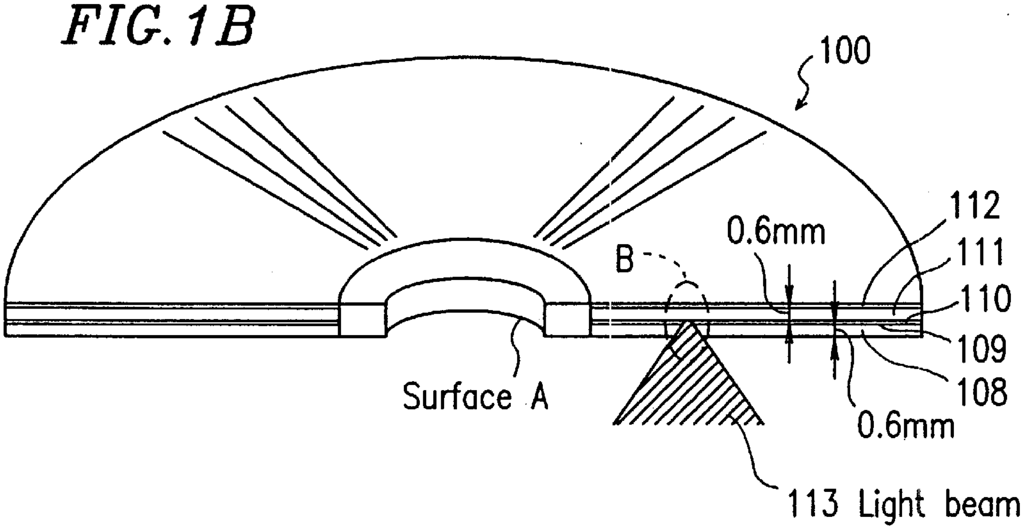
FIG. 1B is a cross-sectional view of an optical disk according to an example of the present invention.
Figure 1C:
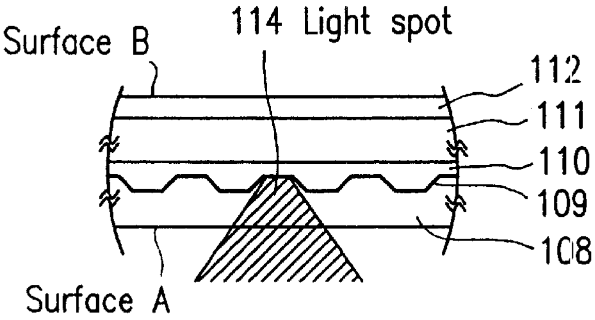
FIG. 1C is an enlarged cross-sectional view of an optical disk according to an example of the present invention.

FIG. 1A is a perspective view showing a DVD 100, which is one type of optical disk. FIG. 1B is a cross-sectional view of the DVD 100 taken along line A–A' in FIG. 1A. FIG. 1C is an enlarged cross-sectional view of portion B shown in FIG. 1B.

As shown in FIG. 1B, the DVD 100 is formed by laminating a first transparent substrate 108, an information layer 109, an adhesive layer 110, a second transparent substrate 111, and a print layer 112 (on which a label is to be printed) in this order.

The first transparent substrate 108 and the second transparent substrate 111 are reinforcement substrates that are formed of the same material. In the example shown in FIG. 1B, these substrates each have a thickness of about 0.6 mm. These substrates can each have a thickness in the range between about 0.5 mm and about 0.7 mm.

The adhesive layer 110 is provided between the information layer 109 and the second transparent substrate 111, thereby adhering the information layer 109 to the second transparent substrate 111.

On the face of the information layer 109 in contact with the first transparent substrate 108 is formed a reflective film (not shown), which is formed of a thin metal film or the like. By using a molding technique, a high density of convex and concave pits are formed on the reflective film.

Figure 1D:
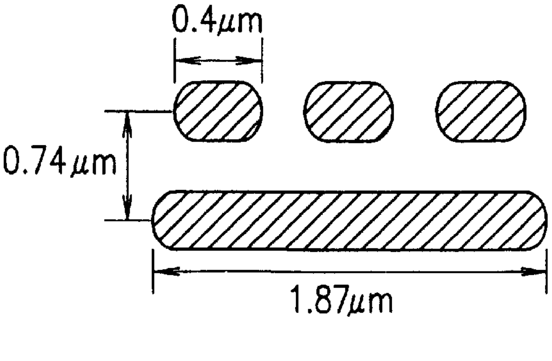
FIG. 1D is a diagram showing the shapes of pits formed on an optical disk according to an example of the present invention.

FIG. 1D shows the shapes of pits formed on the reflective film. In the example shown in FIG. 1D, each pit has a length of 0.4 $\mu$m to 2.054 $\mu$m. A helical track is formed on the DVD 100. The pits are formed alongside the helical track so as to be at a distance of 0.74 $\mu$m from the helical track along a radial direction of the DVD 100. Thus, an array of pits are formed along the helical track.

As shown in FIG. 1C, when a light beam 113 is radiated on the DVD 100, a light spot 114 is formed on the information layer 109. The information stored on the DVD 100 is detected as variation in the reflectance of the portion of the information layer 109 which is illuminated by the light spot 114.

The diameter of the light spot 114 of the DVD 100 is about $1/1.6$ of the diameter of a light spot on a CD (compact disk) because the numerical aperture (NA) of an object lens for DVDs is larger than the numerical aperture (NA) of an object lens for CDs and because the wavelength $\lambda$ of a light beam for DVDs is smaller than the wavelength $\lambda$ of a light beam for CDs.

A DVD having the above-described physical structure can store about 4.7 Gbytes of information on one side. A storing capacity of about 4.7 Gbytes is nearly 8 times the storing capacity of a conventional CD. Such large storing capacity of DVDs makes it possible to greatly improve the quality of moving images. It is also possible to greatly improve the reproduction time length of moving images. In contrast to the reproduction time length of a conventional video CD being 74 minutes, a DVD boasts of a reproduction time length of 2 hours or more.

The fundamental technology which realizes such large storing capacity lies in reduction of the spot diameter D of the light beam. The spot diameter D is calculated from the formula: Spot diameter D=Laser wavelength $\lambda$/Numerical aperture NA of the object lens. Accordingly, the spot diameter D can be minimized by decreasing the laser wavelength $\lambda$ and increasing the numerical aperture NA of the object lens. It should be noted, however, that increasing the numerical aperture NA of the object lens can result in coma aberration due to the relative slant (i.e., "tilt") between the disk surface and the optical axis of the light beam. In the case of DVDs, the coma aberration is minimized by reducing the thickness of a transparent substrate. Reducing the thickness of a transparent substrate can result in a separate problem of lower mechanical strength of the disk. In the case of DVDs, the strength of the transparent substrate is reinforced by attaching another substrate to the transparent substrate, thereby overcoming the problems associated with the mechanical strength of the disk.

A red semiconductor laser having a short wavelength of 650 nm and an object lens having a large numerical aperture (NA) of about 0.6 mm are used to read out the information stored on a DVD. By employing these and additionally a thin transparent substrate having a thickness of about 0.6 mm, it is possible to store about 4.7 Gbytes of information on one side of an optical disk having a diameter of 120 mm.

Figure 2A:
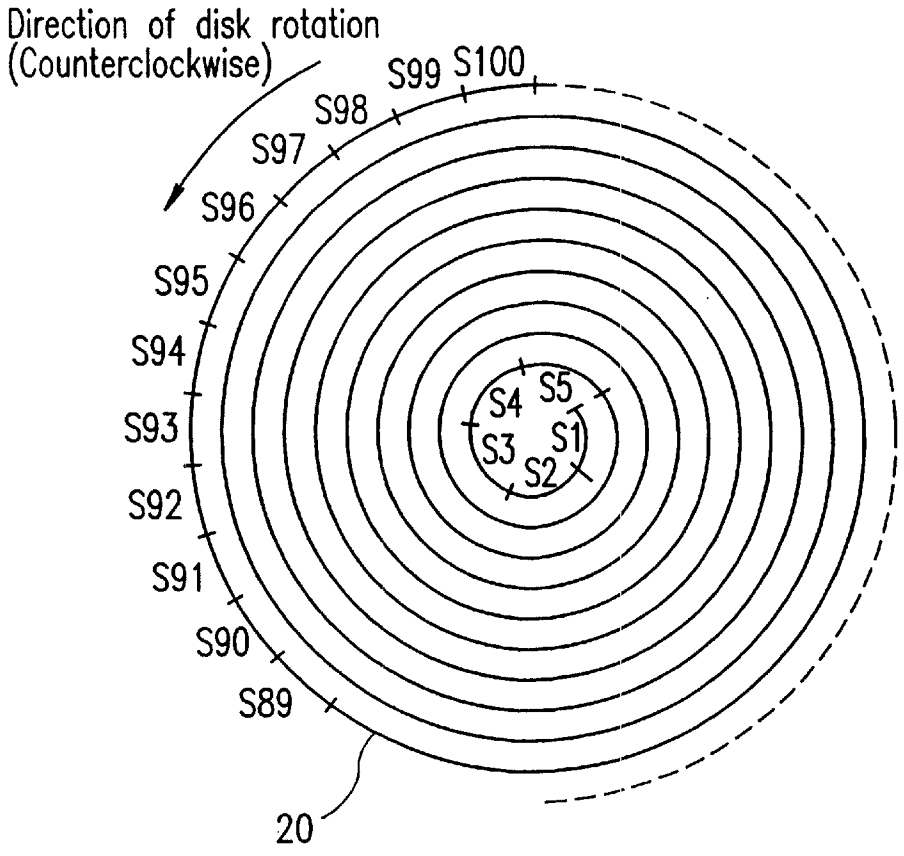
FIG. 2A is a diagram showing the track structure of an optical disk according to an example of the present invention.

FIG. 2A schematically illustrates a helical track 20 being formed from the inner periphery toward the outer periphery of the information layer 109 of the DVD 100. The helical track 20 is divided into predetermined units referred to as sectors. In FIG. 2A, the respective sectors are denoted by numerals S1, S2, . . . , S99, and S100. The reading of the information stored on the DVD 100 is performed on a sector by sector basis.

Figure 2B:
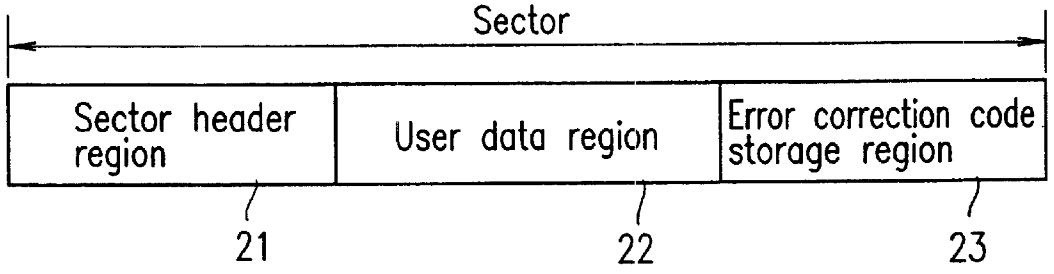
FIG. 2B is a diagram showing the sector structure of an optical disk according to an example of the present invention.

FIG. 2B shows the internal structure of a sector, where the sector includes a sector header region 21, a user data region 22, and an error correction code storage region 23.

The sector header region 21 stores a sector address for identifying the sector and an error detection code thereof. Based on these sector addresses, a disk reproduction apparatus will determine which one of a plurality of sectors information should be read from.

The user data region 22 stores a data string which is 2 Kbytes long.

The error correction code storage region 23 stores error correction codes for the sector header region 21 and the user data region 22 within the same sector. A disk reproduction apparatus will perform error detection by using the error correction codes and performs error correction based on the error detection results, thereby securing reliability of data reading.

(2) Logical Structure of the Optical Disk

Figure 3:
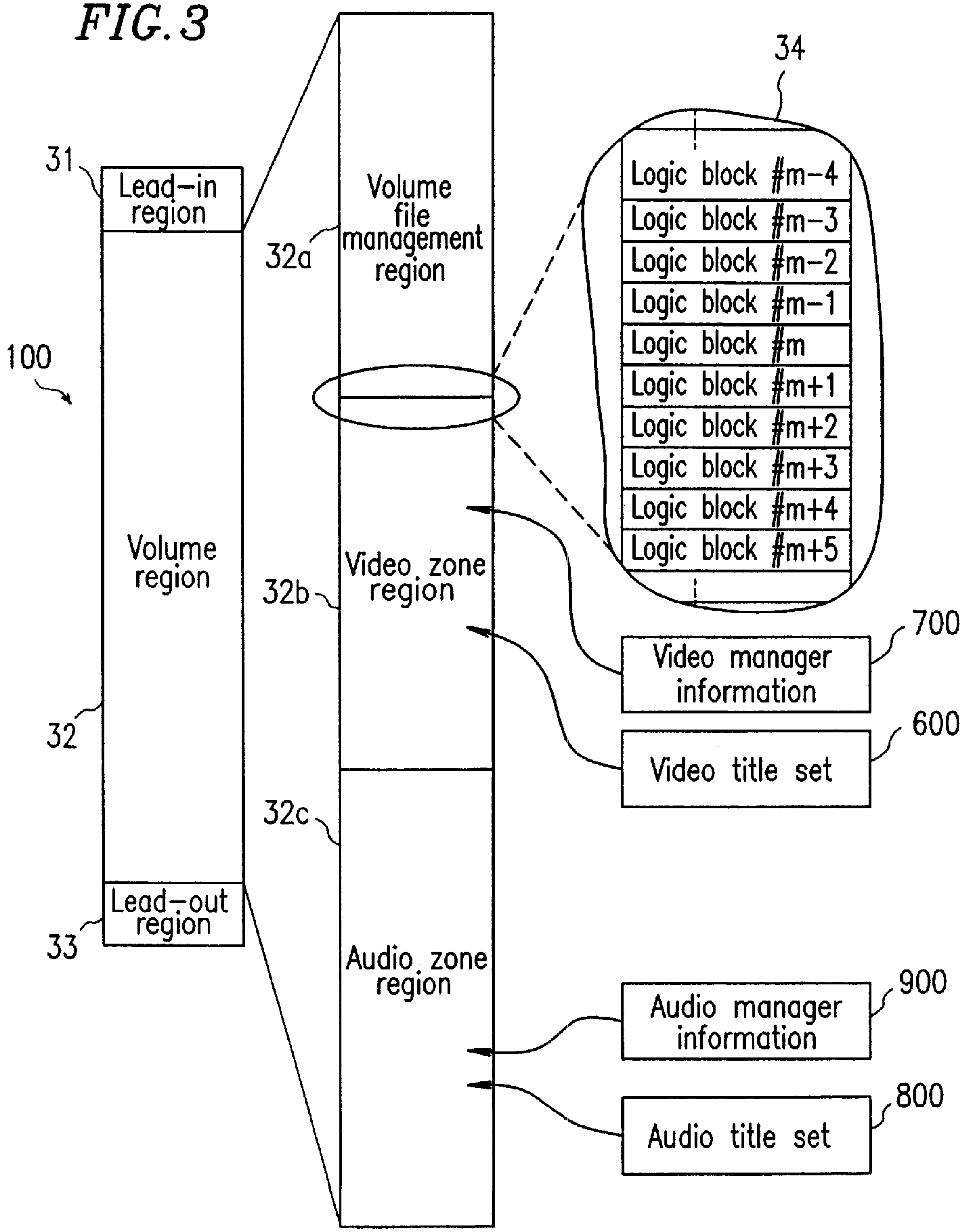
FIG. 3 is a diagram showing the track structure of an optical disk according to an example of the present invention.

FIG. 3 shows the logical structure of a DVD 100 as an optical disk. As shown in FIG. 3, the regions of the DVD 100 are divided into a lead-in region 31, a volume region 32, and a lead-out region 33. These regions can be identified by the identification information included in the sector addresses of physical sectors. The physical sectors are arrayed in an ascending order based on their sector addresses.

In the lead-in region 31, data for stabilizing the operation of a disk reproduction apparatus at the beginning of a read and the like are stored.

No meaningful data is stored in the lead-out region 33. The lead-out region 33 is used for informing a disk reproduction apparatus of the end of reproduction.

The volume region 32 stores digital data corresponding to each application. The physical sectors included in the volume region 32 are managed as logic blocks. The logic blocks are identified by the sequential numbers (logic block numbers) respectively assigned to the physical sectors after the first physical sector (designated as the $0^{th}$ physical sector) in the volume region 32. A portion 34 shown in FIG. 3 shows a group of logic blocks in the volume region 32. In the portion 34, #m, #m+1, #m+2, #m+3, . . . denote the logic block numbers assigned to the respective logic blocks.

As shown in FIG. 3, the volume region 32 is subdivided into a volume file management region 32*a*, a video zone region 32*b*, and an audio zone region 32*c*.

The volume file management region 32*a* stores file system management information for managing a plurality of logic blocks as files in accordance with ISO13346. The file system management information is information indicating the correspondence between the name of each of a plurality of files and the addresses of the logic blocks occupied by that file. A disk reproduction apparatus achieves file-by-file access to the optical disk based on the file system management information. Specifically, the disk reproduction apparatus will refer to the file system management information to obtain the addresses of the logic blocks corresponding to a given file name, and accesses the logic blocks based on these addresses. As a result, the digital data contained in the desired files can be read out.

The video zone region 32*b* stores video manager information 700 and one or more video title sets 600.

A video title set 600 contains a plurality of video data and management information for managing the order of reproducing the plurality of video data. The video title set 600 has a data structure that allows management of the video data in units which are referred to as video titles. For example, if the video title set 600 is a video application, the video titles may correspond to a plurality of video versions, e.g., a theatrical version, non-abridged version, and the like. The specific data structure of the video title set 600 will be described later with reference to FIG. 6.

The video manager information 700 contains information representing a table of contents consisting of a plurality of video title sets 600. Typically, the video manager information 700 includes information required for displaying a video menu for allowing a user to select a desired one of a plurality of video title sets 600 and the management information thereof. The specific data structure of the video manager information 700 will be described later with reference to FIG. 7.

The audio zone region 32*c* stores audio manager information 900 and one or more audio title sets 800.

The audio title set 800 contains a plurality of audio data and management information for managing the order of reproducing the plurality of audio data. The audio title set 800 has a data structure that allows management of the audio data in units which are referred to as audio titles. Typically, an audio title corresponds to a music album containing one or more songs. The audio title set 800 can also contain management information defining the order of reproducing the video data contained in the video title set 600. The specific data structure of the audio title set 800 will be described later with reference to FIGS. 8A and 8B.

The audio manager information 900 contains information representing a table of contents consisting of a plurality of audio title sets 800. The specific data structure of the audio manager information 900 will be described later with reference to FIG. 9.

In FIG. 3, the video title set 600 and the audio title set 800 are each illustrated as one file. In practice, however, the video title set 600 or the audio title set 800 is very often composed of a plurality of consecutive files because moving image data has such an enormous data size that trying to accommodate the entire moving image data into one file may result in a file size of more than 1 GB.

(3) Data Structure of the Video Zone Region 32*b* (FIG. 3)

The video zone region 32*b* stores video manager information 700 and one or more video title sets 600.

(3.1) Data Structure of the Video Title Set 600

Figure 4:
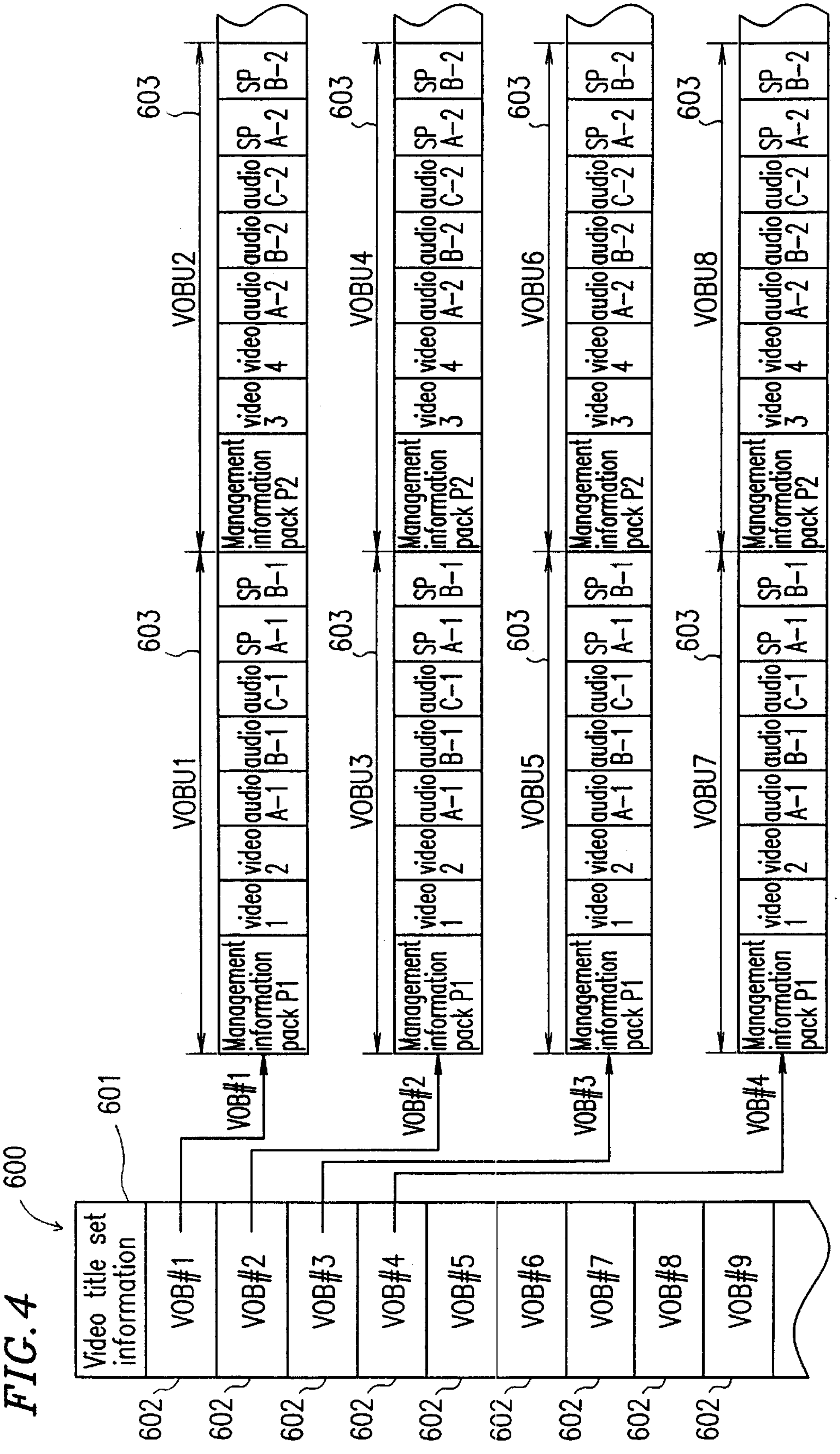
FIG. 4 is a diagram showing the data structure of a video title set according to an example of the present invention.

FIG. 4 shows the data structure of the video title set 600. The video title set 600 includes a plurality of video objects (hereinafter referred to as "VOBs") 602 and video title set information 601 for managing the order of reproducing a plurality of VOBs 602.

In the discussions to follow, a "video title set" may occasionally be referred to as "VTS".

(3.1.1) Data Structure of the VOB 602

A VOB 602 is a piece of multimedia data. A VOB 602 contains digital moving image data, digital audio data, sub-picture data, and management information for the management thereof.

The VOBs 602 have a data structure in accordance with MPEG2 (Moving Picture Expert Group, ISO11172, ISO13818), and are referred to as MPEG2 stream data. A VOB 602 includes a plurality of VOB units (hereinafter referred to as "VOBUs") 603 which are arranged in a chronological order. A VOBU 603 is a reproduction data running about 0.4 seconds to about 1.0 second, and includes a plurality of kinds of pack data 604 (e.g., management information packs, moving image packs, audio packs, and/or sub-picture packs), as indicated ahead of the arrows in FIG. 4. In the example illustrated in FIG. 4, the management information packs are denoted by numerals such as P1 and P2; moving image packs are denoted by numerals such as video 1, video 2, video 3, and video 4; audio packs are denoted by numerals such as audio A-1, audio B-1, audio C-1, audio A-2, audio B-2, and audio C-2; sub-picture packs are denoted by numerals such as SP A-1, SP B-1, SP A-2, and SP B-2.

Each pack data has a data size of 2 Kbytes. By reorganizing a plurality of pack data belonging to each kind of data, a digital data sequence only containing moving image data, a digital data sequence only containing audio data, a digital data sequence only containing sub-picture data, or a digital data sequence only containing control data can be obtained. A digital data sequence obtained by thus reorganizing a plurality of pack data belonging to one kind of data is referred to as an elementary stream.

A VOB 602 may also be referred to as a program stream or system stream containing a plurality of elementary streams. One VOB 602 can include one moving image elementary stream, up to 8 audio elementary streams, and up to 32 sub-picture elementary streams. A moving image elementary stream may be referred to as a main stream of a system stream, while an audio elementary stream and a sub-picture elementary stream may be referred to as sub-streams of the system stream.

The pack data includes a header section and a data section. The header section of a pack data stores identification information for indicating the kind of that pack data. By referring to the identification data, it is possible to identify the pack data as a "moving image pack", an "audio pack", a "sub-picture pack", or a "management information pack".

The data section of a moving image pack stores data which is compressed in accordance with the MPEG method. One VOBU 603 stores moving image data in a GOP-by-GOP manner. A GOP (group of pictures) is defined as image data equivalent to about 12 to 15 frames.

The data section of an audio pack stores audio data corresponding to the moving image data in A VOBU 603 which contains that audio pack. The moving image data and the audio data contained in the same VOBU 603 are reproduced in synchronization. Examples of audio data include linear PCM data or Dolby-AC3 data (see ATSC standard Digital audio Compression (AC3)(Doc.A/52,20 December, 1995). The header section of an audio pack further stores audio sub-stream identification information indicating which one of 8 or less audio sub-streams the audio pack belongs to.

The data section of a sub-picture pack stores graphics data which has been subjected to run length compression. The header section of a sub-picture pack further stores sub-picture sub-stream identification information indicating which one of 32 or less sub-picture sub-streams the sub-picture pack belongs to.

The data section of a management information pack stores address information for trick play modes (e.g., high-speed playback) and control data for accepting user interactions. One example of control data for accepting user interactions is menu information for displaying a menu. The menu information includes information indicating the positions of up to 32 menu items, information indicating the colors of the menu items, and information indicating a control command to be executed when one of the menu items is selected by a user.

Figure 5:
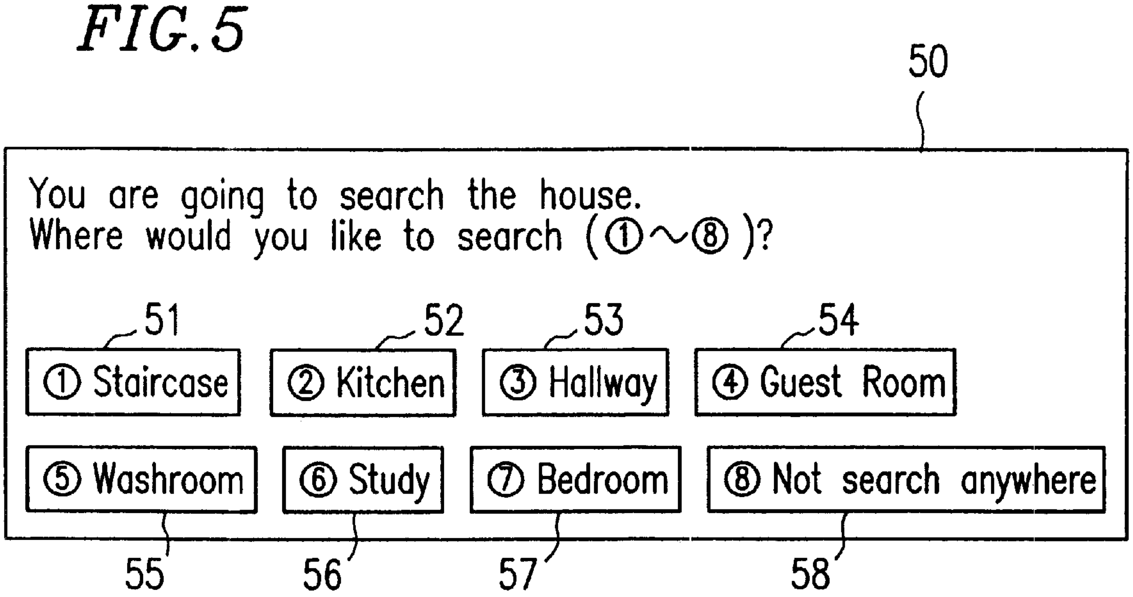
FIG. 5 is a diagram showing how a video menu according to an example of the present invention is displayed.

FIG. 5 shows an exemplary menu. In the example illustrated in FIG. 5, the menu 50 has 8 menu items 51 to 58 respectively representing the information to be reproduced next. For each of the 8 menu items 51 to 58, the menu information defines its position and color, as well as a control command to be executed when that menu item is selected. One of the 8 menu items 51 to 58 is to be selected by a user.

The graphics data for displaying a menu is stored in a sub-picture pack. When a user selects one of the plurality of menu items or confirms such a selected menu item, the color of a graphic corresponding to the selected menu item is changed in accordance with the position information and color information in the management information pack.

When a user confirms a selected menu item, a control command associated with that menu item is executed. Thus, a diversified reproduction control is realized in accordance with instructions from a user.

For conciseness, the pack data included in the VOBUs 603 are shown to be arranged with some regularity in the example of FIG. 4. However, the pack data need not be arranged with any regularity except that the management information pack needs to be located at the beginning of each VOBU 603. For example, the pack data need not be arranged so as to form bundles each containing only one kind of pack data. Rather, the pack data may be shuffled or arranged irrespective of the kinds of pack data, because a disk reproduction apparatus will first buffer the pack data into a buffer section and then read out the pack data from the buffer section. The total number of pack data included in each VOBU 603 and/or the number of pack data of each kind need not be a constant number because the moving image data, audio data, and/or sub-picture data may be variable-length compressed data. In practice, each VOBU 603 will include a different number of pack data.

Two moving image packs are shown to be included in the exemplary VOBU 603 of FIG. 4. However, the number of moving image packs included in an actual VOBU 603 can be on the order of several hundred because the transfer rate of moving image data to a disk reproduction apparatus is about 4.5 Mbits.

(3.1.2) Data Structure of the Video Title Set Information 601

The video title set information 601 includes information for managing the order of reproducing the VOBs 602. Herein, the data which designates the order of reproducing the VOBs 602 is referred to as a program chain (PGC). Different PGCs can define different orders by which the VOBs 602 are reproduced.

Figure 6:
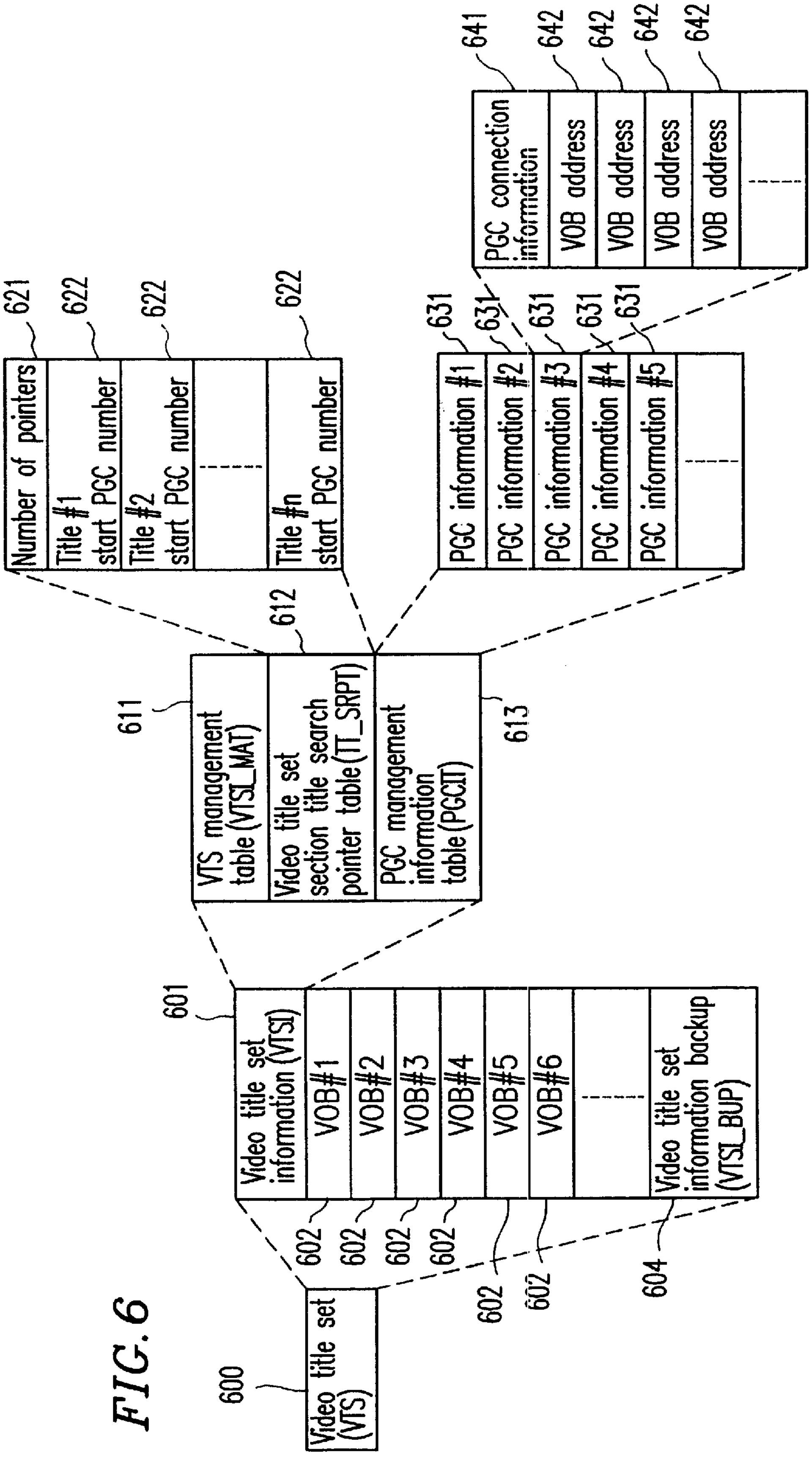
FIG. 6 is a diagram showing the data structure of a video title set according to an example of the present invention.

FIG. 6 shows the data structure of the video title set information 601. As shown in FIG. 6, the video title set information (VTSI) 601 includes a VTS management table (VTSI_MAT) 611, a video title set section title search pointer table (TT_SRPT) 612, and a PGC management information table (PGCIT) 613.

The VTS management table 611 serves as header information of the video title set information 601. The VTS management table 611 includes a pointer indicating the position at which the video title set section title search pointer table 612 is stored and a pointer indicating the position at which the PGC management information table 613 is stored.

The video title set section title search pointer table 612 includes the number of pointers 621 and a plurality of start PGC numbers 622. A start PGC number 622 is an index indicating the PGC information 631 to be executed first among the plurality of PGC information units 631 stored in the PGC management information table 613. A start PGC number 622 is designated for each title. For example, if the value of the start PGC number 622 corresponding to title#1 is "3", it indicates that PGC information#3 is to be executed first for title#1.

The PGC management information table 613 includes a plurality of PGC information units 631 (i.e., PGC informational to PGC information#n). The PGC information 631 defines the position at which one or more VOBs 602 are stored on the disk and the order of reproducing such VOBs 602. It is possible for different PGC information units 631 to describe the reproduction of the same VOBs 602. Therefore, it is possible to designate a plurality of reproduction orders for the same VOBs 602. For example, if the PGC information 631 defines reproduction of VOBs 602 in the order of VOB#1, VOB#2, VOB#3, and VOB#4, the VOBs 602 will be reproduced in the order of VOB#1, VOB#2, VOB#3, and VOB#4. If the PGC information 631 defines reproduction of VOBs 602 in the order of VOB#3, VOB#2, VOB#1, and VOB#4, the VOBs 602 will be reproduced in the order of VOB#3, VOB#2, VOB#1, and VOB#4.

The PGC information 631 includes PGC connection information 641 and one or more VOB addresses 642.

The PGC connection information 641 stores the indices of the PGC information units 631 to be jointed before and after the PGC information 631. For example, the PGC connection information 641 of PGC information#3 stores the index of the PGC information 631 (e.g., PGC information#1) to be jointed before PGC information#3 and the index of the PGC information 631 (e.g., PGC information#5) to be jointed after PGC information#3. Once the reproduction of one PGC information 631 is complete, a disk reproduction apparatus determines the next PGC information 631 in accordance with the PGC connection information 641 and continues the reproduction control in accordance with the next PGC information 631.

The VOB address 642 is information indicating the position (on the optical disk) of the VOB 602 to be reproduced. The order of the VOB addresses 642 within the PGC information 631 represents the order by which the VOBs 602 are reproduced by a disk reproduction apparatus.

(3.2) Data Structure of the Video Manager Information 700

The video manager information 700 is information for reproduction control that is to be first referred to when the optical disk is reproduced by a disk reproduction apparatus in a video-oriented manner.

Figure 7:
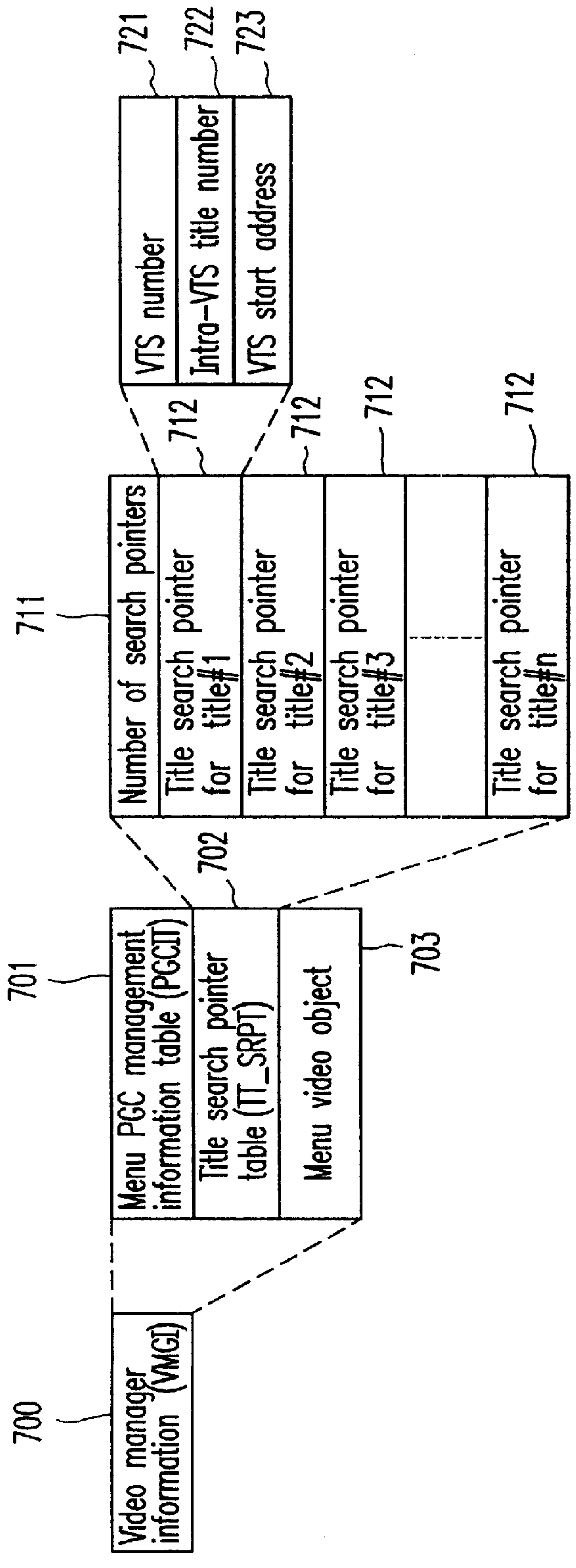
FIG. 7 is a diagram showing the data structure of a video manager according to an example of the present invention.

FIG. 7 shows the data structure of the video manager information 700.

The data structure of the video manager information 700 is in compliance with the data structure of the video title set 600 shown in FIG. 6. The difference between the VOBs of the video manager information 700 and the VOBs of the video title set 600 is that the VOBs of the video manager information 700 are specialized for volume menus.

Herein, a "volume menu" is defined as a menu for displaying all of the titles stored on an optical disk to allow a user to select one of the titles. A volume menu is displayed on screen immediately after an optical pickup has moved from the volume file management region 32*a* to the video zone region 32*b* of the optical disk, following loading of the optical disk into a disk reproduction apparatus.

As shown in FIG. 7, the video manager information (VMGI) 700 includes video object 703 for a menu, a PGC management information table (PGCIT) 701 for a menu, and a title search pointer table (TT_SRPT) 702.

The video object 703 for a menu is, as its name indicates, a VOB which is specialized for use in a volume menu. The video object 703 for a menu includes a sub-picture pack for displaying a volume menu and a management information pack for performing a reproduction control in response to a cursor manipulation and/or confirmation operation for the volume menu.

The PGC management information table 701 for a menu is PGC information which is specialized for use in a volume file. In the PGC management information table for a menu 701, the position at which the video object 703 for a menu is stored is described so that the video object 703 for a menu will be read when the optical disk is loaded in a disk reproduction apparatus. This PGC information is read immediately after an optical pickup has moved from the volume file management region 32*a* to the video zone region 32*b*, following loading of the optical disk into a disk reproduction apparatus. As a result, a volume menu is displayed on screen.

The title search pointer table 702 includes the number (i.e., a VTS number 721) of the video title set to which each title belongs and an index 712 for specifying the title number (i.e., an intra-VTS title number 722) assigned to each title within that video title set.

(4) Data Structure of the Audio Zone Region 32*c*

The audio zone region 32*c* stores audio manager information 900 and one or more audio title sets 800.

(4.1) Data Structure of the Audio Title Set 800

Figure 8A:
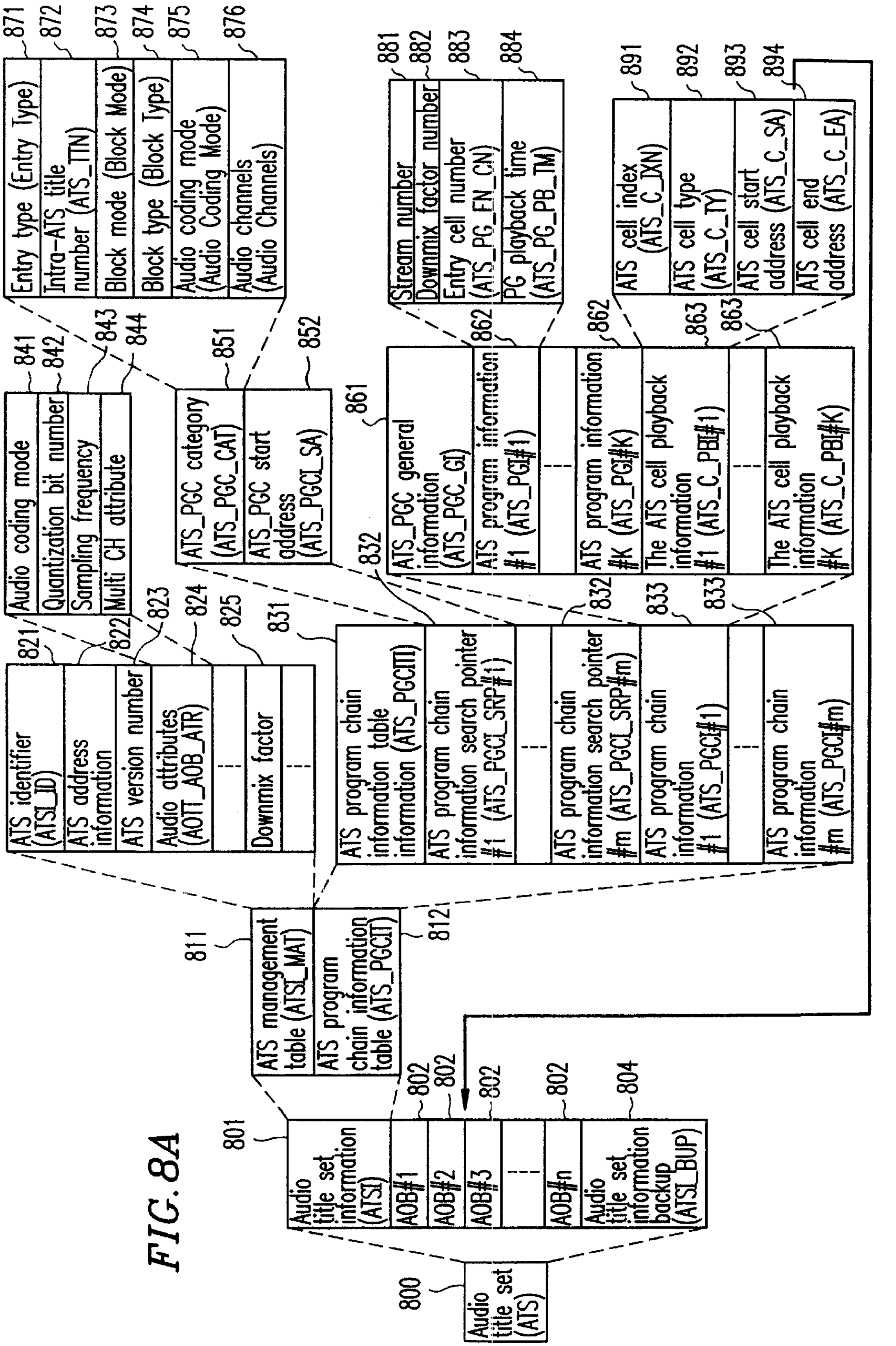
FIG. 8A is a diagram showing the data structure of an audio title set of an AOB point type according to an example of the present invention.

FIG. 8A shows the data structure of the audio title set 800. The audio title set 800 includes a plurality of audio objects (hereinafter referred to as "AOBs") 802, audio title set information (ATSI) 801 for managing the order of reproducing a plurality of AOBs 802, and audio title set information backup (ATSI_BUP) 804 (which is backup data of the audio title set information 801).

In the discussions to follow, an "audio title set" may occasionally be referred to as "ATS".

(4.1.1) Data Structure of the AOB 802.

The AOB 802 is grouped into packets of 2 Kbytes. The AOB 802 stores data in the LPCM format, AC3 format, MPEG Audio format (see ISO/IEC DIS 13818-3: July, 1996), DTS format (see DTS Coherent Acoustics "Delivering high quality multichannel sound to the consumer" presented at the $100^{th}$ Convention, May 11–14, 1996, Copenhagen AES) or SDDS format (see SDDS Specification for Disc (Version 1.0)-Digital audio multi-channel coding, Sony Corporation). In the case of LPCM, the sample bit is 16, 20, or 24 bits, with a sampling frequency of 48 kHz, 96 kHz, 192 kHz, 44.1 kHz, 88.2 kHz, or 176.4 kHz.

(4.1.2) Data Structure of the Audio Title Set Information 801

The audio title set information (ATSI) 801 includes information for managing the order of reproducing the AOBs 802. The order of reproducing the AOBs 802 is designated by a program chain (PGC), as in the case of VOBs 602. Different PGCs can define different orders by which the AOBs 802 are reproduced.

As shown in FIG. 8A, the audio title set information (ATSI) 801 includes an ATS management table (ATSI_MAT) 811 and an ATS program chain information table (ATS_PGCIT) 812.

The ATS management table 811 serves as header information of the audio title set information 801. The ATS management table 811 includes a pointer indicating the region in which the ATS program chain information table 812 is stored and a pointer indicating the region in which the AOB 802 is stored.

The ATS management table 811 includes an ATS identifier (ATSI_ID) 821, ATS address information 822, an ATS version number 823, audio attributes (AOTT_AOB_ATR) 824, and a downmix factor 825.

The ATS identifier 821 stores a string of letters indicating the title set being an ATS.

The ATS address information 822 will be described later.

The ATS version number 823 stores the version number of the standard defining the data structure of the audio title set information 801.

The audio attributes 824 store 8 kinds of audio stream attributes. Each AOB 802 included in an audio title set 800 is to be reproduced in accordance with one of the 8 kinds of audio stream attributes. The audio attributes 824 include an audio coding mode 841, a quantization bit number 842, a sampling frequency 843, and a multi CH (channel) attribute 844.

The audio coding mode 841 describes a code representing LPCM or a compression method. The quantization bit number 842 describes a code representing 16, 20, or 24 bits. The sampling frequency 843 describes a code representing 48 kHz, 96 kHz, 192 kHz, 44.1 kHz, 88.2 kHz, or 176.4 kHz. The multi CH attribute 844 describes a code representing, for example, how to use each channel in the case of a multi CH system. Any unused field in the audio attributes 824 stores the value "0".

The downmix factor 825 stores 16 kinds of factors to be used in downmixing the respective channels of a multi CH system into 2 CH. One of the 16 kinds of factors stored in the downmix factor 825 is selectively referred to by ATS program information (ATS_PGI) 862 of program chain information (ATS_PGCI) 833 (described later). Thus, the downmix factor can be changed from program to program.

As shown in FIG. 8A, the ATS program chain information table 812 includes ATS program chain information table information (ATS_PGCITI) 831, a plurality of ATS program chain information search pointers (ATS_PGCI_SRP) 832, and a plurality of ATS program chain information (ATS_PGCI) units 833.

The ATS program chain information table information 831 describes the number of ATS program chain information search pointers 832, and the last address of the ATS program chain information table 812. The ATS program chain information table information 831 is used for assisting in the search of the ATS program chain information search pointers 832.

Each ATS program chain information search pointer 832 includes ATS_PGC category (ATS_PGC_CAT) 851 describing the title numbers within the ATS and the category of the PGC, and an ATS_PGC start address (ATS_PGCI_SA) 852 indicating the position at which the ATS program chain information is stored.

The ATS program chain information 833 includes ATS_PGC general information (ATS_PGC_GI) 861 (including the playback (reproduction) time and address information concerning this program chain), a plurality of ATS cell playback (reproduction) information units (ATS_C_PBI) 863 (including the addresses and attributes of cells, which are minimal reproduction units of an AOB 802), and a plurality of ATS program information units (ATS_PGI) 862.

Each of the plurality of ATS program information units 862 includes a stream number 881, a downmix factor number 882 indicating the number of the downmix factor (i.e., index for one of the 16 kinds of factors included in the downmix factor 825 of the ATS management table 811) used when downmixing multi CH into 2 CH, an entry cell number (ATS_PG_EN_CN) 883 indicating the ATS cell number to be reproduced first among the plurality of ATS cells included in the program, and PG (program) playback time (ATS_PG_PB_TM) 884.

The stream number 881 is a number for specifying one of the 8 kinds of audio stream attributes defined by the audio attributes 824 of the ATS management table 811. The audio stream is reproduced in accordance with the audio attributes 824 specified by the stream number 881. Thus, an audio stream can be reproduced in accordance with different audio attributes, depending on the program.

Thus, the ATS program chain information 833 describes the position (on the disk) at which one or more AOBs, 802 are stored and the order of reproducing the AOBs 802. It is possible for different ATS program chain information units 833 to describe the reproduction of the same AOBs 802. Therefore, it is possible to designate a plurality of reproduction orders for the same AOBs 802. For example, if ATS program chain information unit 833 defines reproduction of AOBs 802 in the order of AOB#1, AOB#2, AOB#3, and AOB#4, the AOBs 802 will be reproduced in the order of AOB#1, AOB#2, AOB#3, and AOB#4. If the ATS program chain information unit 833 defines reproduction of AOBs 802 in the order of AOB#3, AOB#2, AOB#1, and AOB#4, the AOBs 802 will be reproduced in the order of AOB#3, AOB#2, AOB#1, and AOB#4.

The audio title sets 800 can be classified into those which point to AOBs 802 ("AOB point type") and those which point to VOBs 602 ("VOB point type") instead of AOBs 802. The data structure shown in FIG. 8A is the data structure of an audio title set 800 of an AOB point type.

Figure 8B:
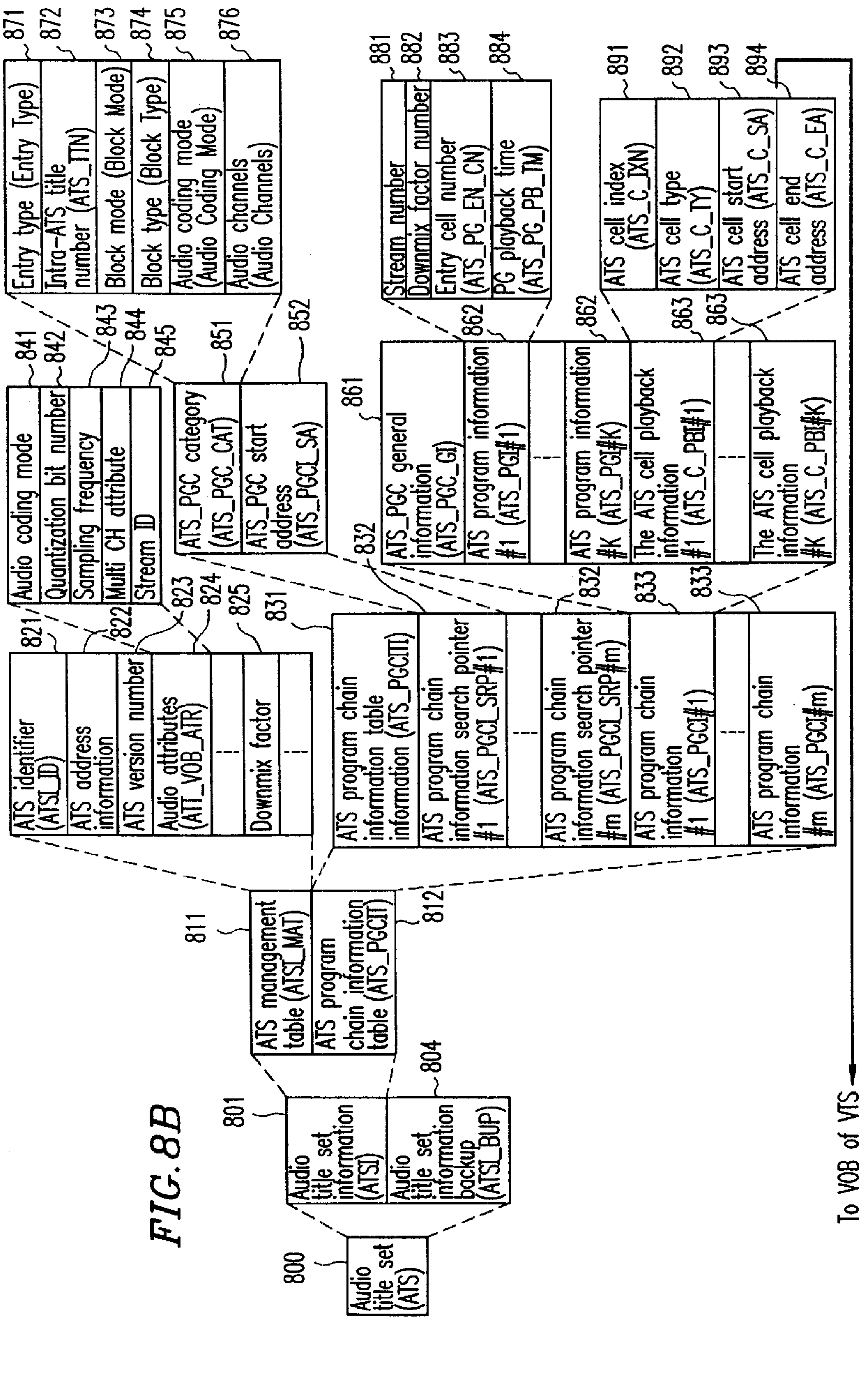
FIG. 8B is a diagram showing the data structure of an audio title set of a VOB point type according to an example of the present invention.

FIG. 8B shows the data structure of an audio title set 800 of the VOB point type. The data structure shown in FIG. 8B is identical with the data structure shown in FIG. 8A except that the audio title set 800 of FIG. 8B does not include a plurality of AOBs 802. Moreover, the respective attribute information units include descriptions which are specific to VOBs 602.

Specifically, the address information of the VTS 600 to which the VOB 602 belongs and the address information of the VOB 602 are described in the ATS address information 822 of the ATS management table 811. In the audio attributes 824 of the ATS management table 811, the description of a stream ID 845 for specifying which one of the sub-streams included in the VTS 600 is to be reproduced is additionally included as well as the audio attributes defined in the VOB 602. The sampling frequency 843 of the audio attributes 824 is limited to either 48 kHz or 96 kHz. A code representing LPCM, AC3, MPEG Audio, DTS or SDDS can be described in the audio coding mode 841. The downmix factor 825 of the ATS management table 811 is filled with "0"s, indicating that the downmix factor 825 is not used.

An audio coding mode 875 of the ATS_PGC category 851 describes a code defined in the VOB 602.

An ATS cell start address (ATS_C_SA) 893 and an ATS cell end address (ATS_C_EA) 894 of the ATS cell playback information 863 describe the address of a cell of a VOB 602.

Figure 8C:
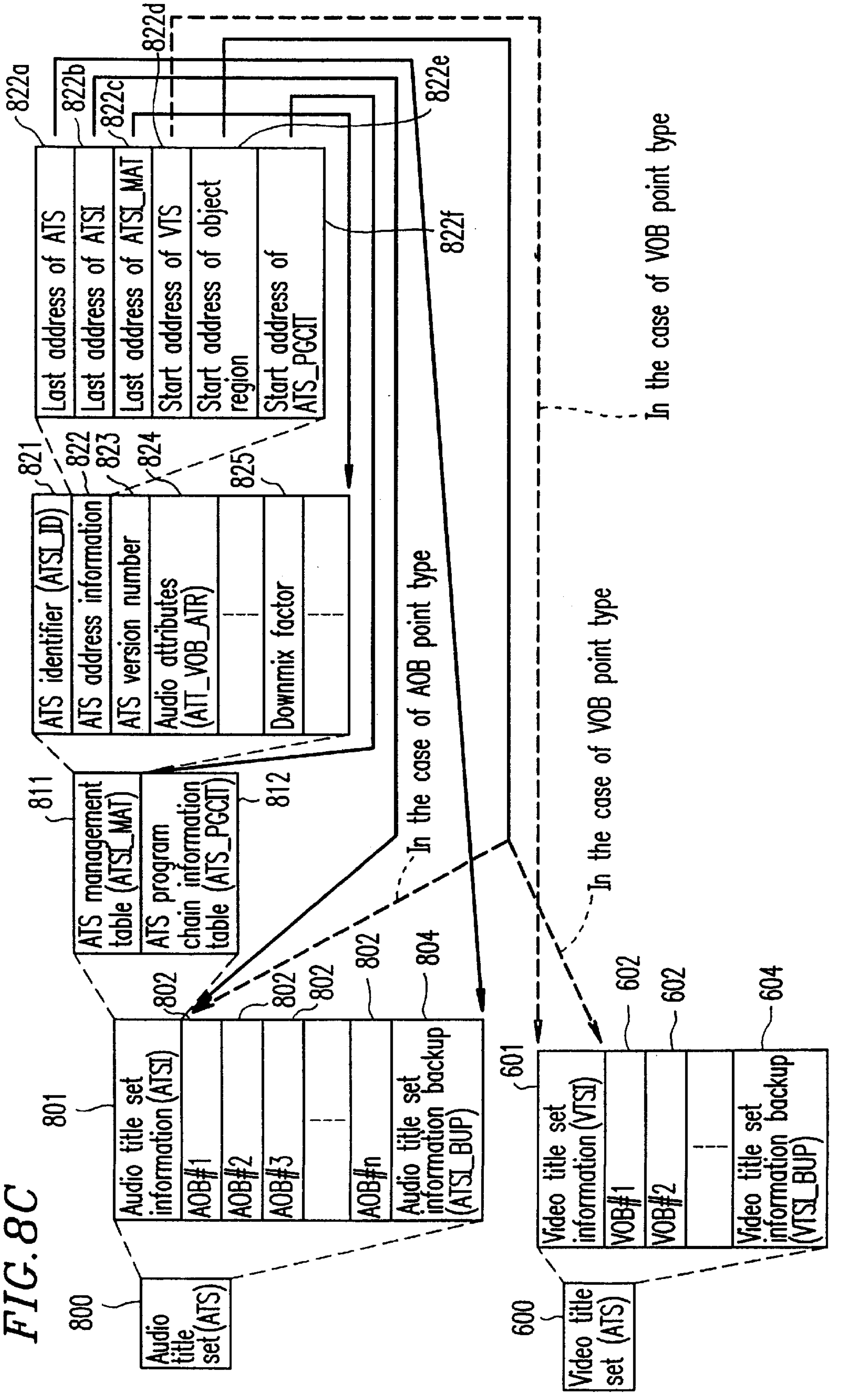
FIG. 8C is a diagram showing the data structure of ATS address information of an ATS management table of an audio title set according to an example of the present invention.

FIG. 8C shows the data structure of the ATS address information 822.

The ATS address information 822 includes the last address 822*a* of the audio title set 800, the last address 822*b* of the audio title set information 801, the last address 822*c* of the ATS management table 811, the start address 822*d* of a video title set 600, the start address 822*e* of an object region, and the start address 822*f* of the ATS program chain information table 812. In FIG. 8C, the arrows from the ATS address information 822 represent the locations to which the respective addresses point.

In the case where the audio title set 800 is of an AOB point type (FIG. 8A), the start address 822*d* of the video title set 600 of the ATS address information 822 is filled with "0"s. In the case where the audio title set 800 is of a VOB point type (FIG. 8B), the start address 822*d* of the video title set 600 stores the start address of the video title set 600 to which VOBs 602 belong. Therefore, the audio title set 800 is of an AOB point type if the value "0" is stored in the field 822*d* of the ATS address information 822; otherwise the audio title set 800 is of a VOB point type.

Thus, an audio title set 800 can be identified as either an AOB point type or a VOB point type by referring to the field 822*d* of the ATS address information 822.

In the case where the audio title set 800 is of an AOB point type, the start address of AOB#1 is stored in the start address 822*e* of an object region. In the case where the audio title set 800 is of a VOB point type, the start address of VOB#1 is stored in the start address 822*e* of an object region.

Thus, the reproduction order of AOBs 802 or VOBs 602 can be determined based on an audio title set as one unit.

(4.2) Data Structure of the Audio Manager Information 900

The audio manager information 900 is information for reproduction control that is to be referred to first when the optical disk is reproduced by a disk reproduction apparatus in an audio-oriented manner.

Figure 9:
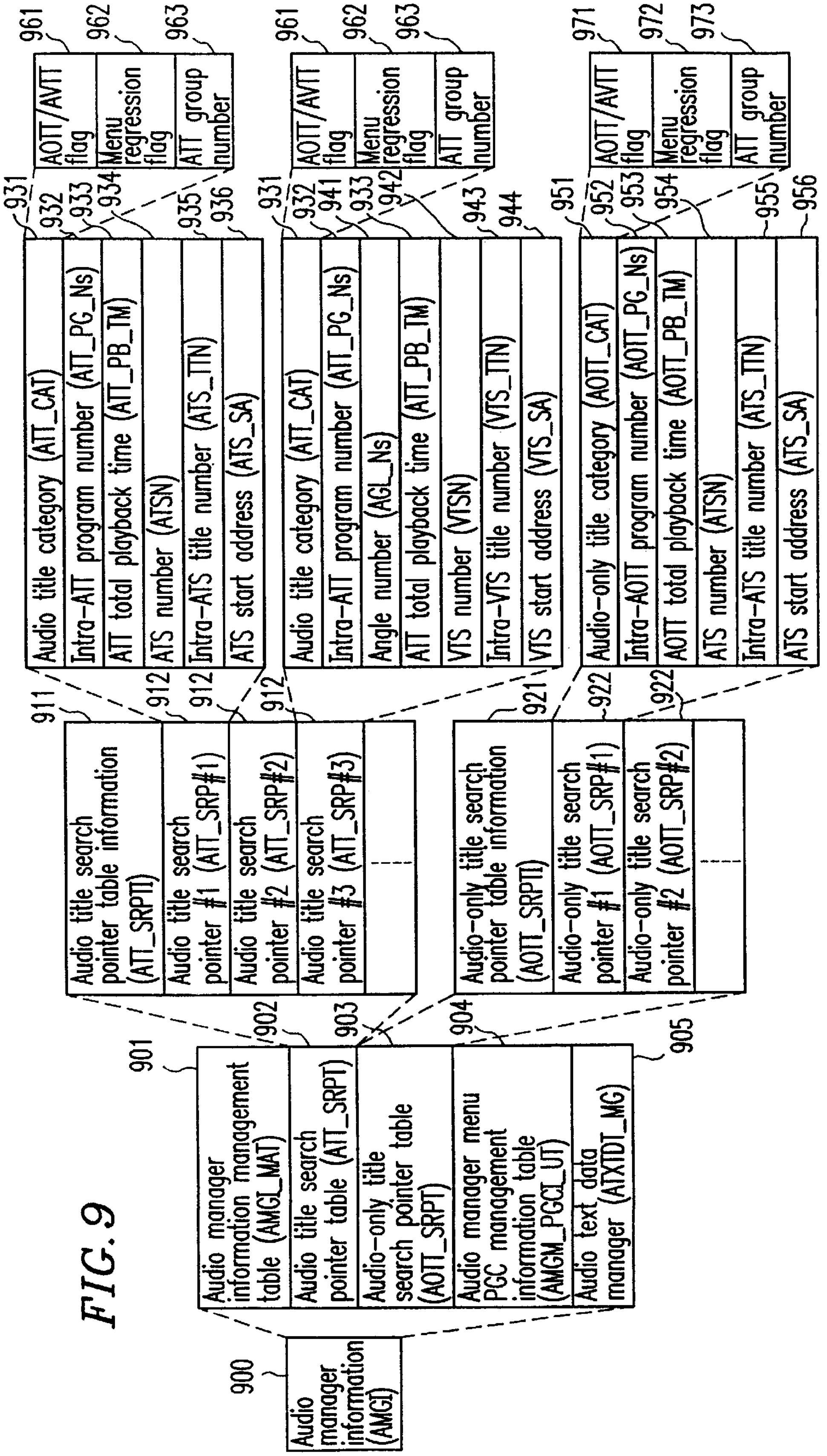
FIG. 9 is a diagram showing the data structure of an audio manager according to an example of the present invention.

FIG. 9 shows the data structure of the audio manager information 900.

The audio manager information (AMGI) 900 includes an audio manager information management table (AMGI_MAT) 901, an audio title search pointer table (ATT_SRPT) 902, an audio-only title search pointer table (AOTT_SRPT) 903, an audio manager menu PGC management information table (AMGM_PGCI_UT) 904, and an audio text data manager (ATXTDT_MG) 905.

The audio manager information management table 901 stores the attributes of the audio manager information 900, the address information of various tables, and the like.

The audio title search pointer table 902 includes audio title search pointer table information (ATT_SRPTI) 911 and a plurality of audio title search pointers (ATT_SRP) 912.

The audio title search pointer table information 911 stores the number of audio titles and the last address of the audio title search pointer table 902.

The audio title search pointer 912 stores different kinds of information depending on whether to designate the title of an ATS or the title of an VTS. When designating the title of an ATS, the audio title search pointer 912 stores an ATS number 934, an intra-ATS title number 935, and an ATS start address 936. When designating the title of a VTS, the audio title search pointer 912 stores a VTS number 942, an intra-VTS title number 943, a VTS start address 944, and an angle number 941.

An audio title category 931 of the audio title search pointer 912 includes an AOTT/AVTT flag 961, a menu regression flag 962, and an ATT group number 963.

When designating the title of an ATS, the AOTT/AVTT flag 961 stores a code representing AOTT. When designating the title of a VTS, the AOTT/AVTT flag 961 stores a code representing AVTT.

The menu regression flag 962 stores a flag indicating whether or not to return to a menu after the reproduction of a designated title.

The ATT group number 963 stores the number of a title group to which the designated title belongs. Herein, a title group is defined as a concept under which it is ensured that a plurality of titles belonging to the same title group are consecutively reproduced. The ATT group number 963 is provided in order to allow consecutive reproduction of a plurality of titles without performing a reproduction control based on complicated navigation information.

The audio title search pointer table 902 is referred to by an audio player having a video function.

The audio-only title search pointer table 903 has a data structure similar to that of the audio title search pointer table 902. However, the title of a VTS is never designated by using an audio-only title search pointer table 903.

The audio-only title search pointer table 903 is referred to by an audio player having only an audio output.

The audio manager menu PGC management information table 904 describes the reproduction order of menus.

The audio text data manager 905 stores information for displaying text information.

Hereinafter, a disk reproduction apparatus for reproducing the information stored on the DVD 100 will be described.

Figure 10:
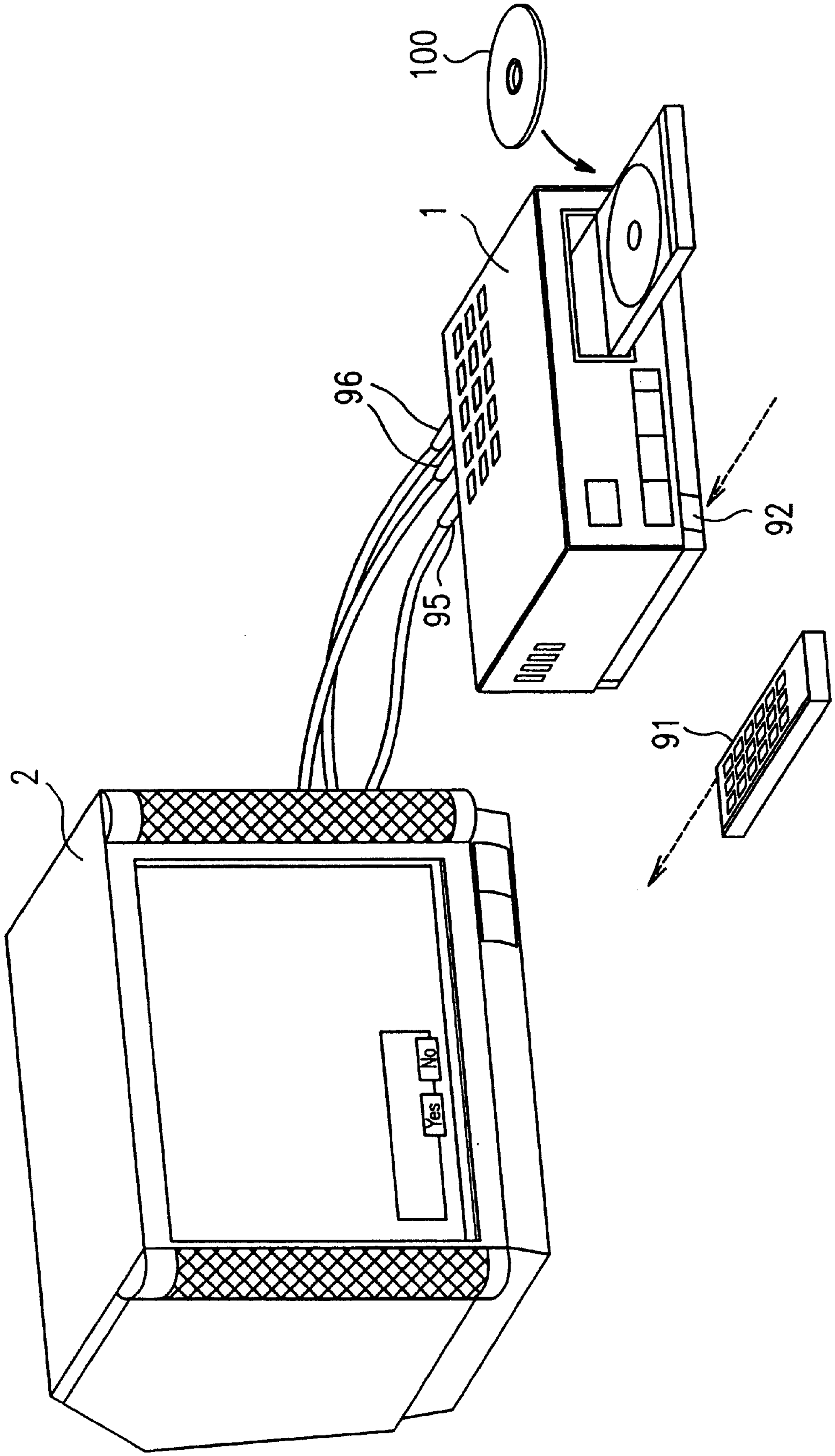
FIG. 10 is a perspective view showing a DVD player according to an example of the present invention and a television monitor coupled thereto.

FIG. 10 shows a DVD player 1 as a reproduction apparatus for the DVD 100, a television monitor 2 coupled to DVD player 1, and a remote control 91.

The DVD player 1 has an opening in the front face of its body. A drive mechanism (not shown) for loading the DVD 100 is provided along the depth direction of the opening.

In the front face of the DVD player 1 is provided a remote control reception section 92 having a photosensitive element for receiving infrared rays from the remote control 91. As a user operates on the keys of the remote control 91, an infrared ray which is in accordance with the key input by the user is generated from the remote control 91. In response to a received infrared ray, the remote control reception section 92 generates an interrupt signal indicative of the reception of a key signal from the remote control 91.

In the back face of the DVD player 1 are provided a video output terminal 95 and an audio output terminal 96. By connecting an AV (audio-visual) cord to these output terminals, a video signal which is reproduced from the DVD 100 can be output on the large television monitor 2 for in-home use. Thus, a user can enjoy the images reproduced from the DVD 100 by employing a relatively large television for in-home use, e.g., 33 inches, 35 inches or the like.

As will be appreciated from the above description, the DVD player 1 is not to be used while being connected to a computer apparatus such as a personal computer, but is used as a home electric appliance while being connected to the television monitor 2.

The remote control 91 includes a plurality of keys on an operation panel on its body surface, the keys being energized with springs. Thus, the remote control outputs a code corresponding to a pressed key in the form of an infrared ray.

Figure 11:
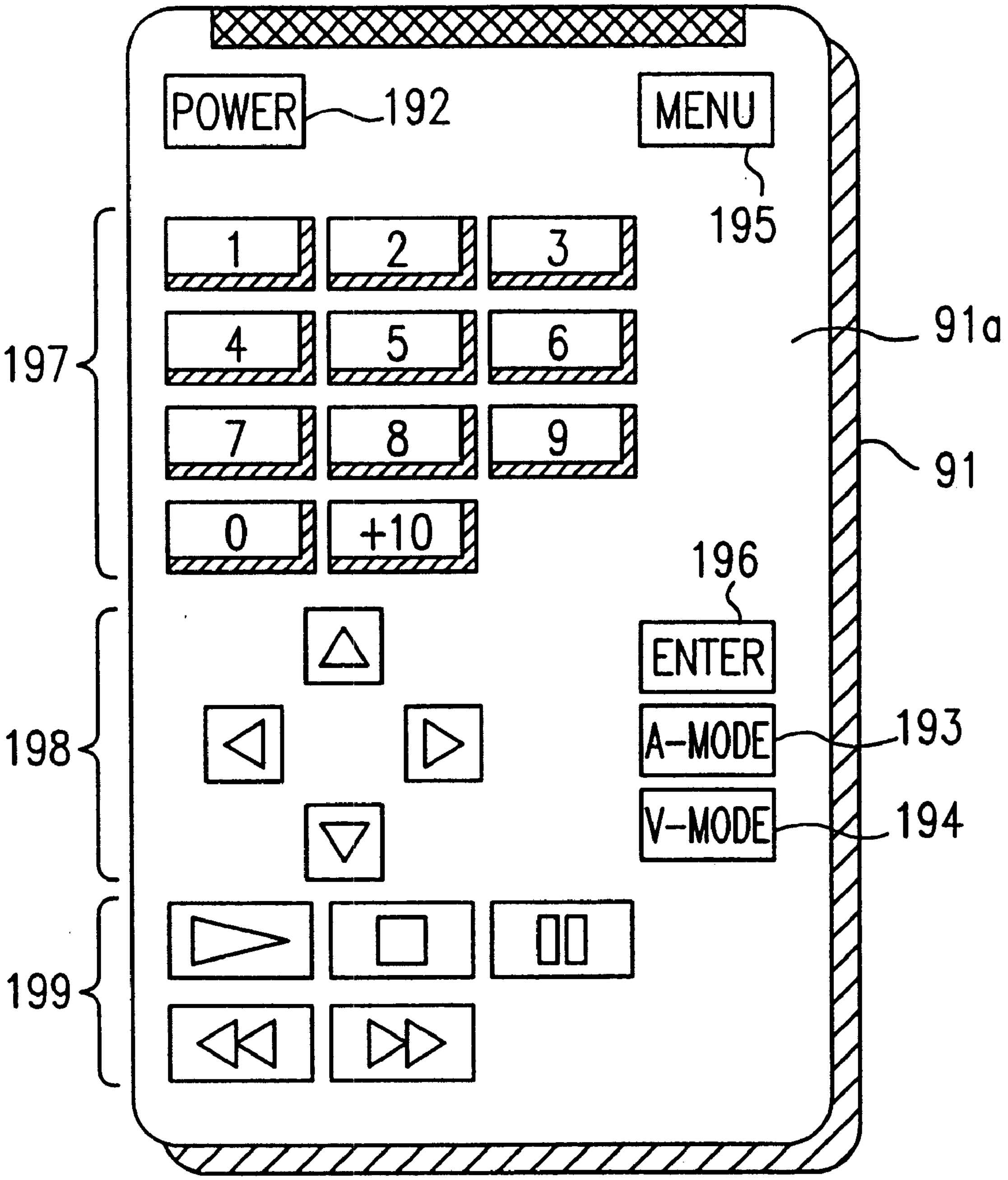
FIG. 11 is a view showing a remote control—according to an example of the present invention.

FIG. 11 shows the operation panel 91*a* of the remote control 91. Various operation keys are provided on the operation panel 91*a:*

A "POWER" key 192 is used turn the power of the DVD player 1 ON or OFF.

An "A-MODE" key 193 is used to designate an audio-oriented reproduction mode. When the "A-MODE" key 193 is pressed, the remote control 91 transfers a code representing an audio-oriented reproduction mode to the DVD player 1.

A "V-MODE" key 194 is used to designate a video-oriented reproduction mode. When the "V-MODE" key 194 is pressed, the remote control 91 transfers a code representing a video-oriented reproduction mode to the DVD player 1.

A "MENU" key 195 is used to call up a volume menu of the DVD 100 during the reproduction of video information or audio information in accordance with a program chain.

Ten keys 197 are used to give instructions such as a chapter jump in the case of a movie, or selection of a song in the case of music.

Cursor keys 198 are used to move a cursor in an up, down, right, or left direction to select an item.

An "ENTER" key 196 is used to confirm the item which has been selected by the cursor. When the cursor is on an item, that item is displayed in a "selected" color as designated by the item color information of the management information pack. Once the selection of an item is confirmed by pressing the "ENTER" key 196, the item is displayed in a "confirmed" color as designated by the item color information of the management information pack.

Keys 199 are used to give instructions such as "play", "stop", "pause", "fast forward", "rewind", and the like to the DVD player 1. The keys 199 are commonly used on other AV apparatuses as well.

Figure 12:
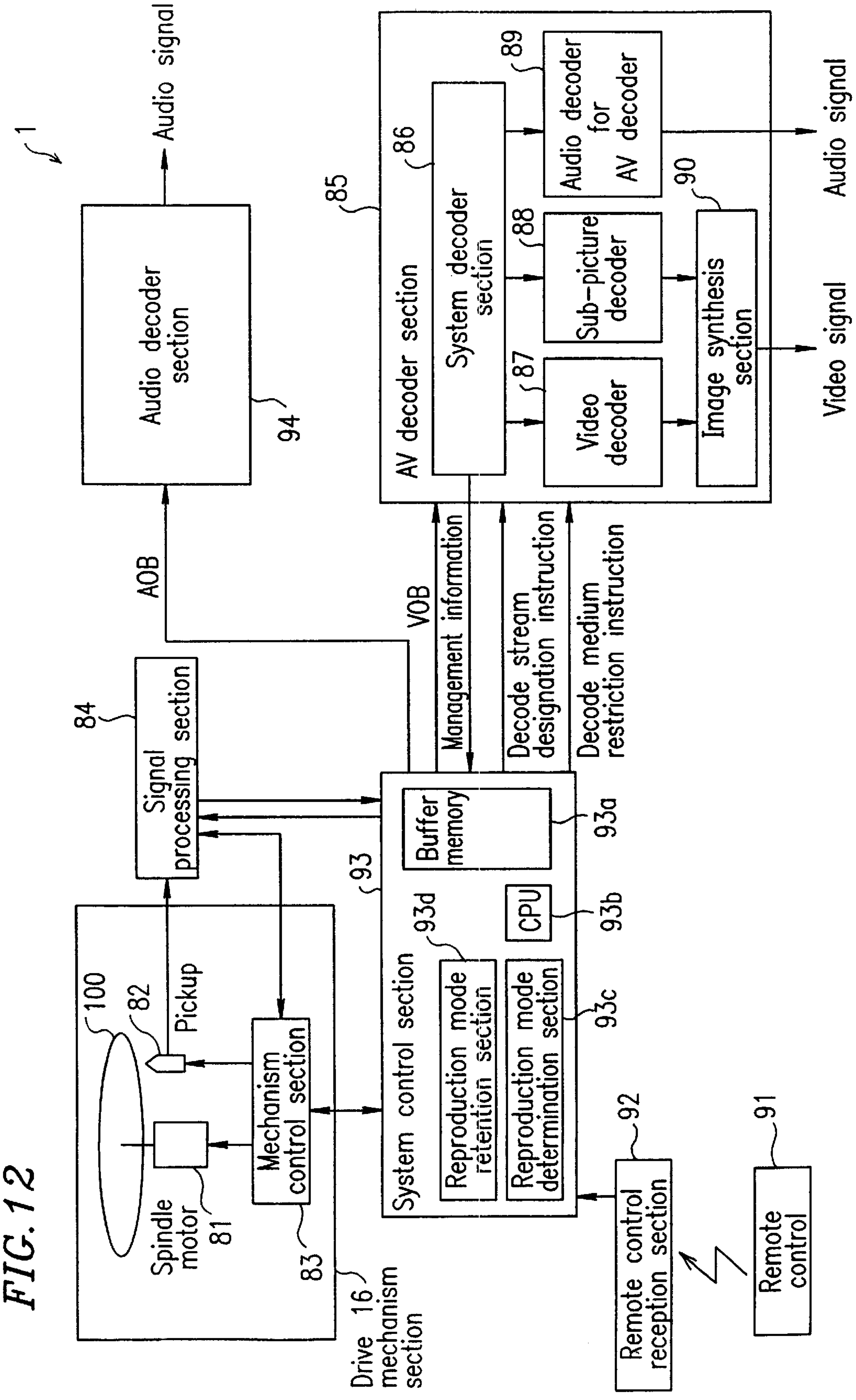
FIG. 12 is a block diagram showing the structure of a DVD player as a disk reproduction apparatus according to an example of the present invention.

FIG. 12 shows the structure of the DVD player 1 according to an example of the present invention. As shown in FIG. 12, the DVD player 1 includes a drive mechanism section 16, a signal processing section 84, an AV decoder section 85, an audio decoder section 94, a remote control reception section 92 for receiving signals from the remote control 91, and a system control section 93.

The drive mechanism section 16 includes a base (not shown) on which the DVD 100 is to be set, and a motor 81 for clamping and rotating the DVD 100 which has been set on the base. The motor 81 can be a spindle motor, for example. When setting the DVD 100, the DVD 100 is moved into/out of the body by means of an eject mechanism (not shown). A user sets the DVD 100 on the base, with the base having been moved out of the body. Thereafter, the base on which the DVD 100 has been set is moved into the body. Thus, the DVD 100 is loaded in the DVD player 1.

The drive mechanism section 16 further includes a mechanism control section 83 for controlling a mechanism system including the motor 81 and an optical pickup 82. The optical pickup 82 reads signals which are stored on the DVD 100.

The mechanism control section 83 adjusts the speed of the motor 81 in accordance with the track position instructed from the system control section 93. The mechanism control section 83 controls the travel of the optical pickup 82 by controlling an actuator (not shown) of the optical pickup 82. Once the precise position of a track is detected through servo control, the mechanism control section 83 waits for rotation until reaching a position at which the desired physical sector is stored, and reads signals from the desired physical sector in a consecutive manner.

The signal processing section 84 performs processes, e.g., amplification, waveform shaping, digitalization, decoding, and error correction to the signal which has been read by means of the optical pickup 82. The signal which has been read from the optical pickup 82 is converted into digital data, and stored in a buffer memory 93*a* in the system control section 93 in a logic-block-by-logic-block manner.

The AV decoder section 85 performs predetermined processes to the input digital data of VOBs 602 and converts the digital data into a video signal and an audio signal. The video signal and the audio signal are output from the AV decoder 85.

The AV decoder section 85 includes a system decoder section 86, a video decoder 87, a sub-picture decoder 88, an audio decoder 89 for an AV decoder, and an image synthesis section 90.

The system decoder section 86 receives the digital data which is transferred from the buffer memory 93*a* of the system control section 93 in a logic-block-by-logic-block (i.e., packet by packet) manner, and determines the stream ID and sub-stream ID in the header of each packet, thereby classifying the packs into moving image data packs, sub-picture data packs, audio data packs, and management information packs. During this classification, the moving image data packs are output to the video decoder 87. As for the sub-picture data packs and the audio data packs, only the sub-picture data packs and the audio data packs that have a designated stream number are output to the sub-picture decoder 88 and the audio decoder 89 for an AV decoder in accordance with a decode stream designation instruction which is input from the system control section 93. The management information packs are output to the system control section 93.

The moving image data packs which are input to the video decoder 87 are expanded by a predetermined method in accordance with MPEG2, and output to the image synthesis section 90 in the form of digital video data.

The sub-picture packs which are input to the sub-picture decoder 88 are expanded by the run length method, and output to the image synthesis section 90 in the form of digital video data.

After being subjected to image synthesis by the image synthesis section 90, the digital video data output from the video decoder 87 and the digital video data output from the sub-picture decoder 88 are converted into a video signal in accordance with the NTSC method. The video signal is output to the exterior of the DVD player 1 via the video output terminal 95 (FIG. 10).

The audio data packs which are input to the audio decoder 89 for an AV decoder are decoded in accordance with the compression audio method (e.g., LPCM or AC3) depending on their data type, and subjected to a D/A conversion, whereby an audio signal is obtained. The audio signal is output to the exterior of the DVD player 1 via the audio output terminal 96 (FIG. 10).

The audio decoder section 94 performs predetermined processes for the input digital data of AOBs 802 depending on their data type, whereby an audio signal is obtained. The audio signal is output to the exterior of the DVD player 1 via the audio output terminal 96 (FIG. 10).

The system control section 93 includes a CPU 93*b* for controlling the entire DVD player 1 and various work memories.

Next, the operation of the DVD player 1 having the above-described structure will be described.

As the "V-MODE" key 193 on the remote control 91 is pressed by a user, an infrared signal representing a video-oriented reproduction mode is transmitted from the remote control 91 to the DVD player 1. The infrared signal from the remote control 91 is received and analyzed by the remote control reception section 92 of the DVD player 1. As a result, a code representing a video-oriented reproduction mode is retained in a reproduction mode retention section 93*c* within the system control section 93.

Similarly, as the "A-MODE" key 194 of the remote control 91 is pressed by a user, a code representing an audio-oriented reproduction mode is retained in the reproduction mode retention section 93*c* in the system control section 93.

The system control section 93 includes a reproduction mode determination section 93*d*. At the beginning of reproduction of the DVD 100, the reproduction mode determination section 93*d* determines whether the reproduction mode is a video-oriented reproduction mode or an audio-oriented reproduction mode by referring to the mode retained in the reproduction mode retention section 93*c*. The function of the reproduction mode determination section 93*d* can be realized by, for example, a program executed by the CPU 93*b*.

It should be noted that the above-discussed reproduction mode is not always switched in response to an input from a user.

For example, in the case where the disk reproduction apparatus is a portable device having a liquid crystal display panel which can be opened or closed, the reproduction mode may be automatically switched in accordance with the open or closed state of the liquid crystal display panel. For example, if the liquid crystal display panel is in the open state, the reproduction mode may be switched to a video-oriented reproduction mode; conversely, if the liquid crystal display panel is in the closed state, the reproduction mode may be switched to an audio-oriented reproduction mode. Such control can be achieved by inputting a control signal indicating the open or closed state of the liquid crystal display panel to the reproduction mode determination section 93*d* so as to allow the reproduction mode determination section 93*d* to operate in response to that control signal.

Alternatively, the reproduction mode may be automatically switched in accordance with the connection of the video output terminal. For example, if an AV cord is connected to the video output terminal, the reproduction mode may be switched to a video-oriented reproduction mode; conversely, if an AV cord is not connected to the video output terminal, the reproduction mode may be switched to an audio-oriented reproduction mode. Such control can be achieved by inputting a control signal indicating the state of connection of the video output terminal to the reproduction mode determination section 93*d* so as to allow the reproduction mode determination section 93*d* to operate in response to that control signal.

Alternatively, the reproduction mode may be automatically switched in accordance with the presence/absence of a video signal. For example, if a video signal is output to the video output terminal, the reproduction mode may be switched to a video-oriented reproduction mode; conversely, if a video signal is not output to the video output terminal, the reproduction mode may be switched to an audio-oriented reproduction mode. Such control can be achieved by detecting the presence/absence of a video signal and inputting a control signal indicating the detection result to the reproduction mode determination section 93*d* so as to allow the reproduction mode determination section 93*d* to operate in accordance with that control signal.

Alternatively, in the case where the disk reproduction apparatus is a device to be mounted in an automobile, the reproduction mode may be automatically switched in accordance with the state of motion of the automobile. For example, if the automobile is not moving, the reproduction mode may be switched to a video-oriented reproduction mode; conversely, if the automobile is moving, the reproduction mode may be switched to an audio-oriented reproduction mode. Such control can be achieved by inputting a control signal indicating the state of motion of the automobile to the reproduction mode determination section 93*d* so as to allow the reproduction mode determination section 93*d* to operate in accordance with that control signal. It can be detected whether or not an automobile is at rest by detecting, for example, the state of the parking brake or gearshift. In the case of an automatic transmission car, the gearshift being in the parking position will indicate that the car is stopped.

Figure 13A:
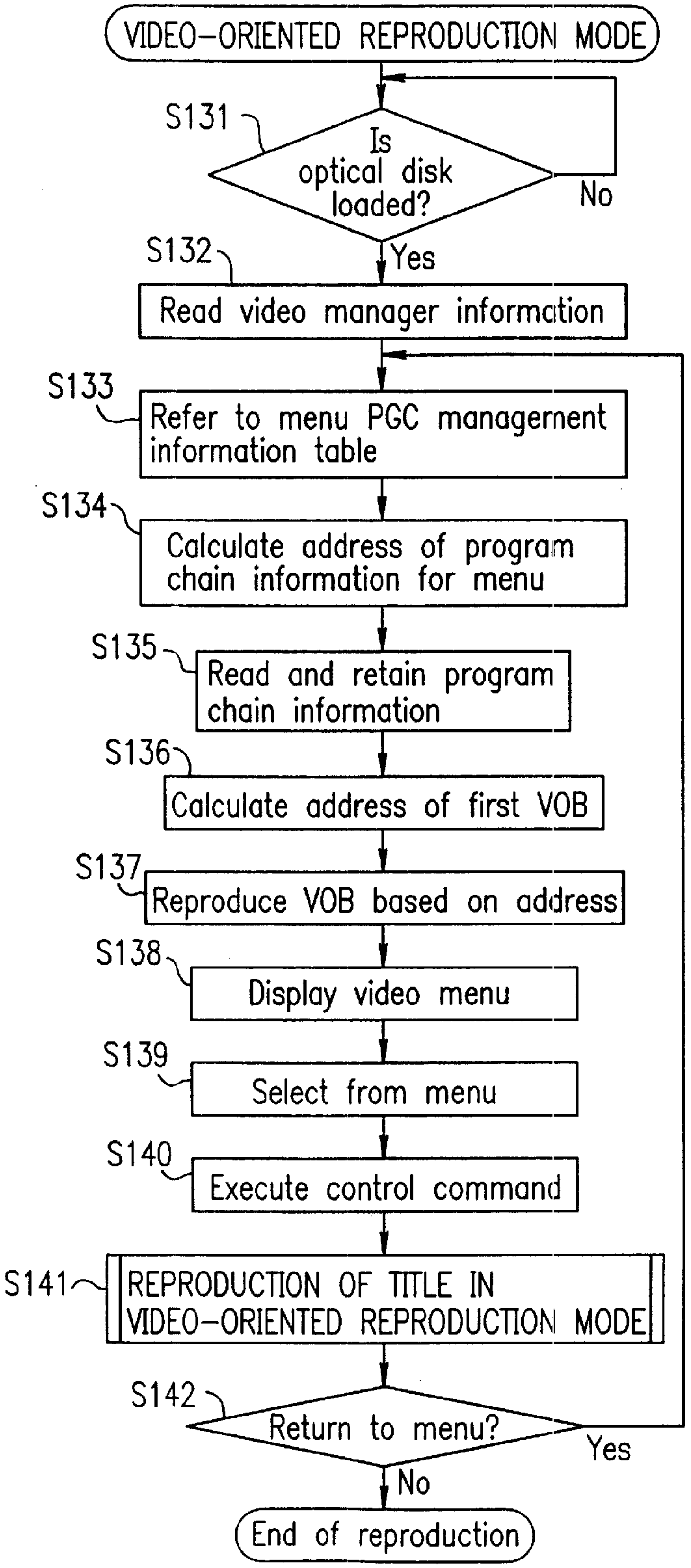
FIG. 13A is a flowchart showing the flow of a reproduction process in a video-oriented reproduction mode according to an example of the present invention.

FIG. 13A shows the flow of a reproduction process in the video-oriented reproduction mode. It is assumed herein that the reproduction mode has already been determined as the video-oriented reproduction mode.

At step S131, it is determined whether or not an optical disk is loaded in the DVD player 1. Such determination can be performed by, for example, the system control section 93 in accordance with a signal from the optical sensor.

If it is determined that an optical disk is loaded in the DVD player 1, the system control section 93 controls the rotation of the disk by controlling the mechanism control section 83 and the signal processing section 84, and performs an initialization operation for causing the optical pickup 82 to seek into the lead-in region 31 (FIG. 3). Thus, the reproduction process is started.

At step S132, the video manager information 700 (FIG. 3) is read from the video zone region 32*b* (FIG. 3). This reading is performed based on the information which is read from the volume file management region 32*a* (FIG. 3).

By referring to the PGC management information table for a menu 701 of the video manager information 700 (FIG. 7) (Step S133), the system control section 93 calculates the address of the program chain information for a volume menu (step S134), and reads the program chain information for the volume menu based on that address, and retains the program chain information for the volume menu within the system control section 93 (step S135).

By referring to the retained program chain information for the volume menu, the system control section 93 calculates the address of the VOB 703 (FIG. 7) for the menu that is to be reproduced first (step S136), and reproduces the VOB 703 for a menu based on that address (step S137). As a result, a video menu is displayed (step S138). The video menu is used by a user to select the title that the user wishes to reproduce.

Figure 15:
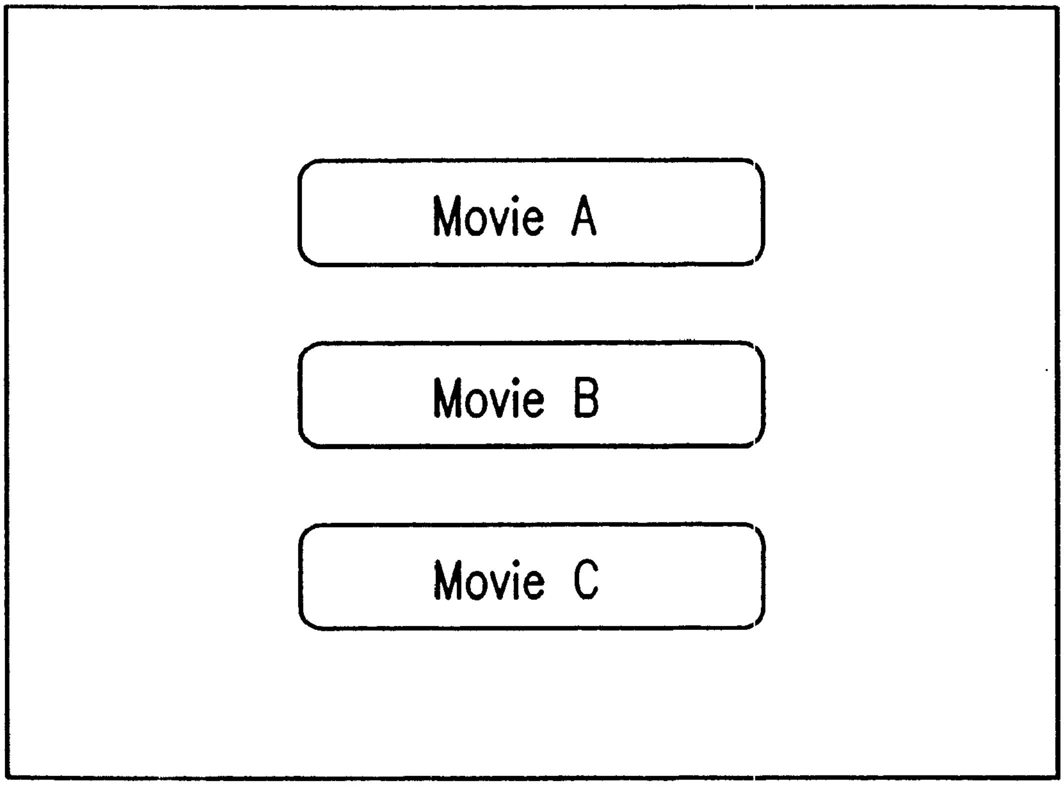
FIG. 15 is a diagram showing how a start menu stored in a video manager according to an example of the present invention is displayed.

FIG. 15 shows an exemplary displayed image of a video menu, where the user can select a desired title from among "Movie A", "Movie B", and "Movie C".

For example, the user may press a key on the remote control 91 (FIG. 10) that corresponds to the menu item to be selected from among a plurality of menu items being displayed. Thus, one of the plurality of menu items is selected (step S139).

The system control section 93 receives information representing the selected menu item (e.g., the menu item number) via the remote control reception section 92 (FIG. 12). The system control section 93 receives the management information packs included in the VOBs of the video menu in reproduction from the AV decoder 85. By referring to the management information packs, the system control section 93 executes a control command corresponding to the selected menu item (step S140).

The control command may be, for example, "TitlePlay#n", meaning "reproduce a title having title number n".

The system control section 93 calls a "REPRODUCTION OF TITLE IN VIDEO-ORIENTED REPRODUCTION MODE" subroutine to execute the "TitlePlay#n" command (step S141).

At step S142, it is determined whether or not to return to the video menu illustrated in FIG. 15. If the determination at step S142 is "Yes", the process returns to step S133; if the determination at step S142 is "No", the reproduction process is terminated.

Figure 13B:
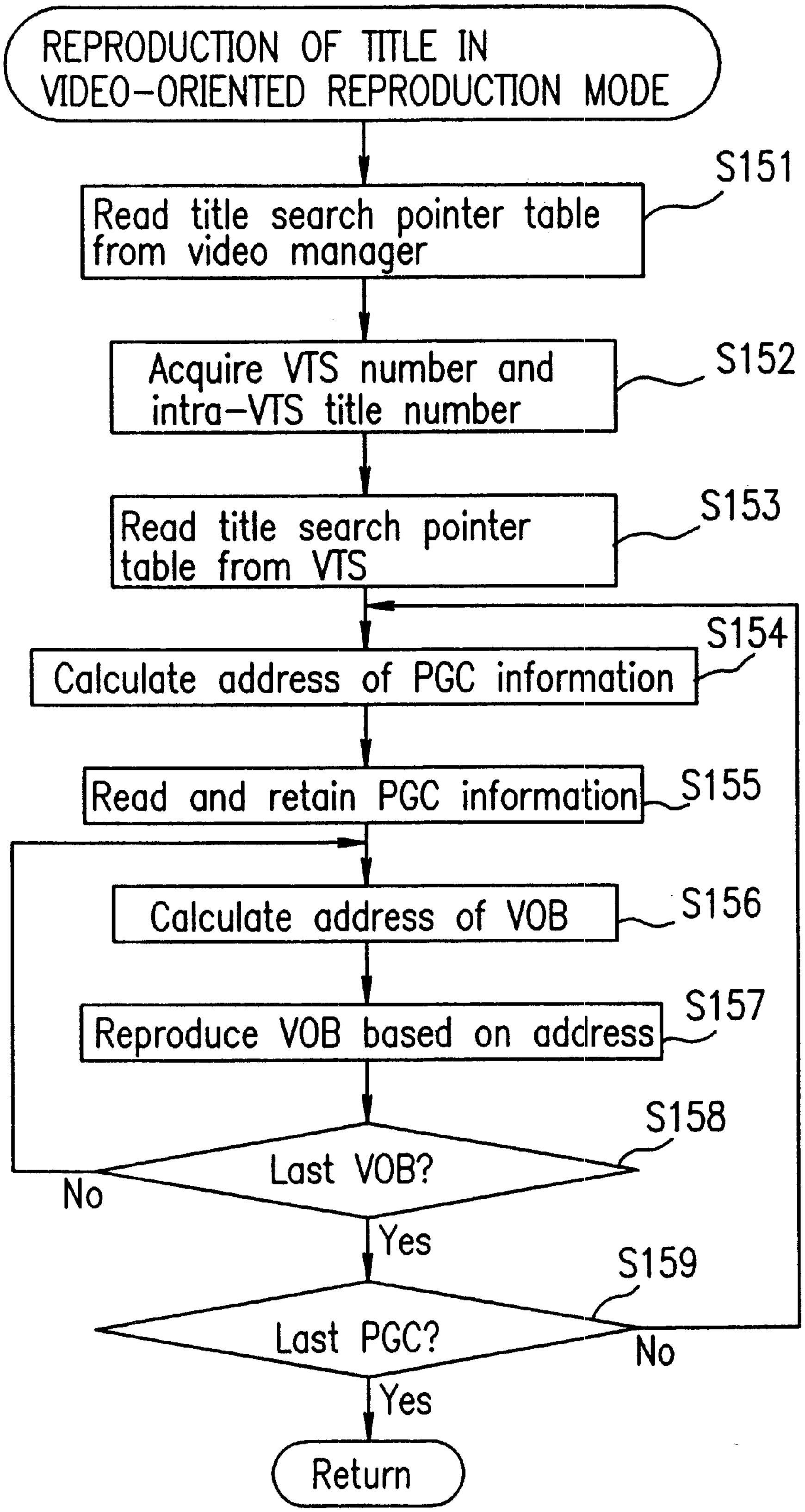
FIG. 13B is a flowchart showing the flow of a process of reproducing a title in a video-oriented reproduction mode according to an example of the present invention.

FIG. 13B describes the flow of a reproduction process in the "REPRODUCTION OF TITLE IN VIDEO-ORIENTED REPRODUCTION MODE" subroutine.

The system control section 93 reads the title search pointer table 702 (FIG. 7) from the video manager information 700 (step S151).

By referring to the title search pointer 712 (FIG. 7) corresponding to title number n, the system control section 93 acquires the VTS number 721 (FIG. 7) and the intra-VTS title number 722 (FIG. 7) (step S152).

The system control section 93 reads the video title set section title search pointer table 612 (FIG. 6) from the video title set 600 (FIG. 6) corresponding to the VTS number 721 (step S153).

By referring to the start PGC number 622 (FIG. 6) corresponding to the intra-VTS title number 722, the system control section 93 calculates the address of the PGC information 631 (FIG. 6) to be first executed (step S154), reads the PGC information 631 based on that address, and retains the PGC information 631 within the system control section 93 (step S155).

The system control section 93 acquires the VOB addresses 642 (FIG. 6) in accordance with the PGC information 631 (step S156), and reproduces a VOB 602 based on that address (step S157).

At step S158, it is determined whether or not the VOB 602 is the last VOB 602 to be reproduced. If the determination at step S158 is "Yes", the process moves to step S159; if the determination at step S158 is "No", the process returns to step S156.

At step S159, it is determined whether or not the PGC information 631 is the last PGC information 631 to be reproduced. If the determination at step S159 is "Yes", the process moves to step S142 in FIG. 13A; if the determination at step S159 is "No", the process returns to step S154.

In the case where a VOB reproduced in accordance with the PGC information corresponds to a menu for allowing the flow of reproduction to branch out, a menu item is displayed from the video data contained in the reproduced VOB, as in the case of displaying a menu based on the aforementioned video manager information.

A control command which is launched via user interaction is stored in a management information pack of a VOB. Therefore, when receiving user interaction through an operation of the remote control or the like, the system control section 93 executes the control command in the management information pack of the VOB. As a result, a diversified reproduction control is realized.

Although not shown in FIG. 10, the DVD player 1 is provided with a switching key for switching between an audio channel and a sub-picture channel. The audio channel and the sub-picture channel selected by a user using this switching key are retained in a register (not shown) within the system control section 93. When a VOB is reproduced, the system control section 93 refers to this register in order to designate a valid channel for the AV decoder section 85. Such a designation is made by outputting a control signal from the system control section 93 to the AV decoder section 85. As a result, only the information in the valid audio channel and sub-picture channel is output to the exterior along with the moving image information.

Figure 14A:
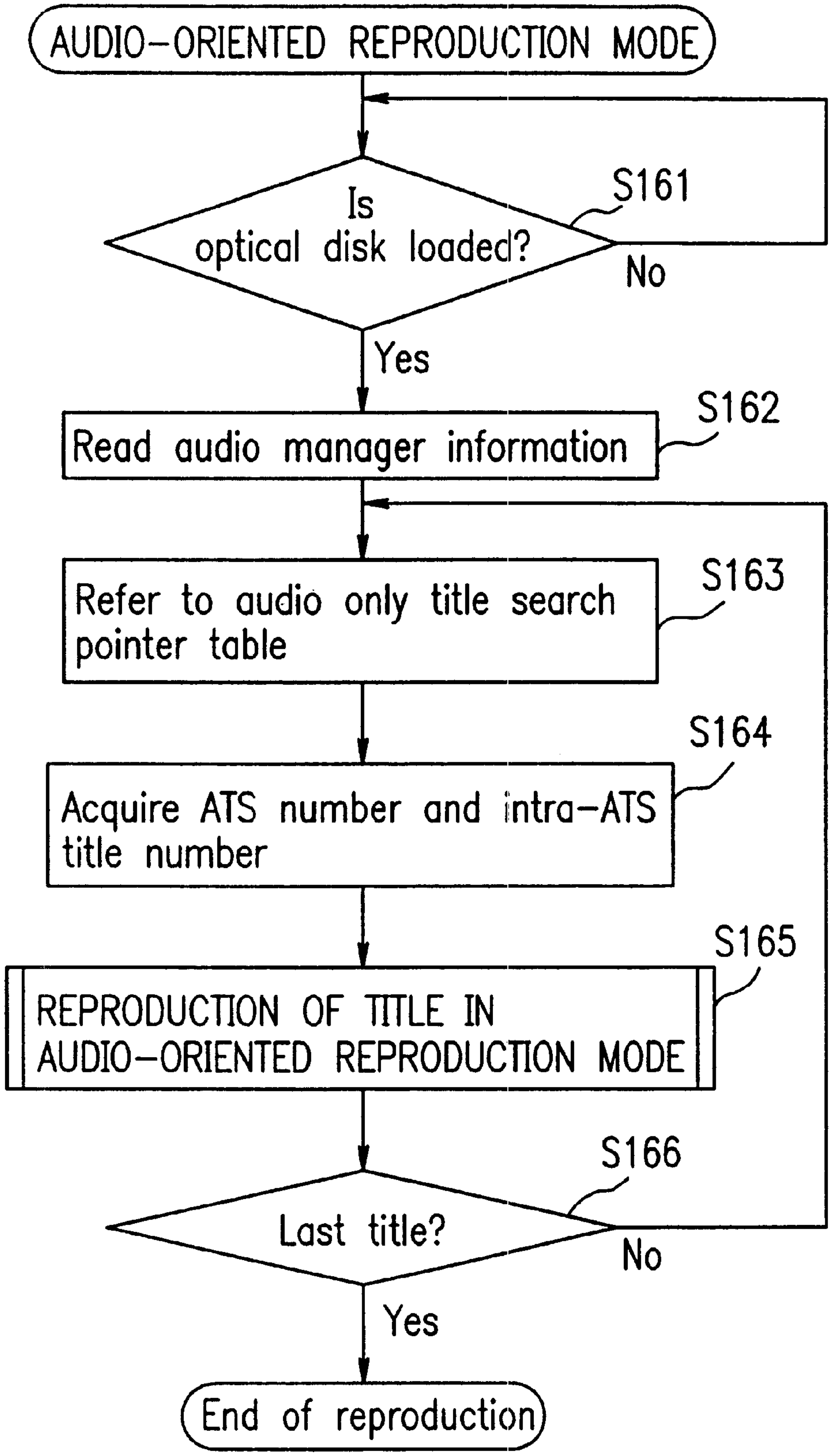
FIG. 14A is a flowchart showing the flow of a reproduction process in an audio-oriented reproduction mode according to an example of the present invention.

FIG. 14A shows the flow of a reproduction process in the audio-oriented reproduction mode. It is assumed herein that the reproduction mode has already been determined as the audio-oriented reproduction mode.

At step S161, it is determined whether or not an optical disk is loaded in the DVD player 1. Such determination can be performed by, for example, the system control section 93 in accordance with a signal from the optical sensor.

If it is determined that an optical disk is loaded in the DVD player 1, the system control section 93 controls the rotation of the disk by controlling the mechanism control section 83 and the signal processing section 84, and performs an initialization operation for causing the optical pickup 82 to seek into the lead-in region 31 (FIG. 3). Thus, the reproduction process is started.

At step 162, the audio manager information 900 (FIG. 3) is read from the audio zone region 32*c* (FIG. 3). This reading is performed based on the information which is read from the volume file management region 32*a* (FIG. 3).

By referring to the audio-only title search pointer table 903 (FIG. 9) of the audio manager information 900 (step S163), the system control section 93 acquires the ATS numbers 954 and the intra-ATS title numbers 955 in accordance with the entry order within the audio-only title search pointer table 903 (step S164).

The system control section 93 calls a "REPRODUCTION OF TITLE IN AUDIO-ORIENTED REPRODUCTION MODE" subroutine to reproduce a title designated by the ATS number 954 and the intra-ATS title number 955 (step S165).

At step S166, it is determined whether or not the title is the last title to be reproduced. If the determination at step S166 is "Yes", the reproduction process is terminated; if the determination at step S166 is "No", the process returns to step S163.

Figure 14B:
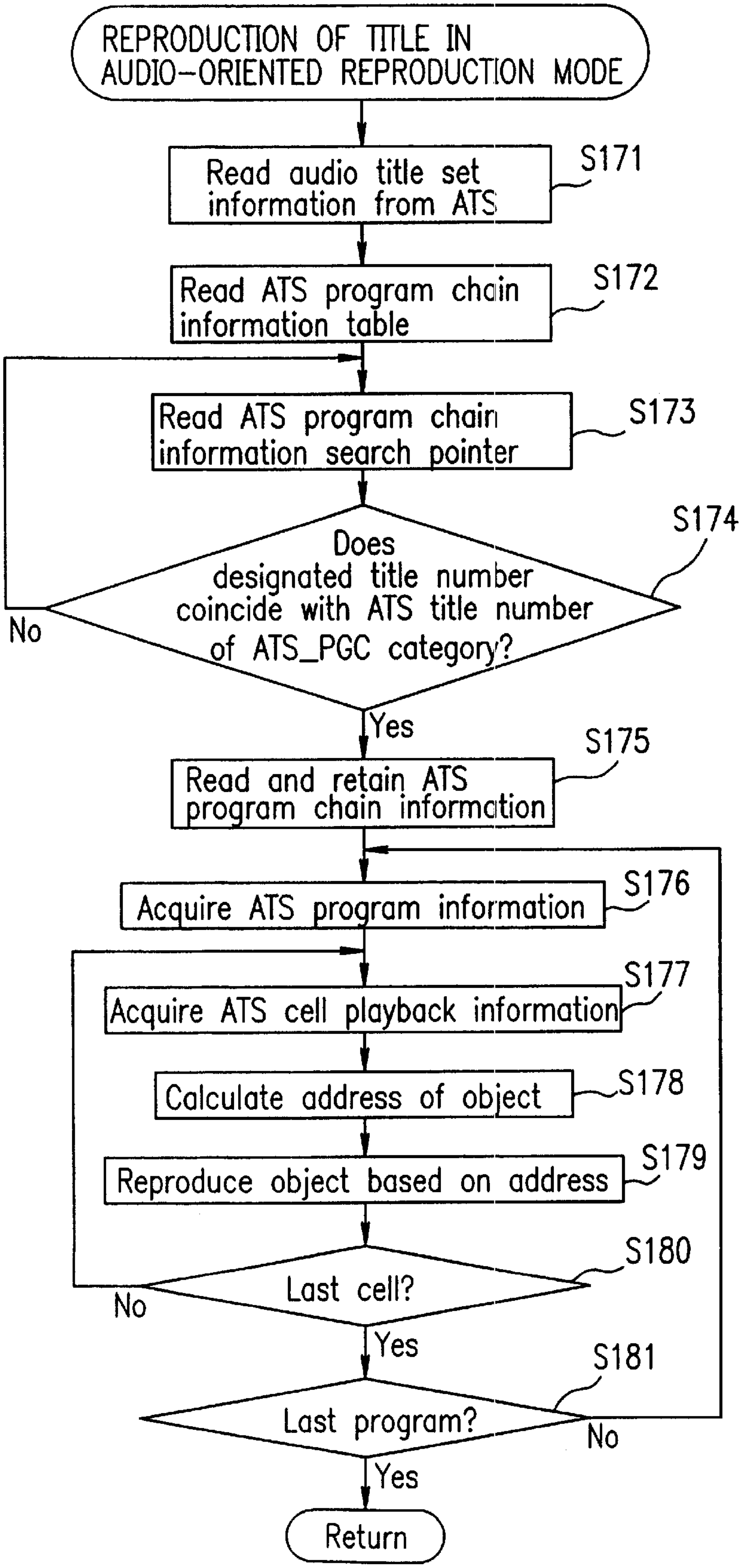
FIG. 14B is a flowchart showing the flow of a process of reproducing a title in an audio-oriented reproduction mode according to an example of the present invention.

FIG. 14B describes the flow of a reproduction process in the "REPRODUCTION OF TITLE IN AUDIO-ORIENTED REPRODUCTION MODE" subroutine.

The system control section 93 reads the audio title set information 801 (FIG. 8A) from the audio title set 800 corresponding to the designated ATS number 954 (step S171).

The system control section 93 reads the ATS program chain information table 812 from the audio title set information 801 (step S172), and reads the ATS program chain information search pointers 832 in accordance with the entry order within the ATS program chain information table 812 (step S173).

By searching through the ATS_PGC category 851 of the ATS program chain information search pointers 832, the system control section 93 determines whether or not the designated intra-ATS title number 955 coincides with the intra-ATS title number 872 of the ATS_PGC category 851 (step S174).

If the determination at step S174 is "Yes", the process moves to step S175; if the determination at step S174 is "No", the process returns to step S173. At step S173, another ATS program chain information search pointer 832 is read.

The system control section 93 reads the ATS program chain information unit 833 corresponding to the ATS program chain information search pointer 832 in which the designated intra-ATS title number 955 is found, and retains the ATS program chain information unit 833 within the system control section 93 (step S175).

The system control section 93 acquires the ATS program information 862 to be reproduced in accordance with the entry order within the ATS program chain information unit 833 (step S176), and determines the cell to reproduce based on the cell number described in the entry cell number 833 of the ATS program information 862.

The system control section 93 acquires the ATS cell playback information 863 corresponding to the ATS program information 862 (step S177). The address of the cell at which the reproduction should begin is designated by the ATS cell start address 893 of the ATS cell playback information 863. The address of the cell at which the reproduction should end is designated by the ATS cell end address 894 of the ATS cell playback information 863.

Based on the ATS cell start address 893 and the ATS cell end address 894, the system control section 93 calculates the address of the object to be reproduced as well as the offset information for that object (step S178), and reproduces the object based on this address and offset information (step S179).

If the designated audio title set 800 is of an AOB point type, the object to be reproduced is an AOB 802. The position of the AOB 802 on the optical disk is determined based on the start address 822*e* (FIG. 8C) of the object region of the ATS address information 822. The AOB 802 which has been reproduced from the optical disk is transferred to the audio decoder section 94 by the system control section 93. The audio decoder section 94 converts the AOB 802 into an audio signal, which is output to the exterior of the DVD player 1.

If the designated audio title set 800 is of a VOB point type, the object to be reproduced is an VOB 602. The position of the VOB 602 on the optical disk is determined based on the start address 822*e* (FIG. 8C) of the object region of the ATS address information 822. The VOB 602 which has been reproduced from the optical disk is processed so that the beginning data and the ending data of the VOB 602 are trimmed based on the offset information. The data of the thus-processed VOB 602 is transferred to the AV decoder section 85.

Prior to the transfer of the data of the VOB 602, the system control section 93, outputs a decode medium restriction instruction to the AV decoder section 85. Following the decode medium restriction instruction, the AV decoder section 85 decodes only the data of the audio packs included in the VOB 602, thereby converting the data of the VOB 602 into an audio signal. The audio signal is output to the exterior of the DVD player 1.

Next, the operation of the DVD player 1 in the video-oriented reproduction mode and the operation of the DVD player 1 in the audio-oriented reproduction mode will be more specifically described with reference to FIGS. 16A and 16B.

Figure 16A:
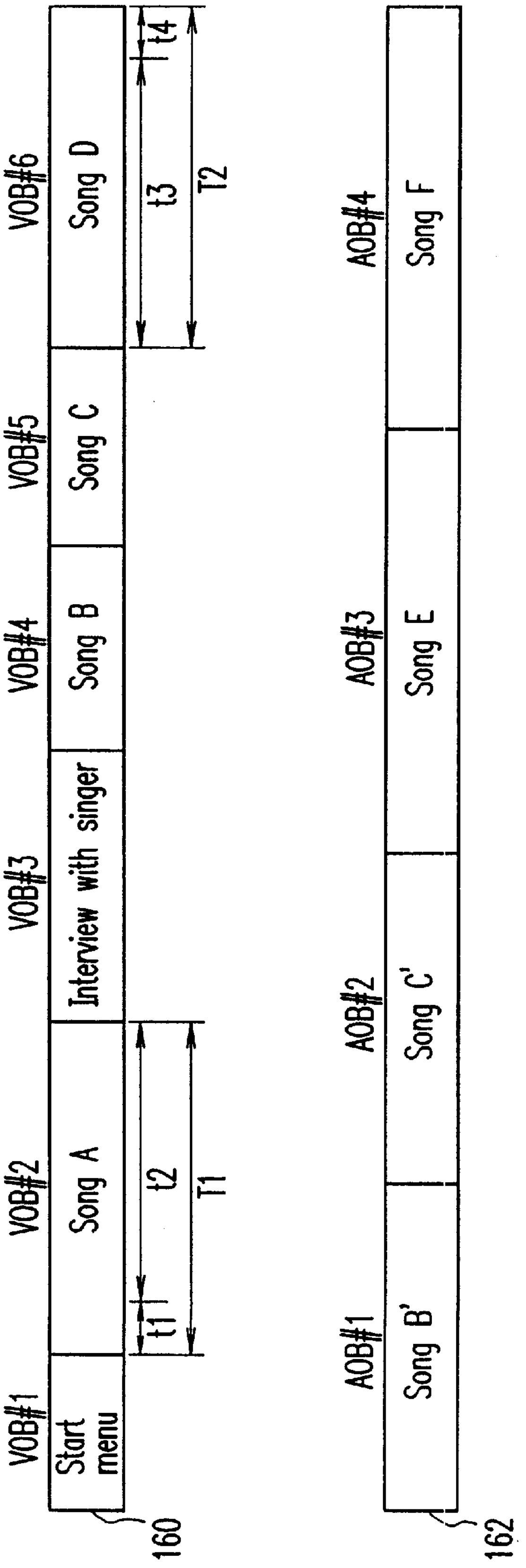
FIG. 16A is a diagram showing an exemplary structure of an application according to an example of the present invention.

FIG. 16A illustrates the content of exemplary data of an image-accompanied music application. This application includes a live recording of a concert by a certain singer.

VOB#1 to VOB#6 are stored as moving image information 160 on the optical disk. AOB#1 to AOB#4 are stored as audio information 162 on the same optical disk on which VOB#1 to VOB#6 are stored.

VOB#2 includes the moving image information of "Song A". Herein, it is assumed that "Song A" shows the image of the audience entering the concert hall for a period of time, "t1", at the beginning, followed by the actual performance and singing of Song A for a period of time, "t2". VOB#3 includes the moving image information of an "Interview with the singer". VOB#4 includes the moving image information of "Song B". VOB#5 includes the moving image information of "Song C". VOB#6 includes the moving image information of "Song D" ending the concert. It is assumed that "Song D" shows the actual performance and singing of Song D for a period of time, "t3", followed by the image of the audience leaving the concert hall for a period of time, "t4".

VOB#1 includes the moving image information of a video menu to be displayed at the beginning of reproduction. The video menu is used for determining which one of "Song A", "Song B", "Song C", "Song D", or "Interview with the singer" to reproduce, and accordingly diversify the reproduction path of the VOBs.

Each of VOB#1 to VOB#6 includes audio information in the LPCM format (16 bit-sampled) and sub-picture information for displaying subtitles of the words of the songs.

Each of AOB#1 to AOB#4 includes audio information in the LPCM format (24 bit-sampled). Thus, each of AOB#1 to AOB#4 includes audio information of a higher sound quality than that of VOB#1 to VOB#6.

AOB#1 includes the audio information of "Song B'". The content of the audio information of "Song B'" is the same as that of the audio information of "Song B" except that the audio information of "Song B'" is of a higher quality than that of the audio information of "Song B".

AOB#2 includes the audio information of "Song C'". The content of the audio information of "Song C'" is the same as that of the audio information of "Song C" except that the audio information of "Song C'" is of a higher quality than that of the audio information of "Song C".

AOB#3 includes the audio information of "Song#E". AOB#4 includes the audio information of "Song#F".

Figure 16B:
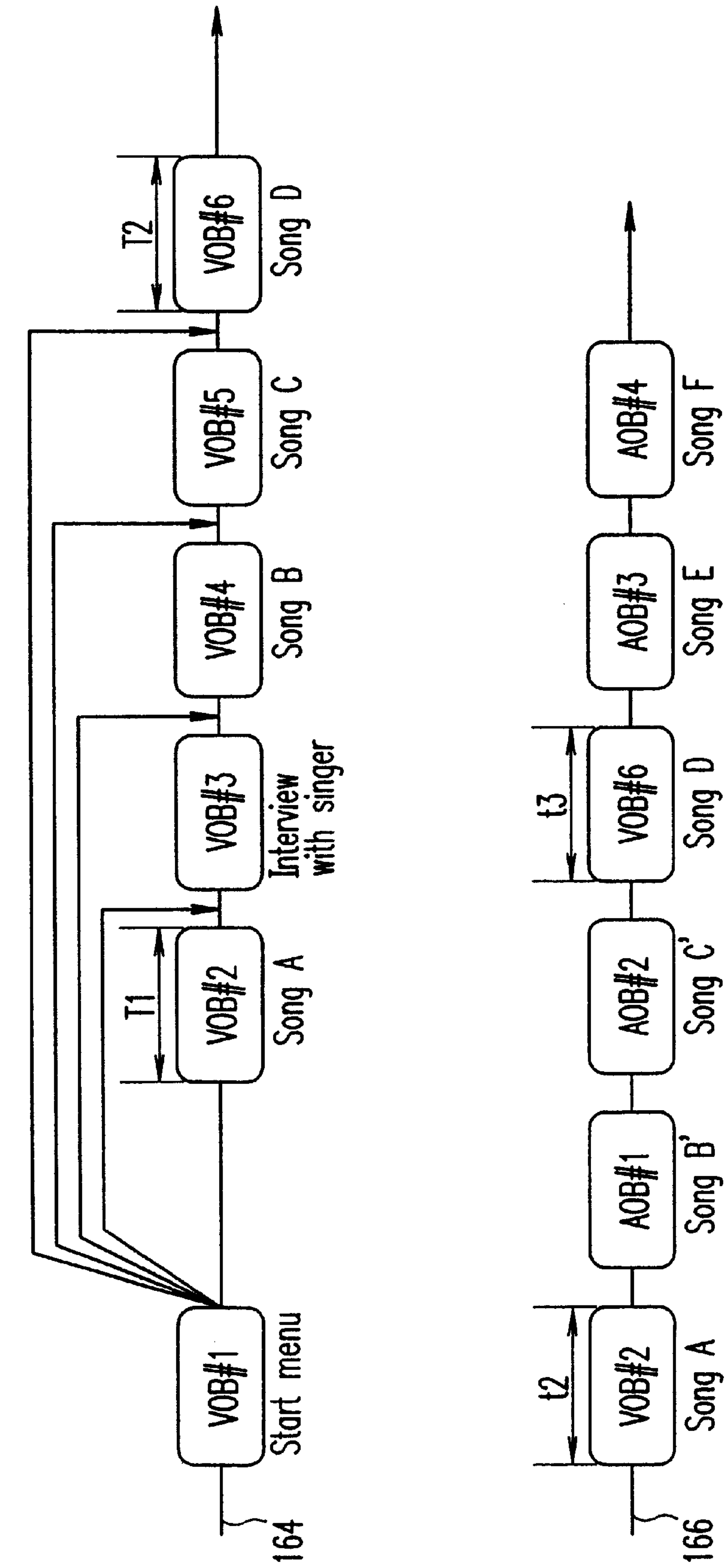
FIG. 16B is a diagram illustrating the operation of a disk reproduction apparatus according to an example of the present invention.

FIG. 16B shows reproduction paths for reproducing the image-accompanied music application shown in FIG. 16A.

In FIG. 16B, reference numeral 164 shows a reproduction path in the video-oriented reproduction mode, whereas reference numeral 166 shows a reproduction path in the audio-oriented reproduction mode. The respective objects stored on the optical disk are reproduced along a specified reproduction path.

In the video-oriented reproduction mode, the start menu corresponding to VOB#1 is displayed before beginning the reproduction, and a user input is awaited. A user selects one of a plurality of menu items in the start menu, such selection being made by an operation of a remote control, for example. The plurality of menu items are respectively associated with VOB#2 to VOB#6 in advance. A VOB corresponding to the menu item selected by the user is reproduced, so that a video signal and an audio signal corresponding to the reproduced VOB are output.

The reproduction path 164 is defined so as to branch into one of VOB#2 to VOB#6 after the reproduction of VOB#1. The reproduction path 164 is defined by the PGC information 631 (FIG. 6).

In the case where reproduction is performed along the reproduction path 164, "Song A" corresponding to VOB#2 is reproduced for a period of time, "T1", without an offset, and "Song D" corresponding to VOB#6 is reproduced for a period of time, "T2", without an offset.

In the audio-oriented reproduction mode, VOB#2, AOB#1, AOB#2, VOB#6, AOB#3, and AOB#4 are reproduced in this order. However, as for VOB#2 and VOB#6, only the audio information thereof is reproduced, without reproducing the video information thereof. As a result, an audio signal corresponding to the reproduced VOB or the reproduced AOB is output.

The reproduction path 166 is defined so that VOB#2, AOB#1, AOB#2, VOB#6, AOB#3, and AOB#4 are reproduced in this order. The reproduction path 166 is defined by the ATS program chain information 832 (FIGS. 8A and 8B).

In the case where reproduction is performed along the reproduction path 166, "Song A" corresponding to VOB#2 is reproduced first. However, the first "t1" period of time of "Song A", which is not suitable for audio output, is cut off so that “Song A” will be reproduced for the “t2” period of time, not the full “T1” period of time. Such omission in the playback time is performed based on offset information (i.e., ATS cell playback information 863 (FIGS. 8A and 8B). After the reproduction of VOB#2 is complete, “Song B'” corresponding to AOB#1 is reproduced at a higher quality than that of “Song B”. After the reproduction of AOB#1 is complete, “Song C'” corresponding to AOB#2 is reproduced at a higher quality than that of “Song C”. After the reproduction of AOB#2 is complete, “Song D” corresponding to VOB#6 is reproduced. However, the last “t4” period of time of “Song D”, which is not suitable for audio output, is cut off so that “Song D” will be reproduced for the “t3” period of time, not the full “T2” period of time. Such omission in the playback time is performed based on offset information (i.e., ATS cell playback information 863 (FIGS. 8A and 8B). After the reproduction of VOB#6 is complete, “Song E” corresponding to AOB#3 is reproduced. After the reproduction of AOB#3 is complete, “Song F” corresponding to AOB#4 is reproduced.

Figure 17:
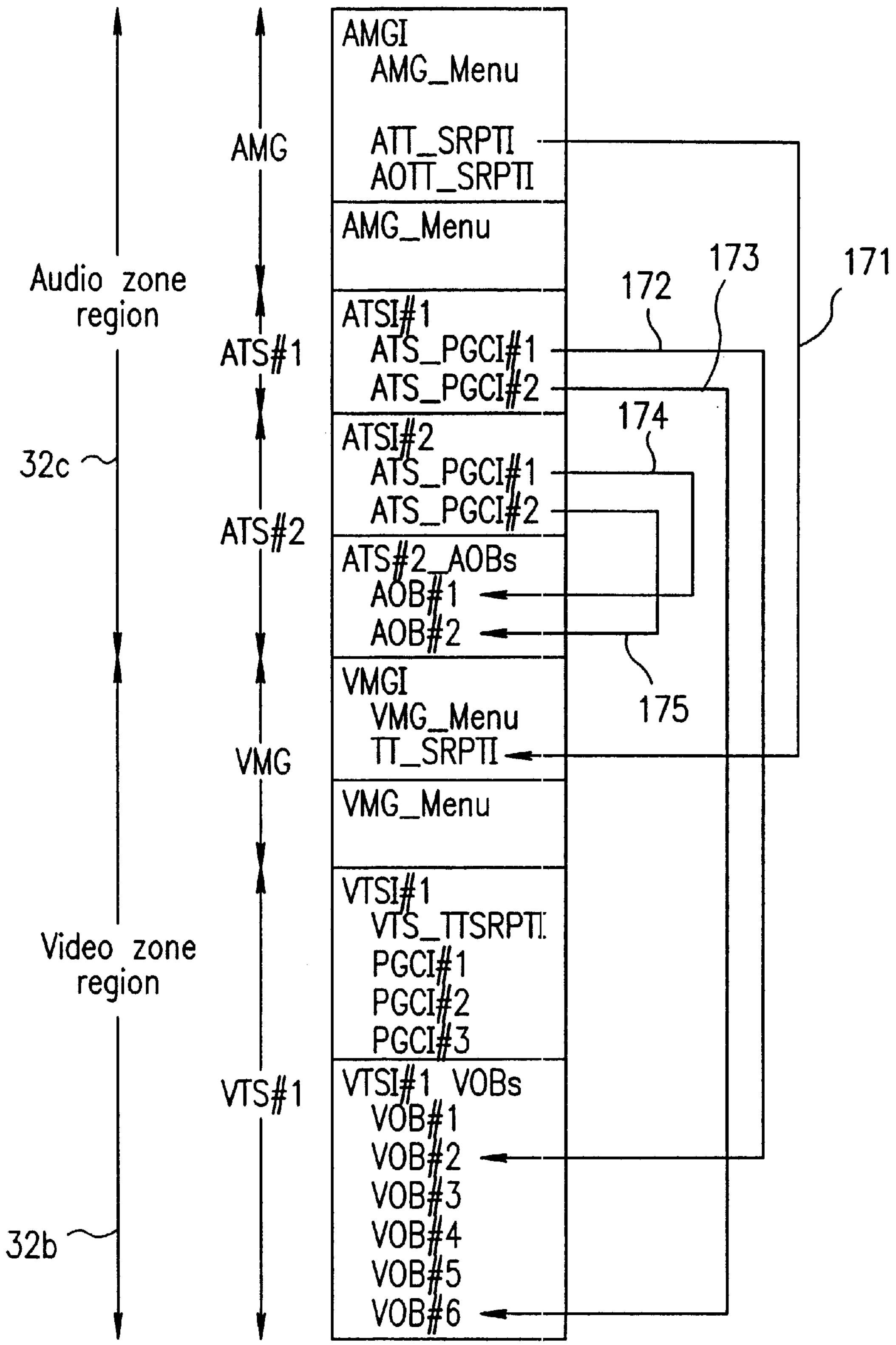
FIG. 17 is a diagram showing the positions on an optical disk at which various data are stored according to an example of the present invention.

FIG. 17 shows an example of specific data arrangement on the optical disk. In this example, it is assumed that the addresses of the optical disk are arranged in an ascending order from top to bottom.

In the example shown in FIG. 17, an audio zone region 32*c* is assigned with a smaller address than that of a video zone region 32*b*. Alternatively, the audio zone region 32*c* may be assigned with a larger address than that of a video zone region 32*b*.

The audio zone region 32*c* includes an audio manager (AMG) and two audio title sets (ATS#1, ATS#2) arranged therein. The audio manager (AMG) includes audio manager information (AMGI) and an audio manager menu (AMG_Menu).

Since the audio title set (ATS#1) is an ATS of the VOB point type, the audio title set (ATS#1) only includes audio title set information (ATSI#1). Since the audio title set (ATS#2) is an ATS of the AOB point type, the audio title set (ATS#2) includes audio title set information (ATSI#2) and audio objects (ATS#2 AOBs).

The video zone region 32*b* includes a video manager (VMG) and a video title set (VTS#1) arranged therein. The video manager (VMG) includes video manager information (VMGI) and an video manager menu (VMG_Menu). The video title set (VTS#1) includes video title set information (VTSI#1) and video objects (VTS#1 VOBs).

The audio manager information (AMGI) includes audio-only title search pointer table information (AOTT_SRPTI) that is referred to by an audio-only player, and audio title search pointer table information (ATT_SRPTI) that is referred to by an audio player with video functions. The audio-only title search pointer table information (AOTT_SRPTI) only points to audio titles included in ATS#1 and ATS#2, whereas the audio title search pointer table information (ATT_SRPTI) points to not only such audio titles but also a title of the video manager (VMG) in order to achieve image-accompanied reproduction (see arrow 171).

The audio title set information (ATSI#1) includes ATS program chain information (ATS_PGCI#1, ATS_PGCI#2) for defining the reproduction order of objects. Since ATS#1 does not include AOBs, the ATS program chain information (ATS_PGCI#1, ATS_PGCI#2) points to the VOBs included in VTS#1. Specifically, ATS_PGCI#1 points to VOB#2 (see arrow 172), whereas ATS_PGCI#2 points to VOB#6 (see arrow 173).

The audio title set information (ATSI#2) includes ATS program chain information (ATS_PGCI#1, ATS_PGCI#2) for defining the reproduction order of objects. Since ATS#2 includes AOBs, the ATS program chain information (ATS_PGCI#1, ATS_PGCI#2) points to the AOBs in ATS#2. Specifically, ATS_PGCI#1 points to AOB#1 (see arrow 174), whereas ATS_PGCI#2 points to AOB#2 (see arrow 175).

The video title set information (VTSI#1) includes PGC information (PGCI#1 to PGCI#3) for defining the reproduction order of objects. The PGC information (PGCI#1 to PGCI#3) all point to the VOBs in VTS#1.

Figure 18:
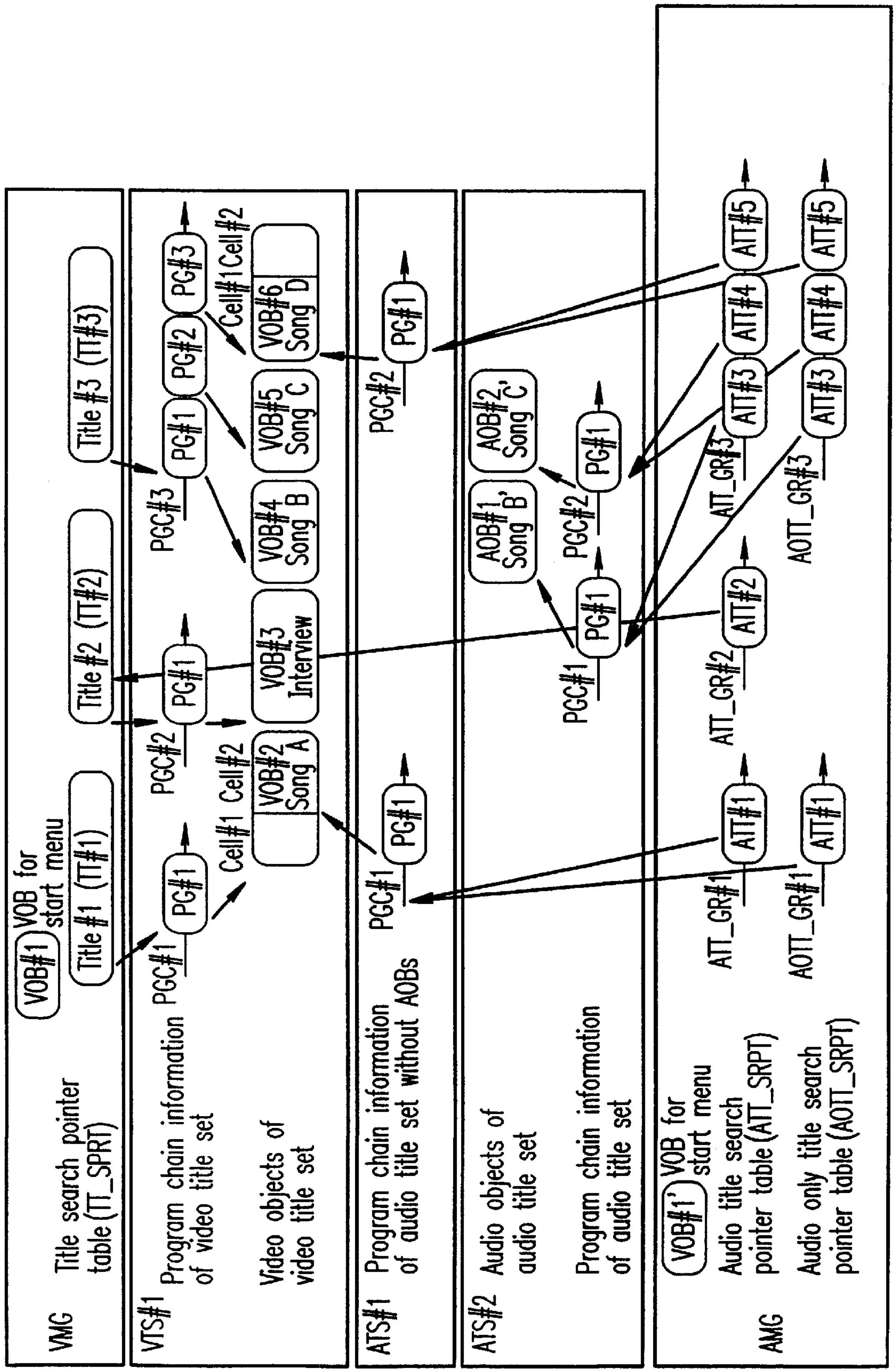
FIG. 18 is a diagram schematically showing the relationship between various reproduced information and objects according to an example of the present invention.

FIG. 18 shows a reproduction order of objects in the video-oriented reproduction mode and a reproduction order of objects in the audio-oriented reproduction mode.

In the video-oriented reproduction mode, a video object (VOB#1) of the video manager (VMG) is reproduced first so that a start menu corresponding to VOB#1 is displayed. A desired title is selected in accordance with a user input. Once the selection of a desired title is made, the PGC information (PGC#1, PGC#2, and PGC#3) of the video title set (VTS#1) is reproduced in accordance with the title search pointer table (TT_SRPT) serving as navigation information for the video manager (VMG). In accordance with this navigation information, “Song A”, “Interview with the singer”, “Song B”, “Song C”, and “Song D” are reproduced.

In the audio-oriented reproduction mode, ATT#1, ATT#3, ATT#4, and ATT#5 are reproduced in this order, in accordance with the audio-only title search pointer table (AOTT_SRPT) serving as navigation information for the audio manager (AMG). ATT#1 points to cell#2 of VOB#2 of VTS#1 (via PGC#1 of ATS#1). ATT#3 points to AOB#1 (via PGC#1 of ATS#2). ATT#4 points to AOB#2 (via PGC#2 of ATS#2). ATT#5 points to cell#1 of VOB#6 of VTS#1 (via PGC#2 of ATS#1). Thus, the audio-only player will reproduce the latter half of “Song A”, “Song B'” (high quality), “Song C'” (high quality), and the first half “Song D”. The “Interview with the singer”, the first half of “Song A”, and the latter half of “Song D” are not reproduced.

As described above, it is possible to selectively reproduce only the data which is appropriate for audio reproduction according to the present example of the invention. Specifically, in an audio-oriented reproduction mode, it is possible to cut off any audio data which the author of the title considers as meaningless without being reproduced along with images, e.g., selection menus which would be reproduced in a video-oriented reproduction mode that require user interaction, the noise of a leaving audience, and the like. Thus, the author of a given title can provide an optical disk which allows the reproduction of a title in accordance with a selected one of the optimum reproduction order for the video-oriented reproduction mode and the optimum reproduction order for the audio-oriented reproduction mode.

Furthermore according to the present example, a user can enjoy higher quality sounds and voices in the audio-oriented reproduction mode than in the video-oriented reproduction mode.

In the present example, it is assumed that it is determined at the beginning of reproduction whether the reproduction mode is a video-oriented reproduction mode or an audio-oriented reproduction mode. However, the reproduction mode may be changed during reproduction. If the reproduction mode is changed to the video-oriented reproduction mode during reproduction under the audio-oriented reproduction mode, the reproduction order which was initially established in the audio-oriented reproduction mode may be maintained after the change of reproduction mode, so that images and sounds/voices are output in the case where the reproduced object is a VOB. In this case, the present embodiment can be arranged so as to prohibit the system control section 93 from outputting a decode medium restriction instruction to the AV decoder section 85 during reproduction of a VOB.

EXAMPLE 2

Hereinafter, the reproduction by an audio player with video functions will be described. The structure of an audio player with video functions is the same as that of the DVD player 1 shown in FIG. 12 except that the audio player with video functions is arranged so that the determination as to whether the reproduction mode is going to be a video-oriented reproduction mode or an audio-oriented reproduction mode is not performed before a reproduction process. The audio player with video functions is defined as an audio player which is specially designed for audio purposes but additionally has an image displaying function.

Figure 19:
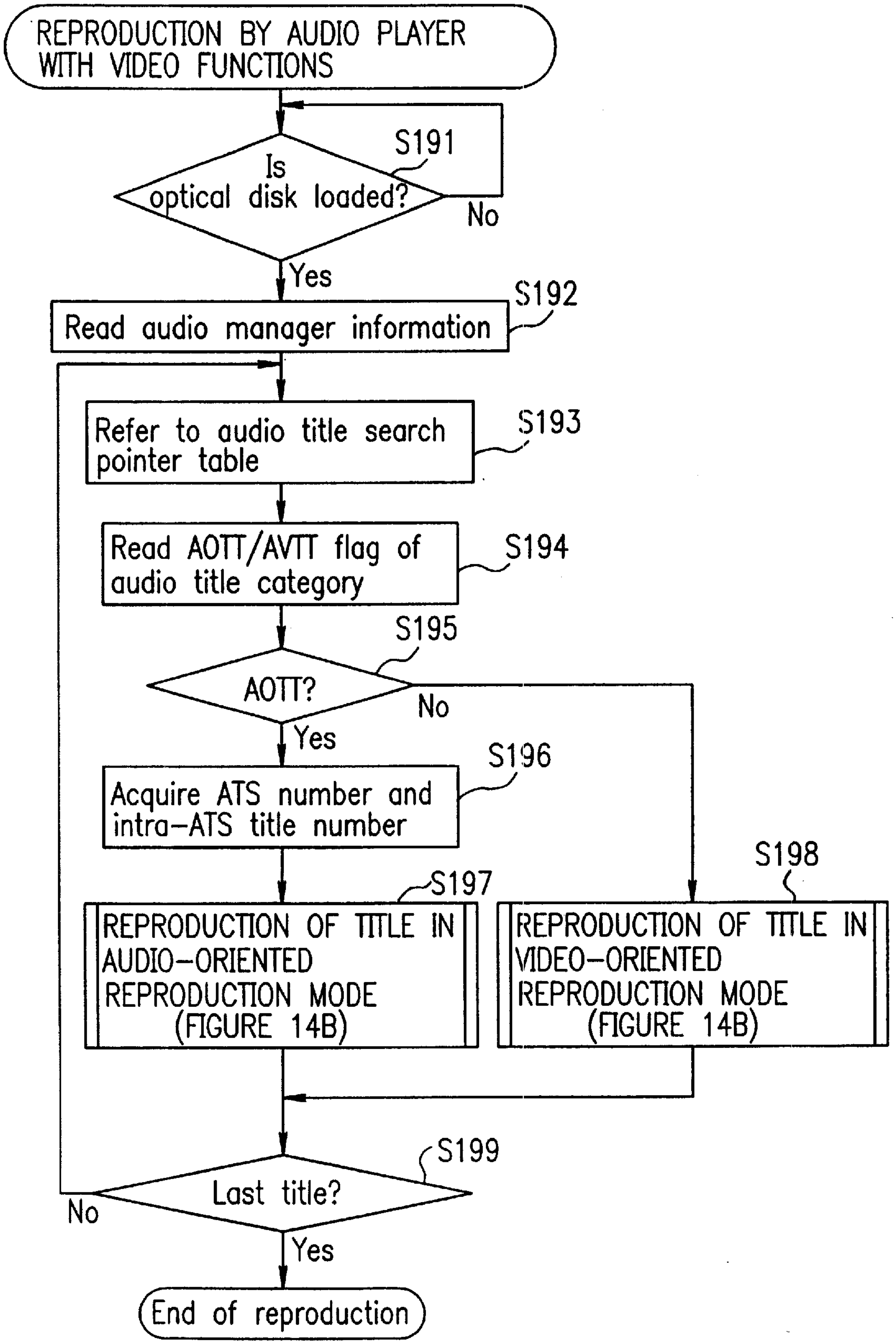
FIG. 19 is a flowchart showing the flow of a reproduction process by an audio player with video functions according to an example of the present invention.

FIG. 19 shows the flow of a reproduction process by the audio player with video functions.

At step S191, it is determined whether or not an optical disk is loaded in the audio player with video functions. Such determination can be performed in accordance with, for example, a signal from an optical sensor.

If it is determined that an optical disk is loaded in audio player with video functions, the rotation of the disk is controlled so that an initialization operation for causing the optical pickup to seek into the lead-in region 31 (FIG. 3) is performed. Thus, the reproduction process is started.

At step S192, the audio manager information 900 (FIG. 3) is read from the audio zone region 32*c* (FIG. 3). This reading is performed based on the information which is read from the volume file management information 32*a* (FIG. 3).

At step S193 the audio title search pointer table 902 (FIG. 9) of the audio manager information 900 is referred to.

At step S194, the AOTT/AVTT flag 961 of the audio title category 931 is read.

At step S195, the value of the AOTT/AVTT flag 961 is checked. If the value of the AOTT/AVTT flag 961 is a value representing AOTT, the process moves to step S196. If the value of the AOTT/AVTT flag 961 is a value representing AVTT, the process moves to step S198.

At step S196, an ATS number 934 and an intra-ATS title number 935 in the audio title search pointer table 902 are acquired.

At step S197, the "REPRODUCTION OF TITLE IN AUDIO-ORIENTED REPRODUCTION MODE" subroutine (FIG. 14B) is called. The details of the reproduction process have already been described with reference to FIG. 14B.

At step S198, the "REPRODUCTION OF TITLE IN VIDEO-ORIENTED REPRODUCTION MODE" subroutine (FIG. 13B) is called. The details of the reproduction process have already been described with reference to FIG. 13B.

Thus, in the reproduction by the audio player with video functions, the reproduction of a title in the audio-oriented reproduction mode and the reproduction of a title in the video-oriented reproduction mode are automatically switched depending on the value of the AOTT/AVTT flag 961.

At step S199, it is determined whether or not the title is the last title to be reproduced. If the determination at step S199 is "Yes", the reproduction process is terminated; if the determination at step S199 is "No", the process returns to step S193.

Next, a specific example of reproduction by the audio player with video functions will be described with reference to FIG. 18.

ATT#1, ATT#2, ATT#3, ATT#4, and ATT#5 are reproduced in this order, in accordance with the audio title search pointer table (ATT_SRPT) serving as navigation information for the audio manager (AMG). ATT#1, ATT#3, ATT#4, and ATT#5 are reproduced in the same manner as in the case of being reproduced in accordance with the audio-only title search pointer table (AOTT_SRPT). ATT#2 includes a description for causing title#2 of the video manager (VMG) to be reproduced. As a result, the audio player with video functions reproduces only the sounds and voices of the latter half of "Song A", "Song B'" (high quality), "Song C'" (high quality), and the first half "Song D" as in the case of an audio-only player, whereas the audio player with video functions reproduces the start menu (VOB#1') of the audio manager (AMG) and the "Interview with the singer" along with the images.

The difference between the audio title search pointer table (ATT_SRPT) and the audio only title search pointer table (AOTT_SRPT) is that only ATT_SRPT is capable of pointing to a title in the video zone region. In the example shown in FIG. 18, ATT#2 points to a title in the video zone region. The concept of title groups is introduced because of such differences. Titles within a title group must always be consecutively reproduced.

In the example shown in FIG. 18, AOTT_SRPT includes the title groups AOTT_GR#1 and AOTT_GR#2. ATT#1 belongs to AOTT_GR#1. ATT#3, ATT#4, and ATT#5 belong to AOTT_GR#2. The title groups ATT_GR#1, ATT_GR#2, and ATT_GR#3 are included in ATT_SRPT. ATT#1 belongs to ATT_GR#1. ATT#2 belongs to ATT_GR#2. ATT#3, ATT#4, and ATT#5 belong to ATT_GR#3. Owing to this construction, consistency with respect to the reproduction order and the title numbers is maximized between the audio player with video functions and the audio-only player, thereby preventing the user from being confused as to the reproduction order and the titles.

FIG. 20A shows a specific example of title search pointer table information.

The management information concerning the five titles ATT#1 to ATT#5 is described in the audio title search pointer table information (ATT_SRPTI) and the audio-only title search pointer table information (AOTT_SRPTI).

ATT#2 in ATT_SRPTI points to a title (TT#2 of VTS#1) of the video manager (VMG). Therefore, TT#2 of VTS#1 is to be reproduced during the reproduction by the audio player with video functions.

On the other hand, the column of the management information corresponding to ATT#2 in AOTT_SRPTI is blank. Therefore, TT#2 of VTS#1 is not reproduced during the reproduction by the audio-only player.

FIG. 20B shows a specific example of the ATS program chain information table (ATS_PGCIT) of an ATS (ATS#2) of the AOB point type. In this example, the ATS program chain information table (ATS_PGCIT) includes two ATS program chain information units (ATS_PGCI#1, ATS_PGCI#2). The ATS program chain information (ATS_PGCI#1) includes one program and one cell, designating cell#1 of AOB#1. The ATS program chain information (ATS_PGCI#2) includes one program and one cell, designating cell#1 of AOB#2.

FIG. 20C shows a specific example of the ATS program chain information table (ATS_PGCIT) of an ATS (ATS#2) of the VOB point type. In this example, the ATS program chain information table (ATS_PGCIT) includes two ATS program chain information units (ATS_PGCI#1, ATS_PGCI#2). The ATS program chain information (ATS_PGCI#1) includes one program and one cell, designating cell#2 of VOB#2 of VTS#1. The ATS program chain information (ATS_PGCI#2) includes one program and one cell, designating cell#1 of VOB#6 of VTS#1.

EXAMPLE 3

Hereinafter, an optical disk that allows switching of the audio information to be reproduced depending on the audio reproducing capabilities of the reproduction apparatus, as well as an apparatus and a method for reproducing the same, will be described.

The structure of the reproduction apparatus of the present example is the same as that of the DVD player 1 shown in FIG. 12 except that the reproduction apparatus of the present example is arranged so that the determination as to whether the reproduction mode is going to be a video-oriented reproduction mode or an audio-oriented reproduction mode is not performed before a reproduction process. The reproduction apparatus of the present example is defined as an audio player which is specially designed for audio purposes.

The data structure stored on the optical disk is the same as the data structure stored on the optical disk according to Example 1.

Figure 21A:
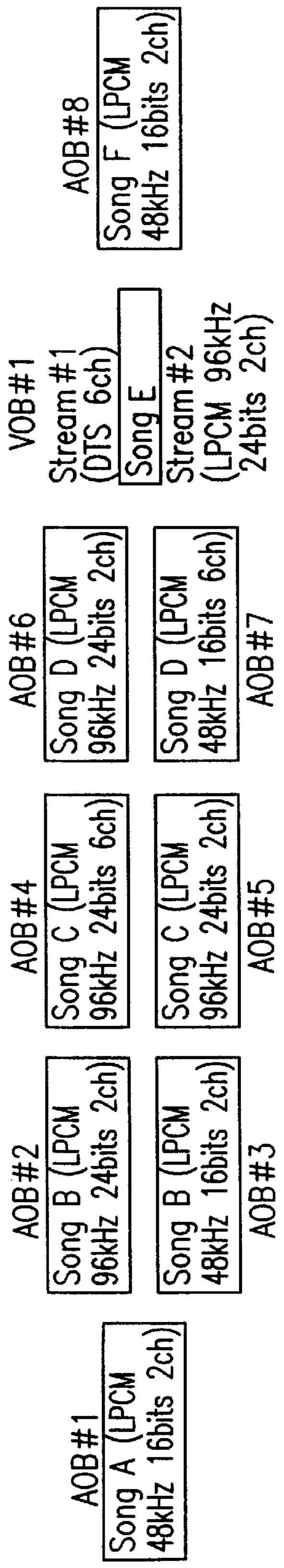
FIG. 21A shows exemplary data to be stored on an optical disk according to an example of the present invention.

FIG. 21A shows exemplary data to be stored on the optical disk.

AOB#1 is obtained by expressing "Song A" in accordance with the following audio attributes: LPCM; sampling frequency (48 kHz); quantization bit number (16 bits); channel number (2).

AOB#2 is obtained by expressing "Song B" in accordance with the following audio attributes: LPCM; sampling frequency (96 kHz); quantization bit number (24 bits); channel number (2). AOB#3 is the same content as that of AOB#2 but expressed in different audio attributes therefrom. Specifically, AOB#3 is obtained by expressing "Song B" in accordance with the following audio attributes: LPCM; sampling frequency (48 kHz); quantization bit number (16 bits); channel number (2).

AOB#4 is obtained by expressing "Song C" in accordance with the following audio attributes: LPCM; sampling frequency (96 kHz); quantization bit number (24 bits); channel number (6). AOB#5 is the same content as that of AOB#4 but expressed in different audio attributes therefrom. Specifically, AOB#5 is obtained by expressing "Song C" in accordance with the following audio attributes: LPCM; sampling frequency (96 kHz); quantization bit number (24 bits); channel number (2).

AOB#6 is obtained by expressing "Song D" in accordance with the following audio attributes: LPCM; sampling frequency (96 kHz); quantization bit number (24 bits); channel number (2). AOB#7 is the same content as that of AOB#6 but expressed in different audio attributes therefrom. Specifically, AOB#7 is obtained by expressing "Song D" in accordance with the following audio attributes: LPCM; sampling frequency (48 kHz); quantization bit number (16 bits); channel number (6).

VOB#1 represents "Song E". VOB#1 includes two audio streams (Stream#1, Stream#2). The audio stream (Stream#1) is expressed in accordance with the following audio attributes: DTS; channel number (6). The audio stream (Stream#2) is expressed in accordance with the following audio attributes: LPCM; sampling frequency (96 kHz); quantization bit number (24 bits); channel number (2).

AOB#8 is obtained by expressing "Song F" in accordance with the following audio attributes: LPCM; sampling frequency (48 kHz); quantization bit number (16 bits); channel number (2).

Such data structure allows each reproduction apparatus to reproduce voices and sounds of the highest quality and performance possible with its own audio reproduction capabilities. For example, different sounds/voices will be reproduced when an optical disk having the data structure shown in FIG. 21A is loaded in a reproduction apparatus with audio reproduction capabilities such as LPCM; sampling frequency (96 kHz); channel number (6), as compared to what is reproduced when the optical disk having the data structure shown in FIG. 21A is loaded in a reproduction apparatus with audio reproduction capabilities such as LPCM; sampling frequency (48 kHz); DTS.

Figure 21B:
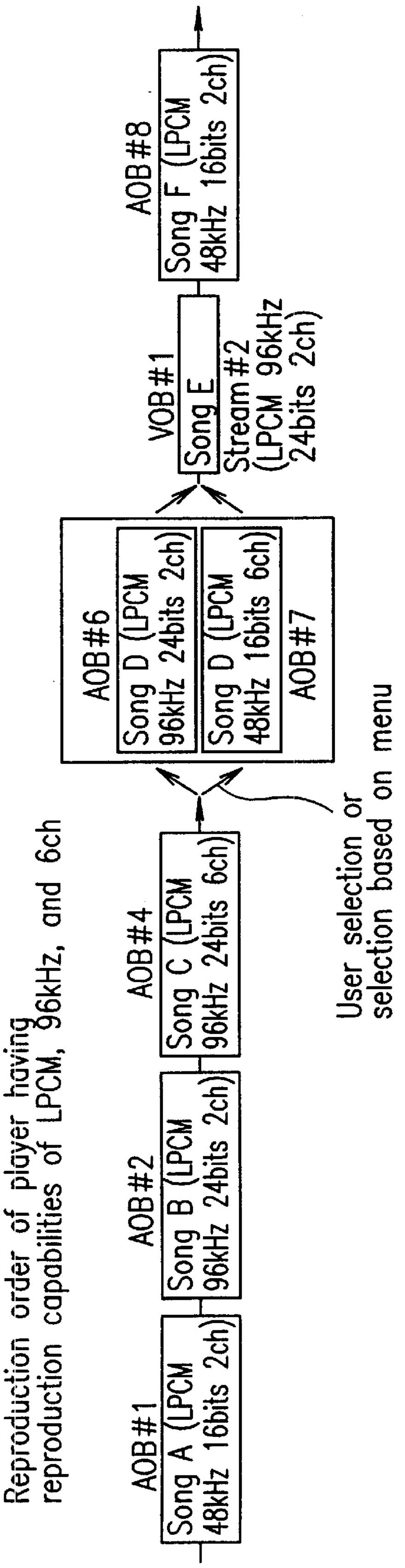
FIG. 21B is a diagram showing the reproduction order by a reproduction apparatus according to an example of the present invention.

FIG. 21B shows the reproduction order of the data of FIG. 21B by using a reproduction apparatus with the following reproduction capabilities: LPCM; sampling frequency (96 kHz); channel number (6). In this case, AOB#1, AOB#2, AOB#4 are reproduced in this order, as shown in FIG. 21B, followed by either AOB#6 or AOB#7. It is previously determined as to whether AOB#6 or AOB#7 will be reproduced, depending on the preference between quality and multichannel capabilities. Such a decision is made in accordance with a user input or the attributes of the reproduction apparatus itself. Thereafter, Stream#2 of VOB#1 and AOB#8 are reproduced. Thus, reproduction is performed with the highest quality and performance that is available given the audio reproduction capabilities of the reproduction apparatus.

Figure 21C:
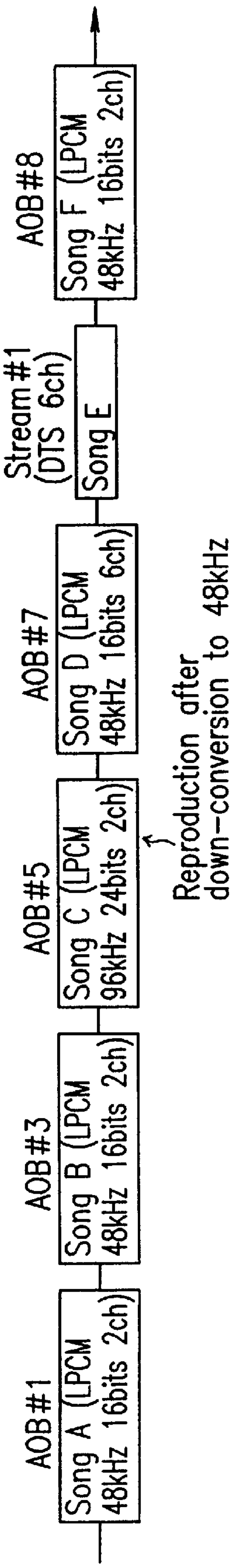
FIG. 21C is a diagram showing the reproduction order by a reproduction apparatus according to an example of the present invention.

FIG. 21C shows the reproduction order of the data of FIG. 21B by using a reproduction apparatus with the following reproduction capabilities: LPCM; sampling frequency (48 kHz); DTS. In this case, AOB#1 and AOB#3 are reproduced in this order, as shown in FIG. 21C. Since sampling frequencies for AOB#4 and AOB#5 are both 96 kHz, AOB#5 is reproduced by down-converting the sampling frequencies into 48 kHz. Thereafter, AOB#7, Stream#1 of VOB#1, and AOB#8 are reproduced. Thus, reproduction is performed with the highest quality and performance that is available given the audio reproduction capabilities of the reproduction apparatus.

The PGC block data structure is adopted in order to realize such selective reproduction.

Figure 22:
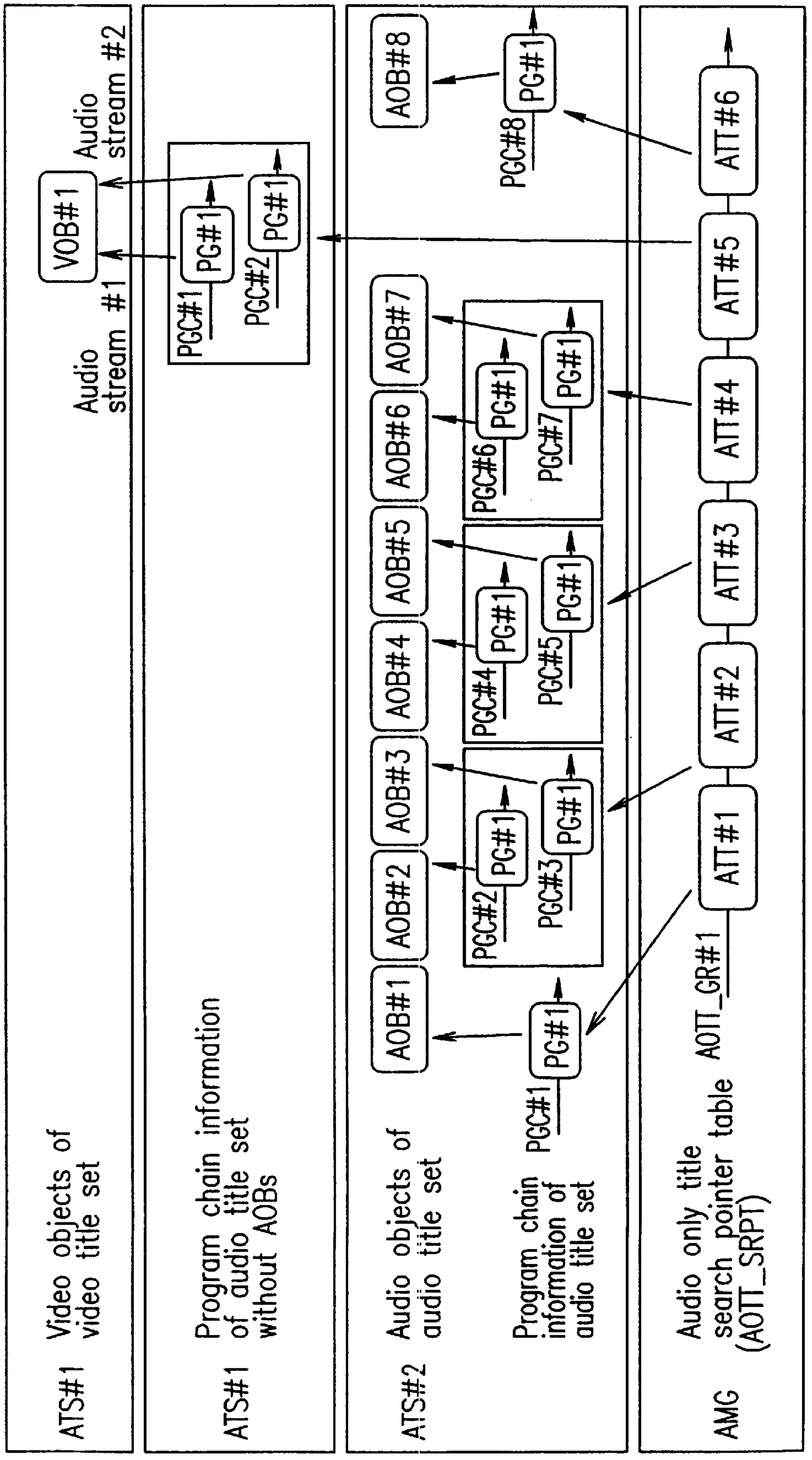
FIG. 22 is a diagram schematically showing the relationship between various reproduced information and objects according to an example of the present invention in the case where PGC blocks are present.

FIG. 22 shows the data structure of a PGC block. In the example shown in FIG. 22, PGC#1 and PGC#2 of ATS#1; PGC#2 and PGC#3 of ATS#2; PGC#4 and PGC#5 of ATS#2; and PGC#6 and PGC#7 of ATS#2 each constitute a PGC block. The audio title search pointer table (AOTT_SRPT) indicating the reproduction order describes ATT#1 to ATT#6. Two PGCs in the PGC block are pointed to from the same title.

FIGS. 23A to 23E show a specific example of title search pointer/PGC structure.

FIG. 23A shows a specific example of the title search pointer table (ATT_SRPT). An ATS number, an intra-ATS title number, and an intra-ATT program number are described for each of ATT#1 to ATT#6. From these descriptions, the PGC which an ATT points to can be known. Thus, the object to be reproduced is specified.

FIG. 23B shows a specific example of an ATS (ATS#2) of the AOB point type. An intra-ATS title number, a block mode, a block type, an audio coding mode, and a channel number are described for each of PGC#1 to PGC#8. The intra-ATS title number is designated by a title search pointer.

The block mode indicates which portion of the PGC block the PGC is in. In the block mode, "0" is stored if it is not a PGC block; "1" is stored if the PGC is the first PGC of the block; "3" is stored if the PGC is the last PGC of the block. The block type indicates the degree of differences between the PGCs constituting a PGC block. In the block type, "0" is stored if it is not a PGC block; "1" is stored if the audio coding mode is different; "2" is stored if the channel number is different; "3" is stored if both the audio coding mode and the channel number are different. By referring to the block type, the reproduction apparatus can easily know which stream is appropriate for its own reproduction capabilities. It will be appreciated that the program information is omitted from this example.

In the example shown in FIG. 23B, PGC#2 and PGC#3 are blocks having different audio coding modes; specifically, PGC#2 has a sampling frequency of 96 kHz, whereas PGC#3 has a sampling frequency of 48 kHz. PGC#4 and PGC#5 are blocks having different channel numbers; specifically, PGC#4 has six channels, whereas PGC#5 has two channels. PGC#6 and PGC#7 are blocks having different audio coding modes and different channel numbers; specifically, PGC#6 has a sampling frequency of 96 kHz and two channels, whereas PGC#7 has a sampling frequency of 48 kHz and six channels.

FIG. 23C shows a specific example of an ATS (ATS#1) of the VOB point type. In this example, PGC#1 and PGC#2 have different audio coding modes and different channel numbers; specifically, PGC#1 has a DTS audio coding mode and six channels, whereas PGC#2 has a LPCM audio coding mode and two channels.

FIG. 23D shows the audio attributes of the ATS management table of ATS#2. FIG. 23E shows the audio attributes of the ATS management table of ATS#1.

Figure 24A:
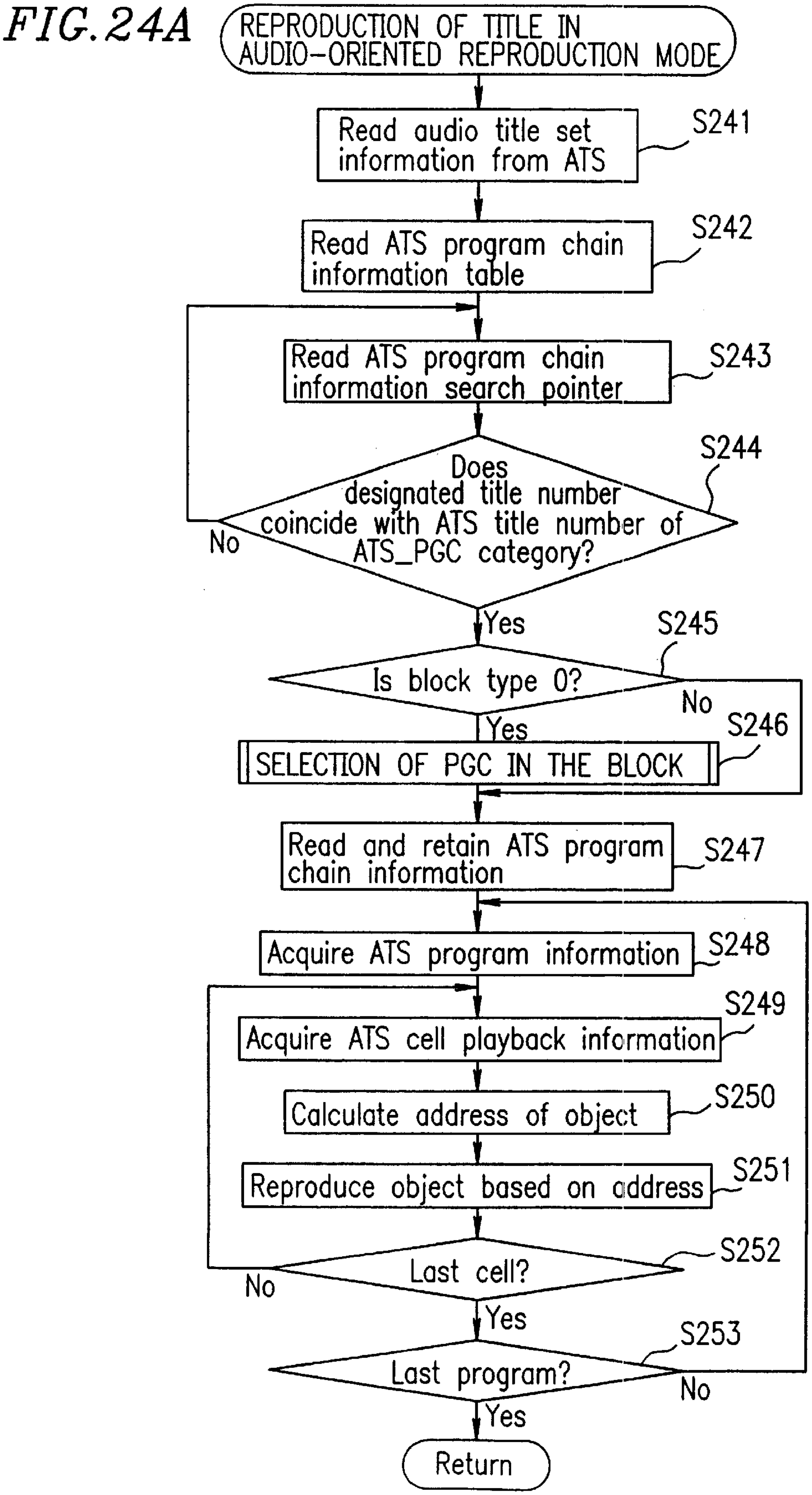
FIG. 24A is a flowchart showing the flow of a process of reproducing a title in an audio-oriented reproduction mode according to an example of the present invention in the case where PGC blocks are present.
Figure 24B:
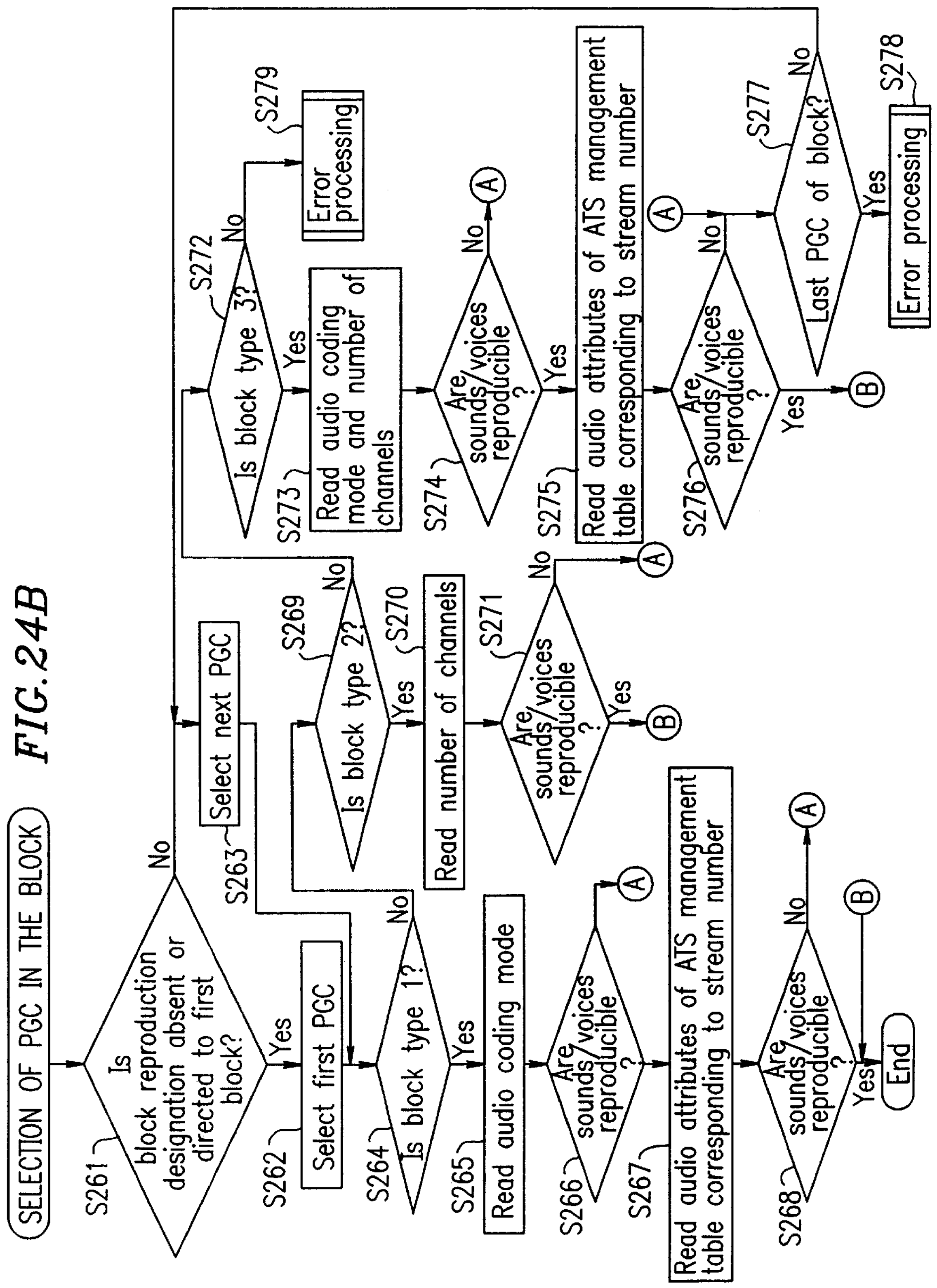
FIG. 24B is a flowchart showing the flow of a process of selecting a PGC in a PGC block according to an example of the present invention.

FIGS. 24A and 24B show the flow of a reproduction process in which the audio information to be reproduced is switched depending on the audio reproducing capabilities of the reproduction apparatus.

The flow up to the acquisition of the ATS number and the intra-ATS title number is the same as in the reproduction process in the audio-oriented reproduction mode shown in FIG. 14A, and the description thereof is omitted. At step S165 in FIG. 14A, the "REPRODUCTION OF TITLE IN AUDIO-ORIENTED REPRODUCTION MODE" subroutine in FIG. 24A is called instead of the "REPRODUCTION OF TITLE IN AUDIO-ORIENTED REPRODUCTION MODE" subroutine in FIG. 14B.

At step S241, the audio title set information 801 (FIG. 8A) is read from the audio title set 800 corresponding to the designated ATS number 954. Furthermore, various attribute information is read (steps S242, S243).

At step S244, by searching through the ATS_PGC category 851 of the ATS program chain information search pointers 832, the ATS_PGC category 851 that include an intra-ATS title number 872 coinciding with the designated intra-ATS title number 955 are located.

If the block type 874 of the located ATS_PGC category 851 is not 0, (step S245), the ATS program chain information 833 has a PGC block structure. One of the two ATS program chain information units 833 in the PGC block that is to be reproduced is selected (step S246). Such selection is executed by a "SELECTION OF PGC IN THE BLOCK" subroutine (FIG. 24B).

Thereafter, the selected ATS program chain information 833 is read so as to be retained within the reproduction apparatus (step S247). The ATS program information 862 to be reproduced is acquired in accordance with the entry order within the ATS program chain information unit 833 (step S248).

A program is reproduced in accordance with the ATS program information 862. In the reproduction of the program, the ATS cell playback information 863 is sequentially acquired (step S249); the address of an object (AOB or VOB) which is pointed to by the cell is calculated (step S250); and the object is reproduced based on that address (step S251). Steps S249 to S251 are repeated until reaching the last cell to be reproduced. The title reproduction is terminated as the reproduction of the last program is completed.

FIG. 24B shows the flow of a reproduction process in the "SELECTION OF PGC IN THE BLOCK" subroutine.

If there is no reproduction designation of blocks or the block reproduction designation is directed to the first PGC (step S261), it is determined whether or not the first PGC is reproducible (step S262).

If the block type is 1 (step S264), the audio coding mode is read (step S265), and it is determined whether or not the sounds/voices are reproducible (step S266). If the sounds/voices are reproducible, the selection of PGCs is ended after steps S267 and S268. If the sounds/voices are not reproducible, the next PGC is selected (step S263).

If the block type is 2 (step S269), the channel number is read (step S270), and it is determined whether or not the sounds/voices are reproducible (step S271). If the sounds/voices are reproducible, the selection of PGCs is ended after steps S267 and S268. If the sounds/voices are not reproducible, the next PGC is selected (step S263).

If the block type is 3 (step S272), the audio coding mode and the channel number are read (step S273), and it is determined whether or not the sounds/voices are reproducible (step S274). If the sounds/voices are reproducible, the selection of PGCs is ended after steps S275 and S276. If the sounds/voices are not reproducible, the next PGC is selected.

If the block type is neither 1, 2, nor 3, error processing is performed (step S279). If the current PGC is not reproducible and the current PGC is already the last PGC, error processing is performed because no reproducible PGCs were found (step S278).

It is possible to select which one of a plurality of PGCs included in a PGC block to reproduce in accordance with a user operation or command. It will be appreciated that, in order for a PGC to be reproduced, the reproduction apparatus must be capable of reproducing that PGC. This function will be effective in the case of an external decoder, D/A converter, etc., where the reproduction apparatus itself does not know its reproduction capabilities.

In the case where the reproduction apparatus is capable of reproducing any one of a plurality of PGCs included in the PGC block, the following methods are available: a method in which the first PGC (PGC#1) is reproduced and a method in which a flag (precedence reproduction control information) indicating which one of a plurality of PGCs must take precedence in reproduction.

EXAMPLE 4

In the case where one disk includes video-oriented contents and audio-oriented contents, or where the same disk may be reproduced by players having different reproduction methods, the author of the title wishes to predict a certain reproduction environment. Such reproduction environment includes users' modes of viewing/listening, e.g., that they definitely want to reproduce images or that they want to give precedence to sounds/voices over images, for example. Examples of players having different reproduction methods include video players for video-oriented reproduction, audio-only players for audio-oriented reproduction, or audio players with video functions for audio-oriented reproduction which are also capable of reproducing images.

With respect to reproduction of a title, it is very desirable for an author of any title to be able to define a reproduction situation, in accordance with such types of players and environmental conditions, so that the intent of author is properly understood by the viewers/listeners. This would promote the creation of even higher quality titles. In the present example, the data structure and the operation of a player which makes possible the creation of such titles. The fundamental data structure, player structure, and player operation are the same as those described in Example 1.

Figure 25:
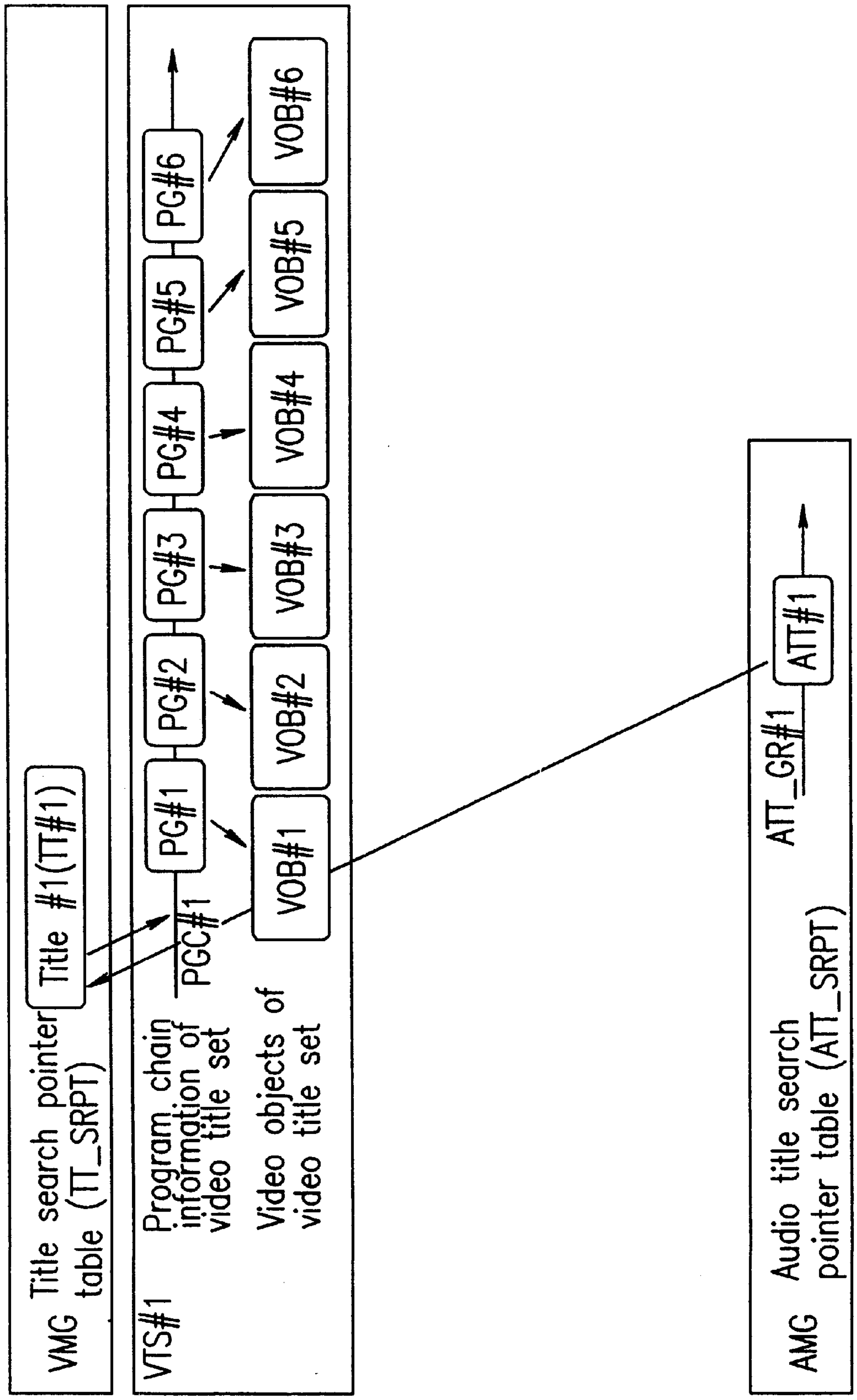
FIG. 25 is a diagram schematically showing the relationship between various reproduced information and objects according to an example of the present invention.

1. A case where reproduction by an audio-only player is not performed (see FIG. 25):

In the case where it is desirable that the images are always reproduced, reproduction by an audio-only player can be prohibited. In order to realize this, for example, a disk structure may be adopted which includes no ATS's but includes only ATS's indicating VTS titles in the ATT_SRPT of the AMG, as shown in FIG. 25. This disk structure allows an audio-only player to reproduce nothing, while allowing an audio player with video functions to reproduce sounds/voices along with images, as does a video player (except for navigation commands and the like). The sounds/voices which are available in this case are within the limits of what is defined for video players and is mandatory for audio players.

Figure 26:
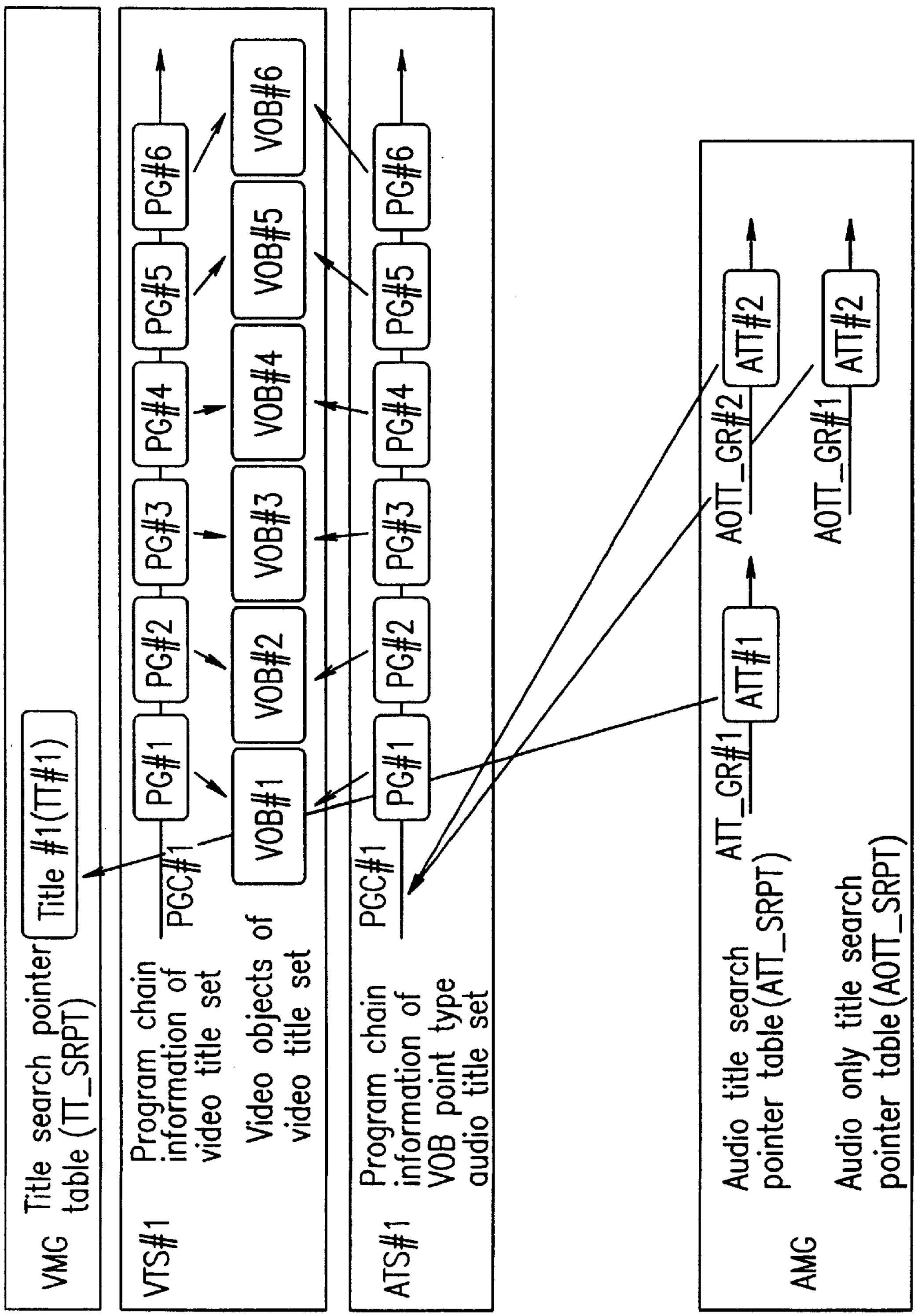
FIG. 26 is a diagram schematically showing the relationship between various reproduced information and objects according to an example of the present invention.

2. A case where an audio player with video functions is intended to perform the same reproduction as the reproduction by a video player (reproduction with precedence to images) (see FIG. 26):

An audio-only player may be allowed to reproduce sounds/voices only, while allowing an audio player with video functions to reproduce images with precedence over sounds/voices. In order to realize this, for example, a disk structure may be adopted which only includes VOB point type ATS's and further includes ATTs in the ATT_SRPT and AOTT_SRPT of the AMG such that PGCs of VOB point type ATS's point to VOBs in the video zone region, and includes an ATS representing a title of a VTS at the beginning of the ATT_SRPT, as shown in FIG. 26. This disk structure allows an audio-only player to reproduce only the sounds/voices of the VOBs in the video zone region in accordance with the AOTT_SRPT, while allowing an audio player with video functions to reproduce the sounds/voices of the VOBs in the video zone region along with images. The sounds/voices which are available in this case are within the limits of what is defined for video players and is mandatory for audio players.

Figure 27:
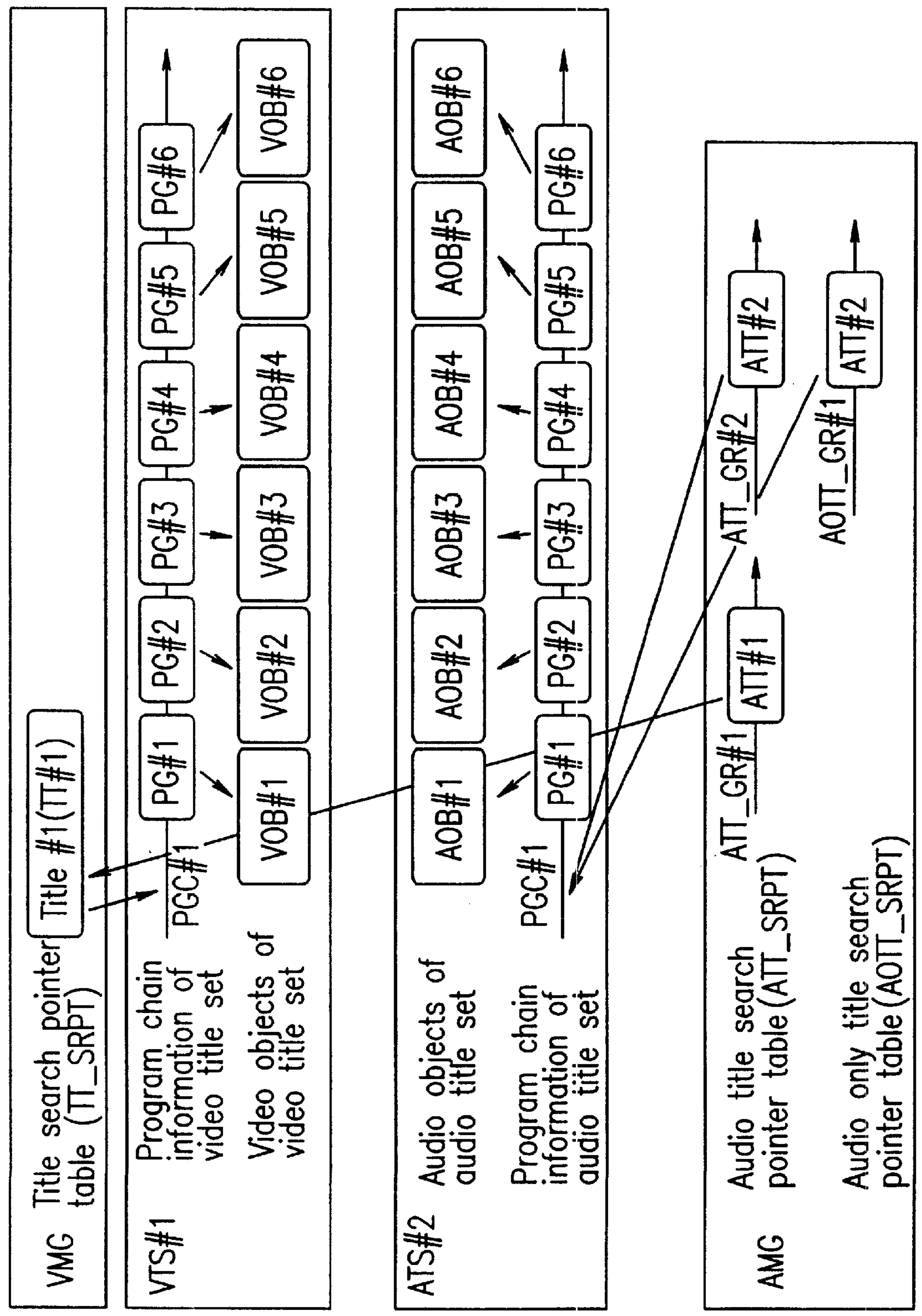
FIG. 27 is a diagram schematically showing the relationship between various reproduced information and objects according to an example of the present invention.
Figure 28:
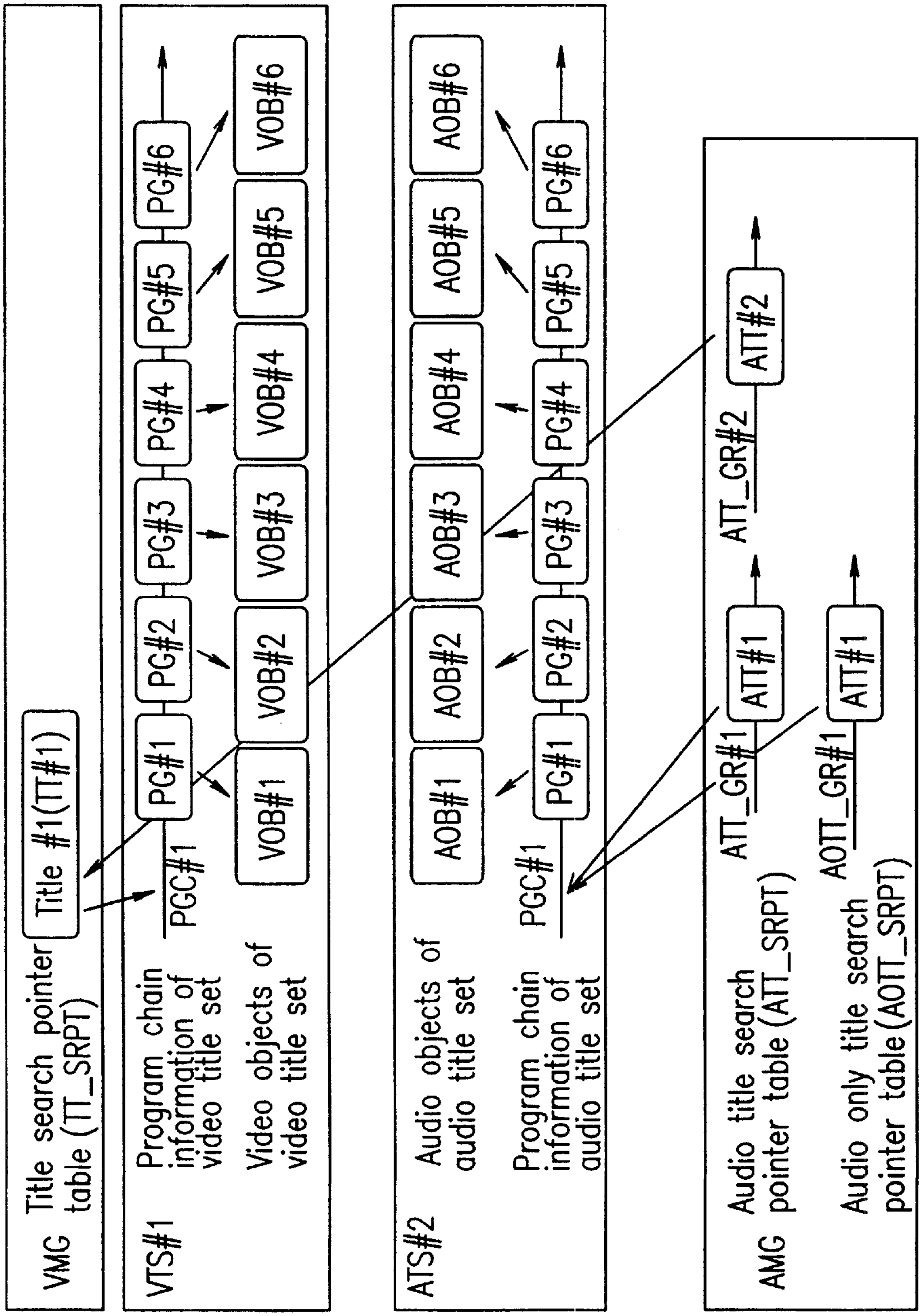
FIG. 28 is a diagram schematically showing the relationship between various reproduced information and objects according to an example of the present invention.

3. A case where an audio player with video functions is intended to reproduce sounds/voices of the same quality as, or higher quality than, that provided by a video player (see FIGS. 27 and 28):

An audio-only player is capable of reproducing sounds/voices of higher quality than that provided by a video player. An audio player with video functions may be allowed to selectively reproduce sounds/voices of the same quality as, or higher quality than, that provided by a video player. In order to realize this, for example, a disk structure may be adopted which includes AOB point type ATS's and includes ATTs in the ATT_SRPT and AOTT_SRPT of the AMG such that PGCs of ATS's point to AOBs, and includes an ATS representing a title of a VTS in the ATT_SRPT, as shown in FIGS. 27 and 28. This disk structure allows an audio-only player to reproduce sounds/voices of higher quality than that defined for a video player, while allowing an audio player with video functions to reproduce sounds/voices of higher quality than, or the same quality as, that provided by a video player.

The difference between the reproduction method illustrated in FIG. 27 and the reproduction method illustrated in FIG. 28 is whether an audio player with video functions gives precedence to the reproduction of image-accompanied sound/voices or the reproduction of high quality sound/voices. In the example of FIG. 27, image-accompanied sound/voices are associated with a title group bearing a smaller number than that which high quality sounds/voices are associated with. In the example of FIG. 28, high quality sounds/voices are associated with a title group bearing a smaller number than that which image-accompanied sound/voices are associated with. In the operation with a remote control or the like, title groups are usually reproduced in the order of title group numbers, so that title groups bearing smaller numbers are likely to be reproduced first. It will be appreciated, too, that it is possible to reproduce either image-accompanied sound/voices or high quality sounds/voices by way of a menu.

Figure 29:
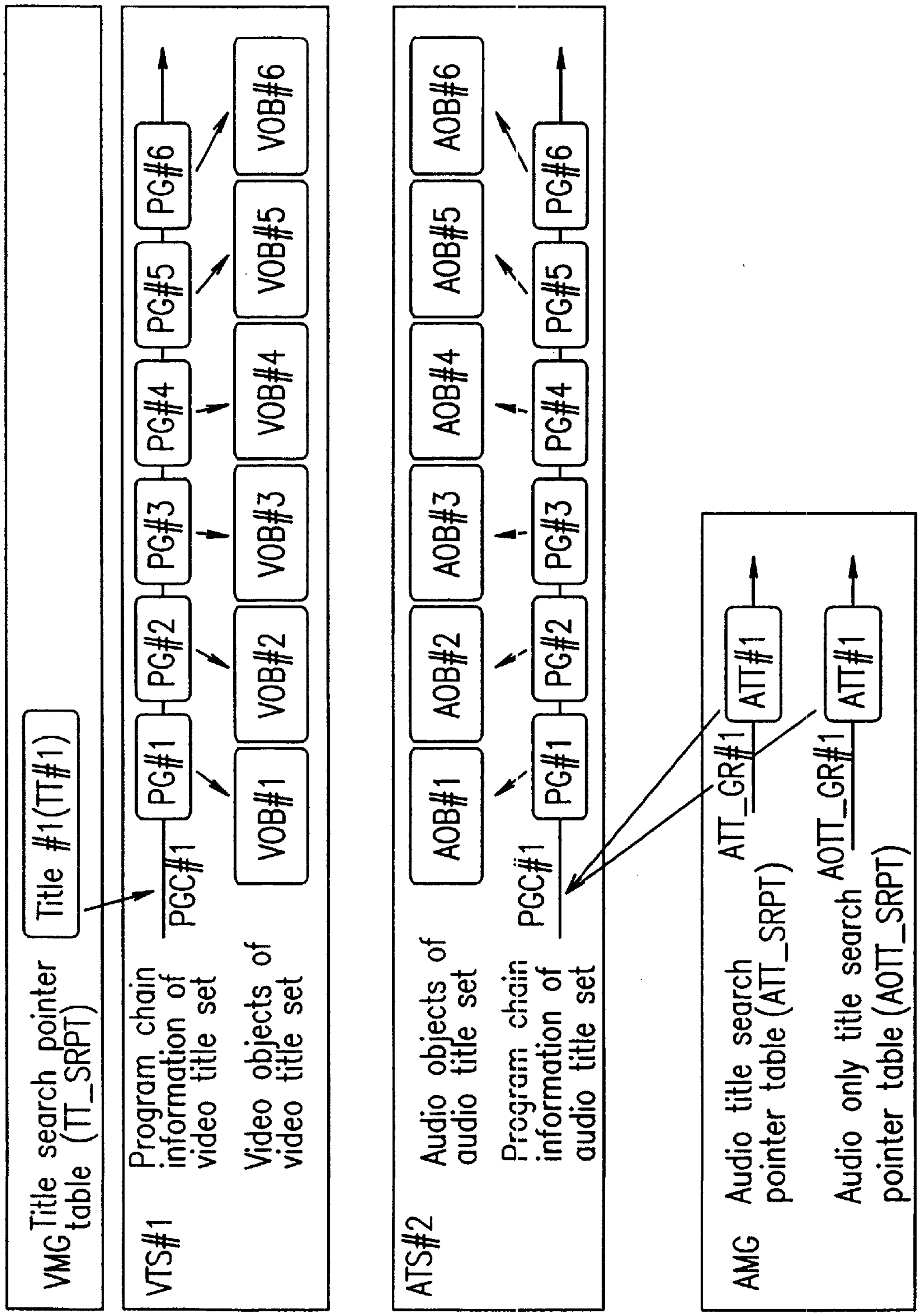
FIG. 29 is a diagram schematically showing the relationship between various reproduced information and objects according to an example of the present invention.

4. A case where an audio player with video functions is intended to reproduce high quality sounds/voices (see FIG. 29):

Both an audio-only player and an audio player with video functions may be allowed to reproduce high quality sound/voices. In order to realize this, a disk structure may be adopted which includes AOB point type ATS's and includes ATTs in the ATT_SRPT and AOTT_SRPT of the AMG such that PGCs of ATS's point to AOBs, and that the VOBs in the video zone region are never pointed to from the audio zone region, as shown in FIG. 29. This disk structure allows both an audio-only player and an audio player with video functions to reproduce high quality sounds/voices, while allowing a video player to reproduce image-accompanied sounds/voices.

Figure 30:
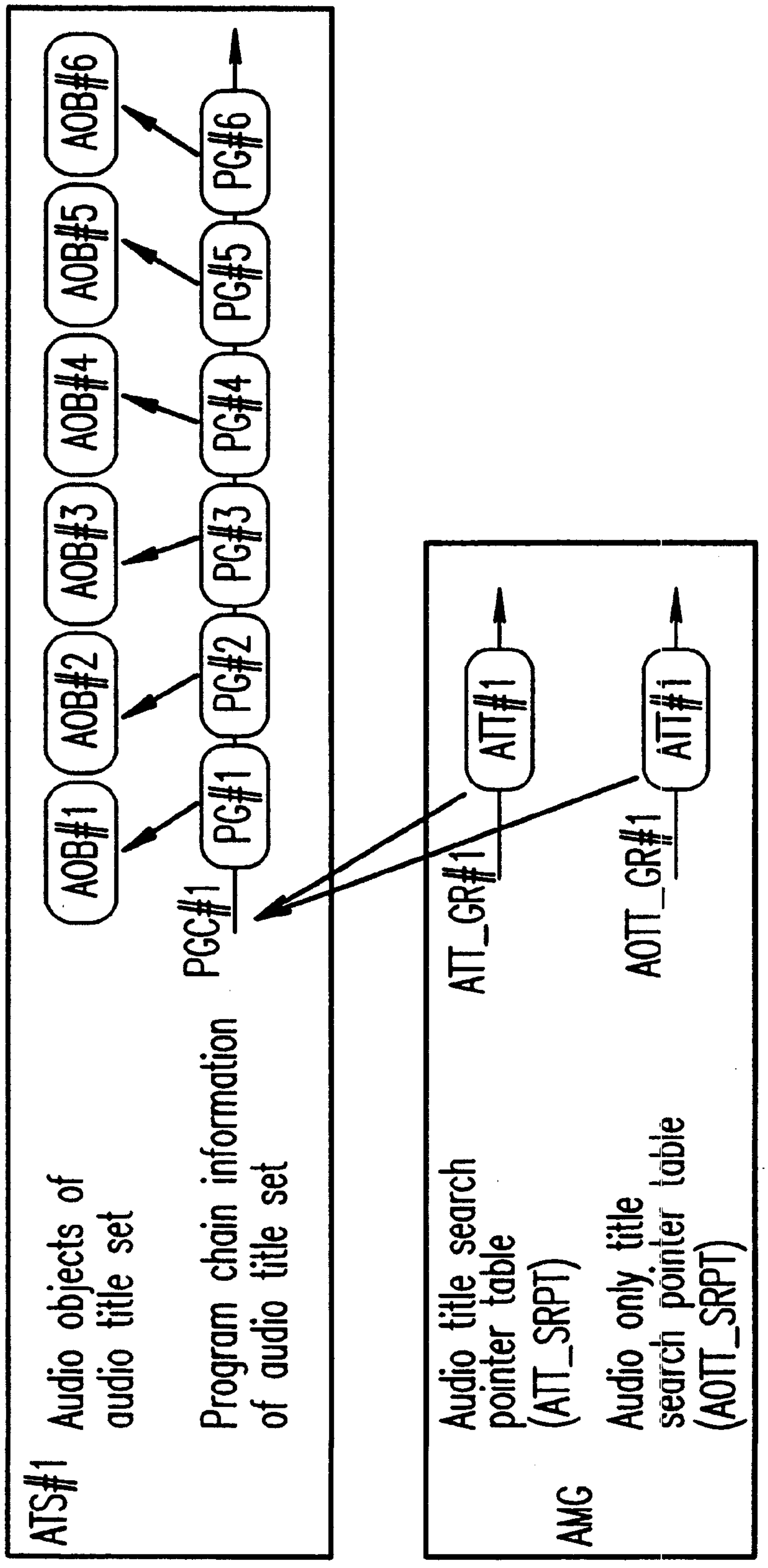
FIG. 30 is a diagram schematically showing the relationship between various reproduced information and objects according to an example of the present invention.

5. A case where a video player is prohibited from reproduction (see FIG. 30):

A video player may be prohibited from reproduction. In order to realize this, a disk structure may be adopted which does not include a video zone region, as shown in FIG. 30. This disk structure prohibits a video player from reproducing a disk because of lack of a video zone region, but allows both an audio player with video functions and an audio-only player to reproduce high quality sounds/voices alike.

Thus, by selecting an appropriate data structure, the author of a title can designate the reproduction method by a video player, an audio player with video functions, and an audio-only player. In addition, it becomes possible to change the reproduction method of the player at the beginning or in the middle of the reproduction of a disk, by an arrangement such that the player can be determined either to behave as a video player or as an audio player with video functions or as an audio-only player depending on whether or not a display is connected to the player or on whether or not the reproduction of images is allowed.

EXAMPLE 5

In the case of a video disk, First_Play_PGC is defined as a region for describing a command which is automatically executed when the disk is inserted because this is necessitated by the use of a menu and the need to realize various settings of the player through commands. However, since an audio player does not necessarily require a menu and video attributes can be dispensed with, there is no need to fix settings through commands prior to beginning reproduction. However again, if the audio player did not start reproduction until a "play" key is pressed after insertion of a disk, as in the case of a CD, it would be inconvenient because the user is required to perform so much more action. Hereinafter, a disk data structure and a reproduction method for a player will be described which contemplates automatic execution while conforming to the aforementioned nature of audio players.

Since the fundamental data structure and player structure are the same as those described in Example 1, the following description will be directed to the differences.

Figure 31:
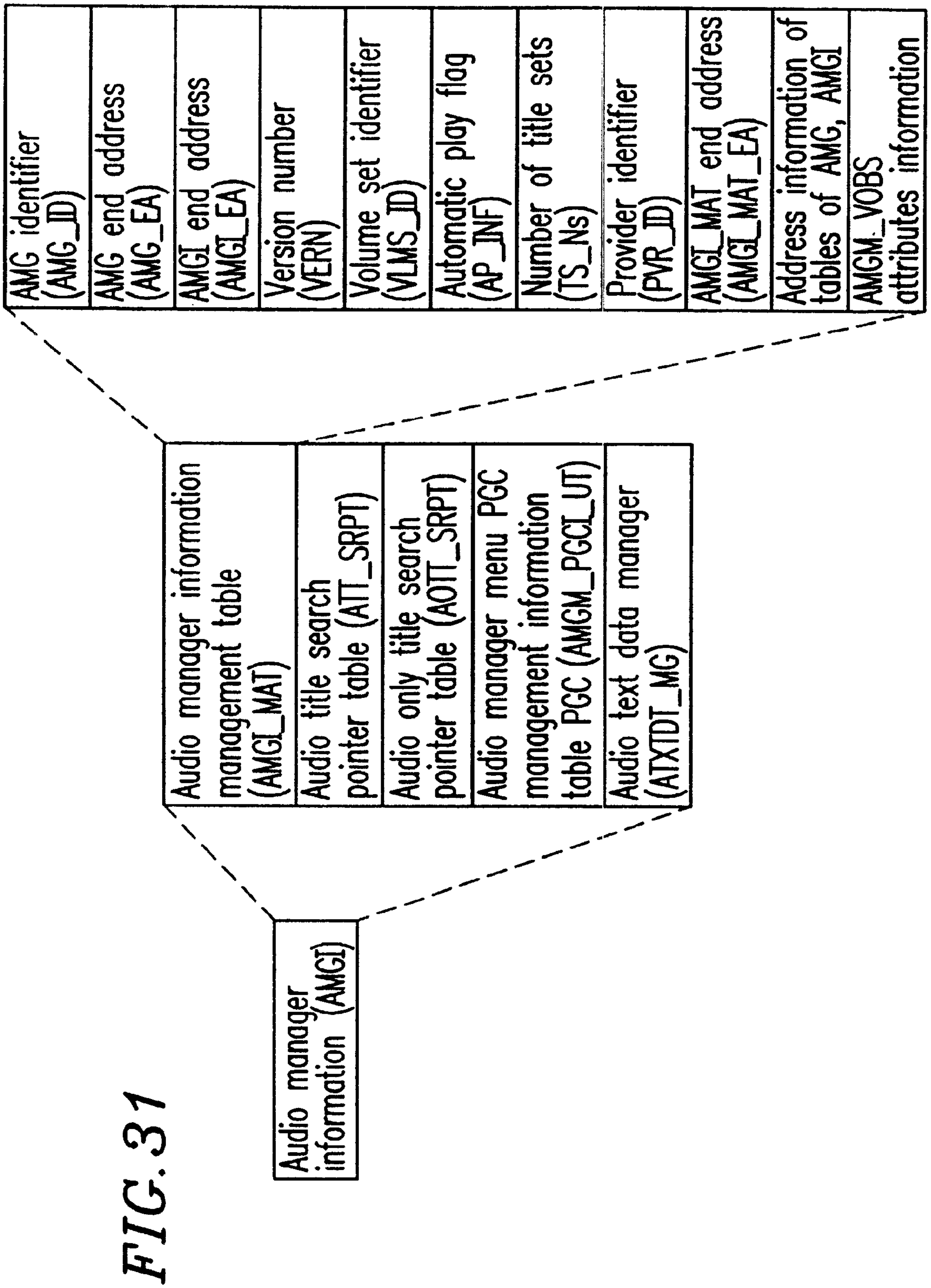
FIG. 31 is a diagram showing the data structure of an audio manager for performing automatic reproduction at the time of inserting a disk according to an example of the present invention.

FIG. 31 shows the data structure of audio manager information (AMGI). The audio manager management table (AMGI_MAT), although not described in detail in Example 1, includes an autoplay flag (AP_INF). The value "1" of the autoplay flag means that the reproduction will be started at ATT#1 of title group#1.

Once a disk is inserted, an audio player reads the audio manager and sets various attributes. After completion of the initial settings, the audio player reads the autoplay flag. If the value of the autoplay flag is 1, the reproduction will be started at ATT#1 of title group#1. That is, the disk will immediately start reproducing sounds/voices upon insertion without requiring the user to perform more operation.

Thus, the need for pressing a "Play" key after insertion of a disk can be eliminated while realizing a reproduction as intended by the author.

According to the present invention, there is provided an optical disk on which first path information and second path information are stored, the first path information indicating a first reproduction path including only video objects, and the second path information indicating a second reproduction path including a combination of video objects and audio objects.

In a video-oriented reproduction mode, the video information and the audio information contained in the video objects are reproduced along the first reproduction path. In an audio-oriented reproduction mode, the audio information contained in the video objects and the audio information contained in the audio objects are reproduced along the second reproduction path. Thus, the reproduction path can be switched in accordance with the reproduction mode. Thus, the second reproduction path can be formed so as to exclude those video objects which are inappropriate for the exclusive reproduction of audio information. Moreover, malfunctioning in the audio-oriented reproduction mode can be prevented.

According to the present invention, the second path information includes offset information for designating a range to be reproduced of the audio information contained in the video objects. As a result, those periods which are inappropriate for the exclusive reproduction of audio information can be eliminated during a period for reproducing the audio information in one video object.

According to the present invention, the quality of the audio information contained in the audio objects is higher than the quality of the audio information contained in the video objects. As a result, sounds and voices of higher quality than that available during reproduction in a video-reproduction mode can be enjoyed during reproduction in an audio-oriented reproduction mode.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording method for an optical disk including an audio zone, comprising the step of:

recording at least one audio object corresponding to an audio title and an audio title set information for managing the reproduction of the at least one audio object in the audio zone, wherein each of the at least one audio object contains coded audio data, the audio title set information contains a plurality of reproduction path information each indicating the reproduction order of the at least one audio object and a block information defining at least two reproduction path information as a block among the plurality of reproduction path information, each of the at least two reproduction path information being alternatively selectable in a part of the reproduction path of the audio title, and an audio coding mode of the coded audio data contained in the audio object which is reproduced in accordance with the reproduction order indicated by one reproduction path information included in the block is different from an audio coding mode of the coded audio data contained in the audio object which is reproduced in accordance with the reproduction order indicated by another reproduction path information included in the block.

2. A recording method according to claim 1, wherein the block information includes a block mode indicating whether or not the reproduction path information forms the block with any other reproduction path information and a block type indicating that there is a difference between the audio coding modes within the block.

3. A recording method according to claim 2, the block mode further indicating a first reproduction path information included in the block and a last reproduction path information included in the block.

* * * * *